United States Patent
Hu et al.

(10) Patent No.: US 8,527,634 B2
(45) Date of Patent: *Sep. 3, 2013

(54) METHOD AND APPARATUS FOR CREATING IP-CAN SESSION

(75) Inventors: Huadong Hu, Shenzhen (CN); Chunxia Zhi, Shenzhen (CN); Tingting Deng, Beijing (CN); Yali Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,756

(22) Filed: Sep. 14, 2012

(65) Prior Publication Data
US 2013/0013794 A1    Jan. 10, 2013

Related U.S. Application Data

(63) Continuation of application No. 12/704,679, filed on Feb. 12, 2010, now Pat. No. 8,285,861, which is a continuation of application No. PCT/CN2008/071989, filed on Aug. 14, 2008.

(30) Foreign Application Priority Data

Aug. 15, 2007    (CN) .......................... 2007 1 0140578

(51) Int. Cl.
    *G06F 15/16*    (2006.01)
    *H04W 4/00*    (2009.01)

(52) U.S. Cl.
    USPC .......................................... 709/225; 370/331

(58) Field of Classification Search
    USPC .................. 709/228; 370/331, 338
    See application file for complete search history.

(56) References Cited

U.S. PATENT DOCUMENTS

| | | | |
|---|---|---|---|
| 2008/0229385 A1* | 9/2008 | Feder et al. | 726/1 |
| 2010/0115071 A1 | 5/2010 | Sanchez et al. | |
| 2010/0131647 A1 | 5/2010 | Fernandez et al. | |
| 2010/0146596 A1* | 6/2010 | Stenfelt et al. | 726/4 |

FOREIGN PATENT DOCUMENTS

| | | |
|---|---|---|
| CN | 1798041 A | 7/2006 |
| CN | 1852384 A | 10/2006 |
| CN | 101001401 A | 7/2007 |
| CN | 101370006 A | 2/2009 |
| WO | 03/096603 A1 | 4/2003 |

OTHER PUBLICATIONS

Office Action issued in corresponding U.S. Appl. No. 12/704,679, mailed Jan. 27, 2012.

(Continued)

*Primary Examiner* — Shirley Zhang
(74) *Attorney, Agent, or Firm* — Brinks Hofer Gilson & Lione

(57) ABSTRACT

A method and an apparatus for creating an Internet Protocol Connectivity Access Network (IP-CAN) session are disclosed herein. The method includes: creating, by a First Policy and Charging Enforcement Function entity, PCEFa entity, a session with a Policy and Charging Rules Function entity, PCRF entity; performing, by the PCEFa entity, mobility registration with a second Policy and Charging Enforcement Function entity, PCEFb entity; creating, by the PCEFb entity, a session with the PCRF entity; and sending, by the PCRF entity, a session information to the PCEFa entity and the PCEFb entity. mobility The apparatus includes: a PCEFa entity, a PCEFb entity, and a PCRF entity. The method and the apparatus for creating an IP-CAN session under the present disclosure accomplish the purpose of creating an IP-CAN session in the new PCC architecture.

14 Claims, 36 Drawing Sheets

(56) References Cited

OTHER PUBLICATIONS

Office Action issued in corresponding U.S. Appl. No. 12/704,679, mailed Nov. 9, 2011.
GSM, "3rd Generation Partnership Project; Technical Specification Group Services and System Aspects; Architecture Enhancements for non-3GPP Accesses" (Release 8) 3GPP TS 23.402. V1.2.1, Aug. 2007.
Extended European Search Reported dated (mailed) Sep. 10, 2010 issued in related Application No. 08783980.9.
3GPP TSG SA WG2 Architecture—S2#56c Rel-8 "AD-hoc QoS aspects for IETF based on Roaming with LTE Access and non-3GPP Access", Warsaw, Poland, Mar. 2007.
3GPP TSG SA WG2 Architecture—S2#58 Ad-hoc "PCC for non-3GPP Accesses: a Scenario-Driven Analysis," Orlando, FL, Jun. 2007.
3GPP TSG 23.402 V12.1 "Technical Specification Group Services Services and System, Aspects; Architecture Enhancements for non-3 GPP Accesses (Release 8)" Aug. 2007.
3GPP TSG 23.402 V1.3.0 "Technical Specification Group Services Services and System, Aspects; Architecture Enhancements for non-3 GPP Accesses (Release 8)" Aug. 2007.
3GPP TSG 23.203 V7.3.0 "Policy and Charging Control Architecture (Release 7)" Jun. 2007.
Written Opinion of the International Search Authority dated Oct. 23, 2008, issued in related Application No. PCT/CN2008/071989.
European Search Opinion for Application No. 08783980.9, mailed Feb. 8, 2011.
International Search Report issued in International Application No. PCT/CN2008/071989, mailed Oct. 23, 2008.
3rd Generation Partnership Project; Technical Specification Group Services and System Aspects; Policy and Charging Control Architecture (Release 7) 3GPP TS 23.203 V73630, pp. 1-72 (Jun. 2007).
First Chinese Office Action Dated Dec. 12, 2011 in related Chinese Application 200880020462.2.
Extended European Search Report dated Jul. 20, 2012, issued in related European Application No. 12170146.0.
Office Action issued in corresponding Chinese Patent Application No. 201110222740.6, mailed Dec. 17, 2012.

* cited by examiner

METHOD AND APPARATUS FOR CREATING IP-CAN SESSION

CROSS-REFERENCE TO RELATED APPLICATIONS

This application is a continuation of U.S. patent application Ser. No. 12/704,679, filed on Feb. 12, 2010, which is a continuation of International Application No. PCT/CN2008/071989, filed on Aug. 14, 2008. The International Application claims priority to Chinese Patent Application No. 200710140578.7, filed on Aug. 15, 2007, all of which are hereby incorporated by reference in their entireties.

FIELD

The present disclosure relates to mobile session technologies, and in particular, to a method and an apparatus for creating an Internet Protocol Connectivity Access Network (IP-CAN) session under a Policy and Charging Control (PCC) architecture.

BACKGROUND

In a $3^{rd}$ Generation Partnership Project (3GPP) system, the policy and charging functions are implemented in a PCC architecture. The PCC architecture implements two functions: policy control and charging.

The policy control function includes six aspects: (1) monitoring the process of negotiating the service parameters (such as Quality of Service (QoS) parameter) of the user; (2) authorizing the network bearer resources used by the service according to the obtained service information; (3) controlling the pass of the service flow on the data bearer plane in real time; (4) notifying the change of the service plane to the data bearer plane; (5) notifying the change of the data bearer plane to the service plane; and (6) performing policy control based on the subscription profile of the user.

The charging function includes three aspects: (1) formulating charging rule(s) according to the service information, bearer information and subscription profile; (2) performing correlation between the service-plane charging data and the bearer-plane charging data; and (3) performing credit control in a dynamic charging mode.

FIG. 1 shows a structure of a PCC architecture in the prior art. As shown in FIG. 1, the policy control function of the existing PCC architecture involves these logical entities: Application Function (AF) entity, Policy and Charging Rules Function (PCRF) entity, Policy and Charging Enforcement Function (PCEF) entity, and Subscription Profile Repository (SPR) entity. The charging function of the existing PCC architecture involves not only the AF entity, the PCRF entity, the PCEF entity, and the SPR entity, but also other logical entities such as an Online Charging System (OCS) entity and an Offline Charging System (OFCS) entity.

The functions of the entities are elaborated below.

The AF entity is configured to provide a service application access point. The network resources used by such service applications need dynamic policy control. In the parameter negotiation on the service plane, the AF entity transfers the relevant service information to the PCRF entity. If such service information is consistent with the policy rule(s) defined on the PCRF entity, the PCRF entity accepts the negotiated service parameters. Otherwise, the PCRF entity rejects the negotiation, and may give a feedback which carries the service parameters acceptable to the PCRF entity. Afterward, the AF entity may return such parameters to the user. The AF entity is interfaced with the PCRF entity through an Rx interface.

The PCRF entity is a core of the PCC system, and is responsible for formulating the policy decision and charging rule(s). The PCRF entity provides network control rule(s) based on the service data flow. The network control includes: data flow detection, gating, QoS control, and flow-based charging control. The PCRF entity sends the formulated policy and charging rule(s) to the PCEF entity for executing, and ensures that such rule(s) are consistent with the subscription profile of the user. The PCRF entity formulates the policy and charging rule(s) according to the information such as the service-related information obtained from the AF entity, subscription profile-related information obtained from the SPR entity, and the bearer network-related information obtained from the PCEF entity.

On the bearer plane, the PCEF entity may execute the policy and charging rule(s) formulated by the PCRF entity. The PCRF entity may deliver trigger events to the PCEF entity. The PCEF entity requests PCC rule(s) from the PCRF entity only when such a trigger event occurs. The PCEF entity detects the service data flows according to a traffic filter in the rule(s) sent by the PCRF entity, and performs the policy and charging control formulated by the PCRF entity to such service flows. When creating a bearer, the PCEF entity performs QoS authorization according to the rule(s) sent by the PCRF entity, and performs a gating operation according to the instruction of the AF entity. The PCEF entity executes the service flow charging operation according to the charging rule(s) sent by the PCRF entity. Such a charging operation may be online charging or offline charging. For online charging, the PCEF entity works together with the OCS entity to perform credit management; for offline charging, the PCEF entity exchanges the relevant charging information with the OFCS entity. The PCEF entity is interfaced with the PCRF entity through a Gx interface, interfaced with the OCS entity through a Gy interface, and interfaced with the OFCS entity through a Gz interface. The PCEF entity is generally located in a Gateway (GW) of the network.

The SPR entity stores the user subscription profile related to policy control and charging, for example, information about services available to the user, information about the QoS available to the user service, user subscription profile related to charging, and group type of the user. By using the information stored in the SPR entity, the PCRF entity may perform policy control and charging operations based on the user subscription profile. The SPR entity is interfaced with the PCRF entity through an Sp interface.

With evolution of the mobile communication network, a new PCC architecture is currently put forward. FIG. 2 shows a structure of a new PCC architecture. In the new PCC architecture, the PCEF is divided into a PCEFa entity and a PCEFb entity. The PCEFa entity and the PCEFb entity may be configured respectively into an Access Gateway (A-GW) and an Evolved Packet System (EPS) Home Agent (HA). No bearer exists between the A-GW and the EPS HA. Therefore, the bearer plane-related functions (for example, bearer binding function) of the PCEF entity are configured in the PCEFa entity of the A-GW. An SGi interface exists between the EPS HA and a Packet Data Network (PDN). Therefore, the functions such as the charging function and the gating function are configured in the PCEFb entity of the EPS HA. The A-GW may be a serving GW or a PDN GW, or other core network entity, and the EPS HA may be a PDN GW or other core network entity.

SUMMARY

The solution provided by the embodiments is described below. In a first embodiment, a method for creating an IP-CAN session includes: creating, by a first Policy and Charging Enforcement Function entity, PCEFa entity, a session with a Policy and Charging Rules Function entity, PCRF entity; performing, by the PCEFa entity, mobility registration with a second Policy and Charging Enforcement Function entity, PCEFb entity; creating, by the PCEFb entity, a session with the PCRF entity; and sending, by the PCRF entity, a session information to the PCEFa entity and the PCEFb entity.

In a second embodiment, a method for creating an Internet Protocol Connectivity Access Network (IP-CAN) session, comprising: accepting, by a second Policy and Charging Enforcement Function (PCEF) entity, mobility registration from a first PCEF entity that has created a session with a Policy and Charging Rules Function (PCRF) entity; creating, by the second PCEF entity, a session with the PCRF entity; and receiving, by the second PCEF entity, an IP-CAN session information and PCC rules from the PCRF entity.

In a third embodiment, an apparatus for creating an IP-CAN session includes: a First Policy and Charging Enforcement Function entity, PCEFa entity, configured to receive an IP-CAN session creation request, and return an IP-CAN session creation response after receiving an IP-CAN session information; a second Policy and Charging Enforcement Function entity, PCEFb entity, configured to perform mobility registration with the PCEFa entity; and a Policy and Charging Rules Function entity, PCRF entity, configured to create sessions with the PCEFa entity and the PCEFb entity, and send IP-CAN session information to the PCEFa entity and the PCEFb entity.

In a fourth embodiment, an apparatus includes a non-transitory computer readable storage medium storing a set of instructions for creating an Internet Protocol Connectivity Access Network (IP-CAN) session. The set of instructions to direct a processor in a network entity to: accept mobility registration from a first Policy and Charging Enforcement Function (PCEF) entity that which has created a session with a Policy and Charging Rules Function (PCRF) entity; create a session with the PCRF entity; and receive an IP-CAN session information and PCC rules from the PCRF entity.

According to the method and the apparatus for creating an IP-CAN session in an embodiment of the present disclosure, the PCRF may formulate PCC rule(s) for the IP-CAN session, and submit the IP-CAN session information and the formulated PCC rule(s) to the PCEFa entity and the PCEFb entity. In this way, an IP-CAN session may be created in the new architecture.

BRIEF DESCRIPTION OF THE DRAWINGS

The following figures describe the exemplary embodiments of the present disclosure in more detail, and make the features and merits of the present disclosure clearer to those skilled in the art.

DETAILED DESCRIPTION

In order to make the solution, objectives and merits of the present disclosure clearer, the following describes the embodiments of the present disclosure in more detail with reference to accompanying drawings.

Figure 3:
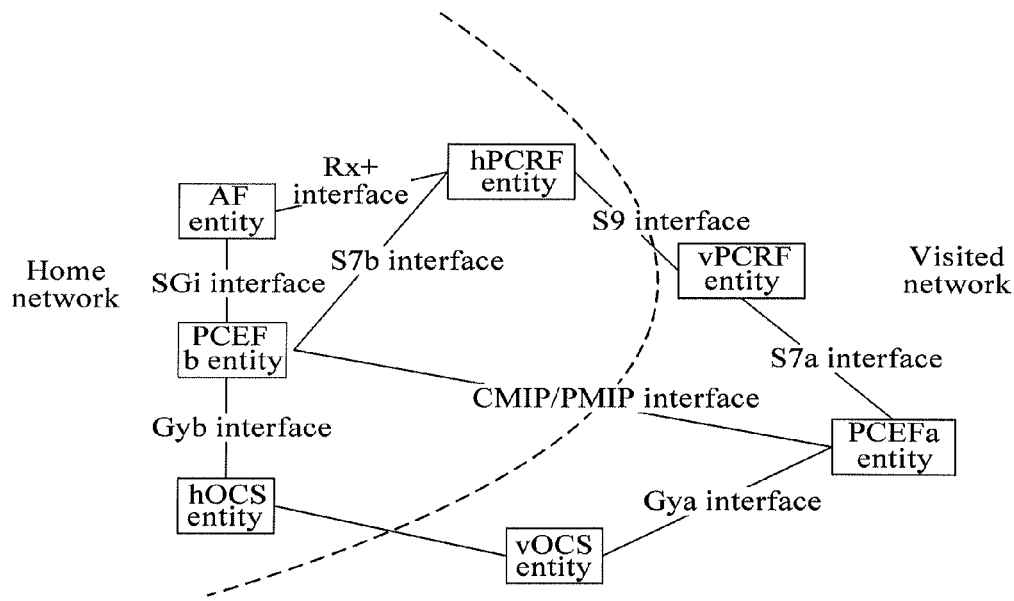
FIG. 3 schematically illustrates a structure of a new PCC architecture in the first roaming scenario.

FIG. 3 schematically illustrates a structure of a new PCC architecture in the first roaming scenario. As shown in FIG. 3, when the PCEFa entity is located in a visited network, the vPCRF entity located in the visited network performs signaling transfer between the PCEFa entity and the hPCRF entity in the home network, and the vOCS entity located in the visited network performs signaling transfer between the PCEFa entity and the hOCS entity located in the home network. Besides, the PCEFa entity and the PCEFb entity may also perform signaling transfer through the core network entities such as vEPS HA, which is not illustrated in FIG. 3.

Figure 4:
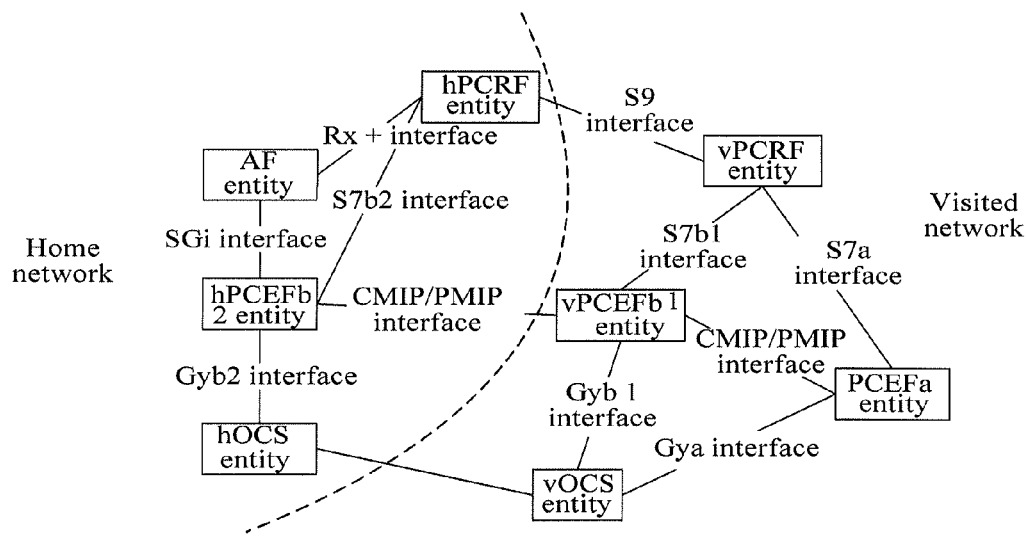
FIG. 4 schematically illustrates a structure of a new PCC architecture in the second roaming scenario.

FIG. 4 schematically illustrates a structure of a new PCC architecture in the second roaming scenario. As shown in FIG. 4, the PCEFb entity may further include an hPCEFb2 entity located in the home network and a vPCEFb1 entity located in the visited network. Signaling transfer is performed between the PCEFa entity and the hPCEFb2 entity through a vPCEFb1 entity.

Figure 1:
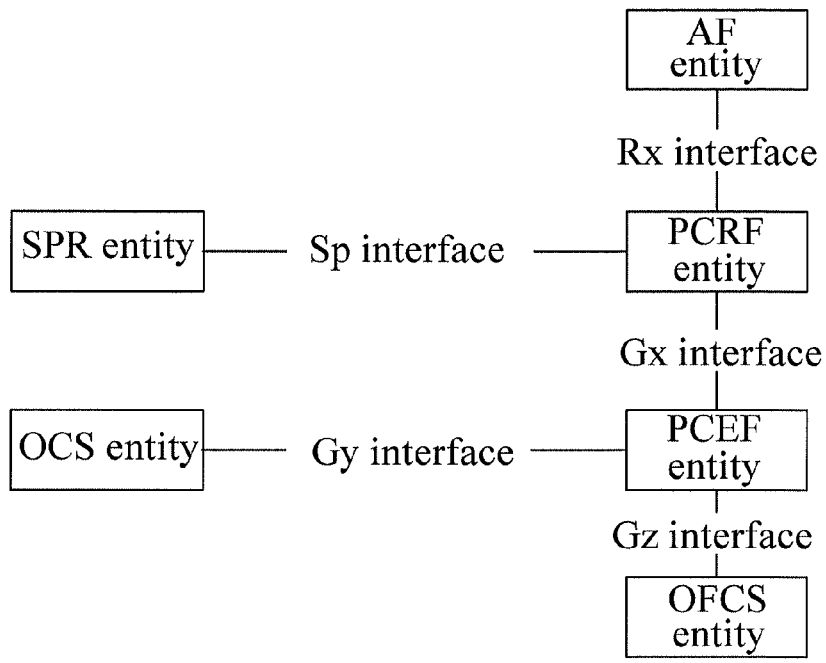
FIG. 1 schematically illustrates a structure of a PCC architecture in the prior art.
Figure 2:
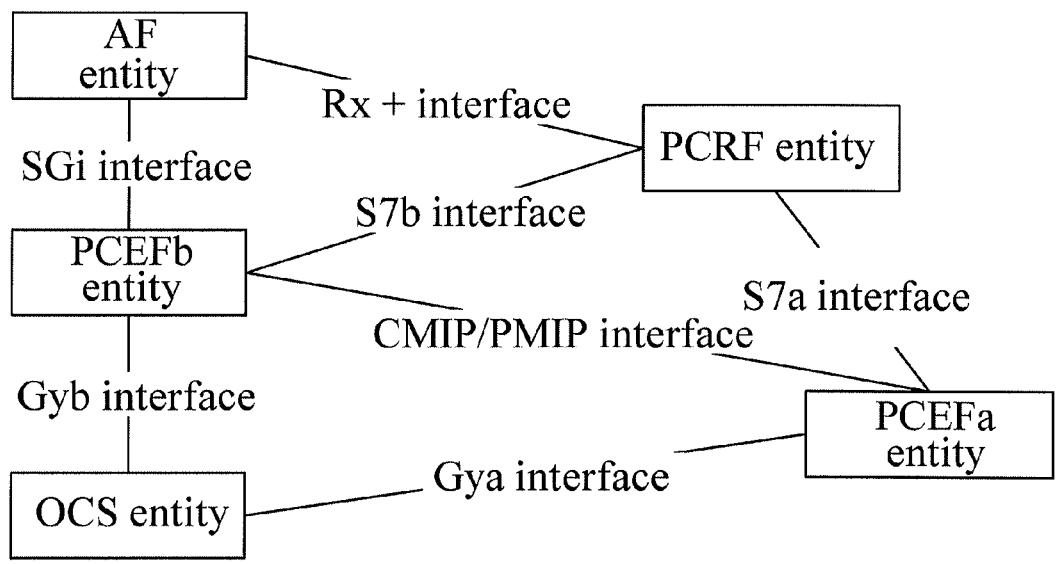
FIG. 2 schematically illustrates a structure of a new PCC architecture.

As shown in FIG. 2 and FIG. 4, after the new PCC architecture comes forth, the PCEF is divided into two parts. That is, two PCEF logical function entities coexist in the new PCC architecture. Consequently, the method for creating and deleting an IP-CAN session in the existing PCC architecture does not work in the new PCC architecture. Currently, no method for creating or deleting an IP-CAN session in the new PCC architecture is available.

First, embodiments of a method for creating an IP-CAN session in the present disclosure are described below.

Figure 5:
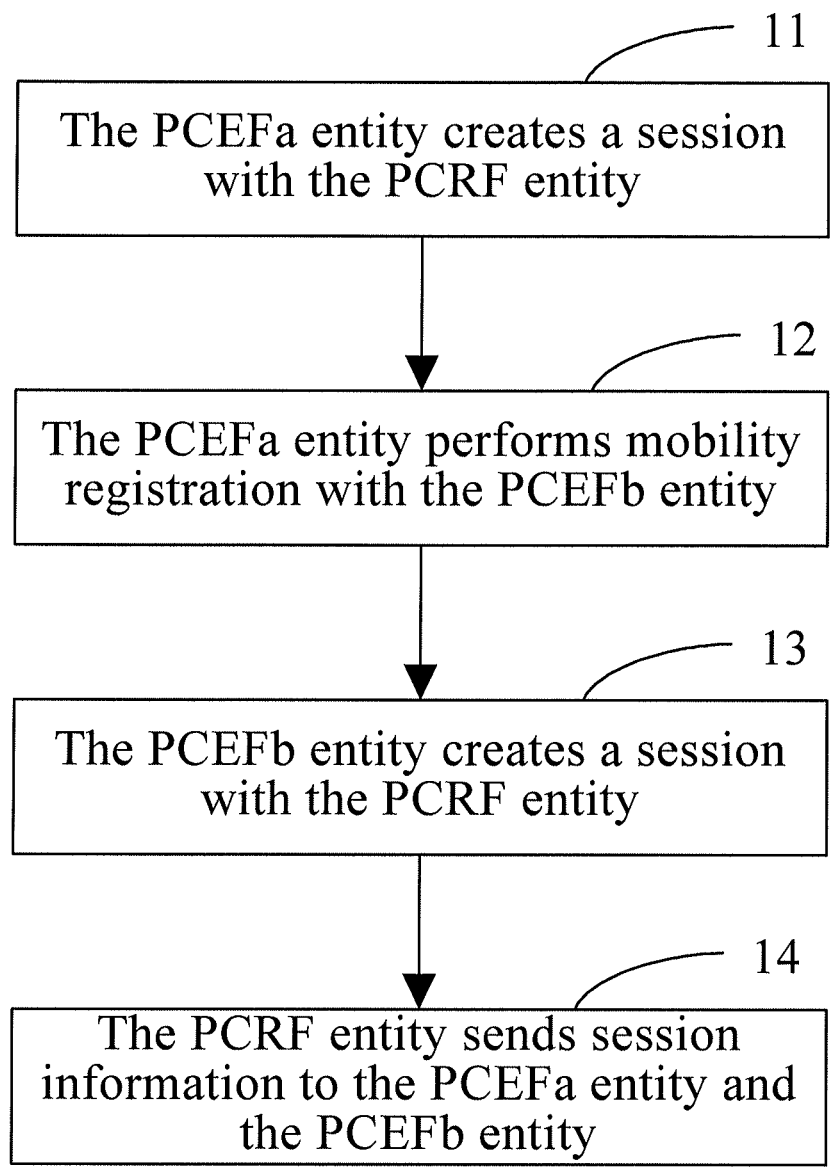
FIG. 5 is a schematic flowchart of a method for creating an IP-CAN session in an embodiment of the present disclosure.

FIG. 5 is a schematic flowchart of a method for creating an IP-CAN session in an embodiment of the present disclosure. As shown in FIG. 5, the method for creating an IP-CAN session in this embodiment includes:

Step 11: The PCEFa entity creates a session with the PCRF entity.

Step 12: The PCEFa entity performs mobility registration with the PCEFb entity.

Step 13: The PCEFb entity creates a session with the PCRF entity.

Step 14: The PCRF entity sends session information to the PCEFa entity and the PCEFb entity.

The PCEFa entity performs mobility registration or creates a bearer with the PCEFb entity, and the PCRF entity formulates PCC rule(s) for the IP-CAN session, and submits the IP-CAN session information and the formulated PCC rule(s) to the PCEFa entity and the PCEFb entity.

Further, before step 11, the PCEFa entity may receive an IP-CAN session creation request. After step 14, the PCEFa entity may return an IP-CAN session creation response.

If the IP-CAN session employs an online charging mode, the method in this embodiment may further include a credit authorization step, in which the PCEFa entity and the PCEFb entity request relevant charging credit from the OCS.

According to the method for creating an IP-CAN session in this embodiment, the PCRF may formulate PCC rule(s) for the IP-CAN session, and provide information of the IP-CAN session and the formulated PCC rule(s) to the PCEFa entity and the PCEFb entity. In this way, an IP-CAN session may be created in the new architecture.

In the process of creating an IP-CAN session in an embodiment of the present disclosure, the PCRF and the OCS may deliver the event trigger and the credit re-authorization trigger related to this IP-CAN session to the PCEF. In the new PCC architecture, such triggers are divided into two parts, which are delivered to the PCEFa and the PCEFb respectively. For example, the triggers related to the bearer are delivered to the PCEFa, and the triggers unrelated to the bearer are delivered to the PCEFb. In the new PCC roaming architecture shown in FIG. 4, such triggers are divided into three parts, which are delivered to the PCEFa, vPCEFb1, and hPCEFb2 respectively. For example, the triggers related to the bearer are delivered to the PCEFa, the triggers unrelated to the bearer are delivered to the PCEFb1 and PCEFb2.

In the PCC roaming architecture shown in FIG. 4, the vEPS HA entity in the visited network may be capable of judging. That is, when the vEPS HA receives a mobility Registration Request sent by the PCEFa entity, or a bearer creation request sent by the PCEFa entity, or a Gx session creation request sent by the vPCRF entity, the vEPS HA may choose whether to send or not to send a Gx session creation request (response) to the vPCRF according to the preconfiguration.

Embodiment 1

Figure 6:
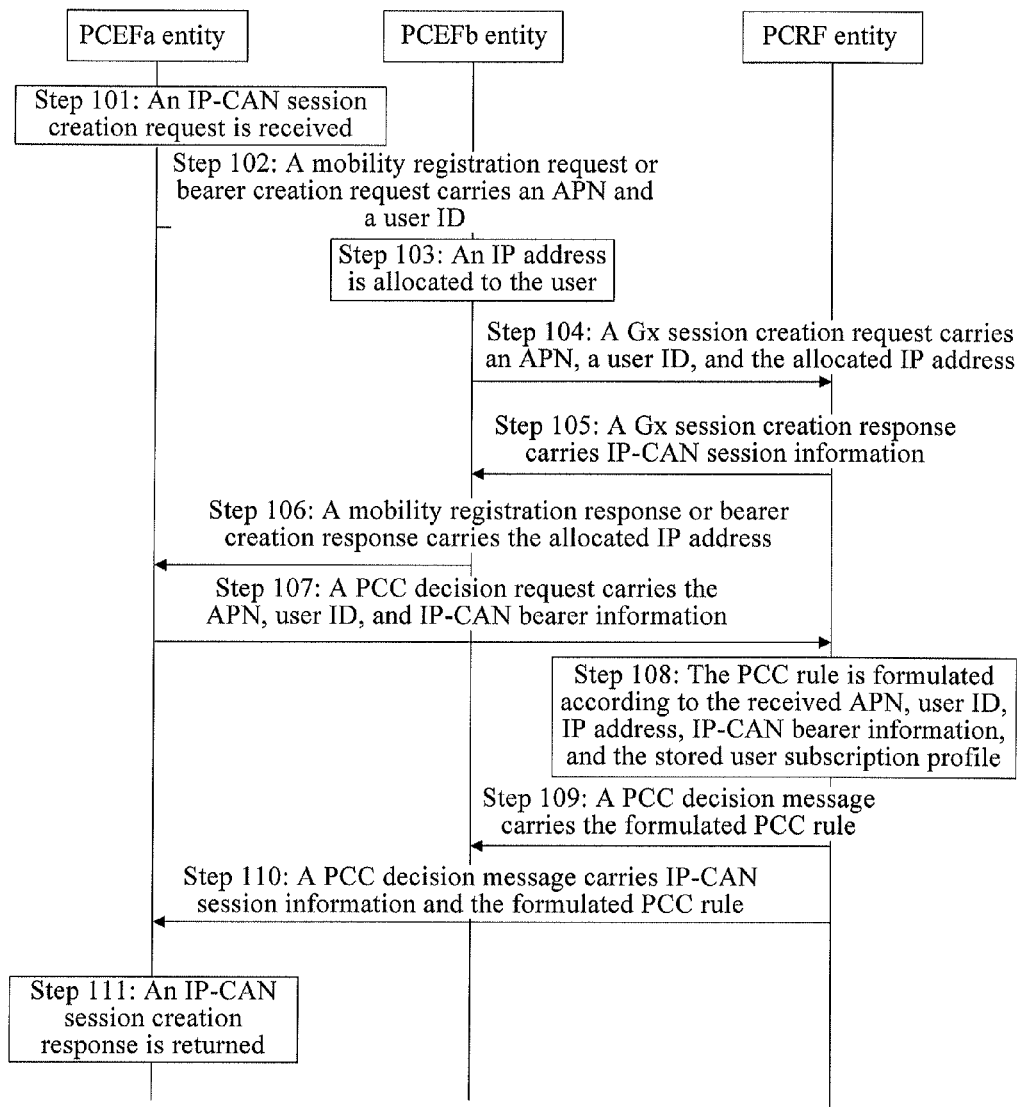
FIG. 6 is a schematic flowchart of a method for creating an IP-CAN session in the first embodiment of the present disclosure.

FIG. 6 is a schematic flowchart of a method for creating an IP-CAN session in the first embodiment of the present disclosure. Through the method for creating an IP-CAN session in this embodiment, an IP-CAN session may be created in a new PCC architecture shown in FIG. 2. As shown in FIG. 6, the method for creating an IP-CAN session in this embodiment includes the following steps 101-111.

Step 101: The PCEFa entity receives an IP-CAN session creation request.

Step 102: The PCEFa entity sends a mobility Registration Request or bearer creation request that carries an Access Point Name (APN) and a user identifier (user ID) to the PCEFb entity.

Step 103: The PCEFb entity allocates an IP address to the user.

Step 104: The PCEFb entity sends a Gx session creation request that carries an APN, a user ID, and the allocated IP address to the PCRF entity.

Step 105: The PCRF entity sends a Gx session creation response that carries IP-CAN session information to the PCEFb entity.

Step 106: The PCEFb entity sends a mobility registration response or bearer creation response that carries the allocated IP address to the PCEFa entity.

Step 107: The PCEFa entity sends a PCC decision request that carries the APN, user ID, and IP-CAN bearer information to the PCRF entity.

Step 108: The PCRF entity formulates PCC rule(s) according to the received APN, user ID, IP address, IP-CAN bearer information, and the stored user subscription profile.

Step 109: The PCRF entity sends a PCC decision message that carries the formulated PCC rule(s) to the PCEFb entity.

Step 110: The PCRF entity sends a PCC decision message that carries IP-CAN session information and the formulated PCC rule(s) to the PCEFa entity.

Step 111: The PCEFa entity returns an IP-CAN session creation response.

The IP-CAN session creation request received by the PCEFa entity in step 101 may be a GPRS Tunneling Protocol (GTP) message, or a trigger message unrelated to the 3G network. The mobility Registration Request sent by the PCEFa entity to the PCEFb entity in step 102 may be a Proxy Binding Update message, or Registration Request message, or other mobility IP Registration Request message. The IP-CAN session information sent in step 105 and step 110 may be an OCS/OFCS address, or a default charging mode. The PCC decision message sent by the PCRF entity to the PCEFb entity in step 109 may further carry bearer-unrelated event triggers. The PCC decision message sent by the PCRF entity to the PCEFa entity in step 110 may further carry bearer-related event triggers.

Besides, if the PCRF entity does not store the user subscription profile, an additional step occurs between step 104 and step 105 of the method, and the additional step is: The PCRF entity obtains user subscription profile from the SPR entity and stores the user subscription profile. If the IP-CAN session employs an online charging mode, an additional step occurs between step 110 and step 111 of the method, and the additional step is credit authorization, namely, the PCEFa and the PCEFb request the relevant charging credit from the OCS. If the IP-CAN session employs a network control mode, an additional step occurs between step 110 and step 111 of the method, and the additional step is: The PCEFa initiates creation of an IP-CAN bearer.

In FIG. 6, the sequence of step 109 and step 110 is not fixed.

Therefore, according to the method for creating an IP-CAN session in the first embodiment of the present disclosure, the PCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 2

Figure 7:
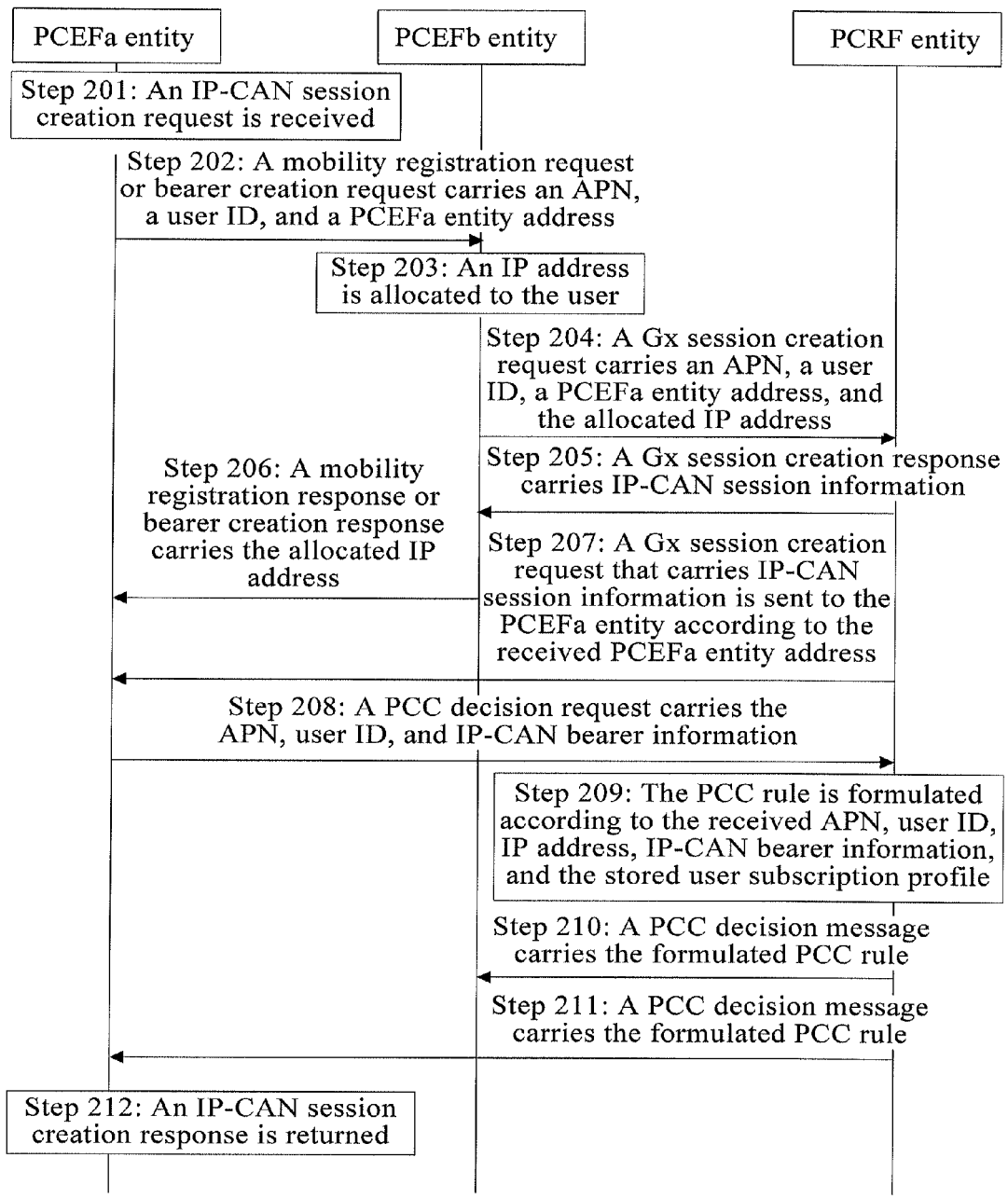
FIG. 7 is a schematic flowchart of a method for creating an IP-CAN session in the second embodiment of the present disclosure.

FIG. 7 is a schematic flowchart of a method for creating an IP-CAN session in the second embodiment of the present disclosure. Through the method for creating an IP-CAN session in this embodiment, an IP-CAN session may be created in a new PCC architecture shown in FIG. 2. As shown in FIG. 7, the method for creating an IP-CAN session in this embodiment includes the following steps 201-212.

Step 201: The PCEFa entity receives an IP-CAN session creation request.

Step 202: The PCEFa entity sends a mobility Registration Request or bearer creation request that carries an APN, a user ID and the PCEFa entity's address to the PCEFb entity.

Step 203: The PCEFb entity allocates an IP address to the user.

Step 204: The PCEFb entity sends a Gx session creation request that carries an APN, a user ID, the PCEFa entity's address, and the allocated IP address to the PCRF entity.

Step 205: The PCRF entity sends a Gx session creation response that carries IP-CAN session information to the PCEFb entity.

Step 206: The PCEFb entity sends a mobility registration response or bearer creation response that carries the allocated IP address to the PCEFa entity.

Step 207: The PCRF entity sends a Gx session creation request that carries IP-CAN session information to the PCEFa entity according to the received PCEFa entity's address.

Step 208: The PCEFa entity sends a PCC decision request that carries the APN, user ID, and IP-CAN bearer information to the PCRF entity.

Step 209: The PCRF entity formulates PCC rule(s) according to the received APN, user ID, IP address, IP-CAN bearer information, and the stored user subscription profile.

Step 210: The PCRF entity sends a PCC decision message that carries the formulated PCC rule(s) to the PCEFb entity.

Step 211: The PCRF entity sends a PCC decision message that carries the formulated PCC rule(s) to the PCEFa entity.

Step 212: The PCEFa entity returns an IP-CAN session creation response.

The IP-CAN session creation request received by the PCEFa entity in step 201 may be a GTP message, or a trigger message unrelated to the 3G network. The mobility Registration Request sent by the PCEFa entity to the PCEFb entity in step 202 may be a Proxy Binding Update message, or Registration Request message, or other mobility IP Registration Request message. The IP-CAN session information sent in step 205 and step 207 may be an OCS/OFCS address, or a default charging mode. The PCC decision message sent by the PCRF entity to the PCEFb entity in step 210 may further carry bearer-unrelated event triggers. The PCC decision message sent by the PCRF entity to the PCEFa entity in step 211 may further carry bearer-related event triggers.

Besides, if the PCRF entity does not store the user subscription profile, an additional step occurs between step 204 and step 205 of the method, and the additional step is: The PCRF entity obtains user subscription profile from the SPR entity and stores the user subscription profile. If the IP-CAN session employs an online charging mode, an additional step occurs between step 211 and step 212 of the method, and the additional step is credit authorization, namely, the PCEFa and the PCEFb request the relevant charging credit from the OCS. If the IP-CAN session employs a network control mode, an additional step occurs between step 211 and step 212 of the method, and the additional step is: The PCEFa initiates creation of an IP-CAN bearer. An additional step may occur between step 207 and step 208, and the additional step is: The PCEFa entity sends a Gx session creation response to the PCRF entity.

In FIG. 7, the sequence of step 205 and step 110 is not fixed, and the sequence of step 210 and step 211 is not fixed.

Therefore, according to the method for creating an IP-CAN session in the second embodiment of the present disclosure, the PCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 3

Figure 8:
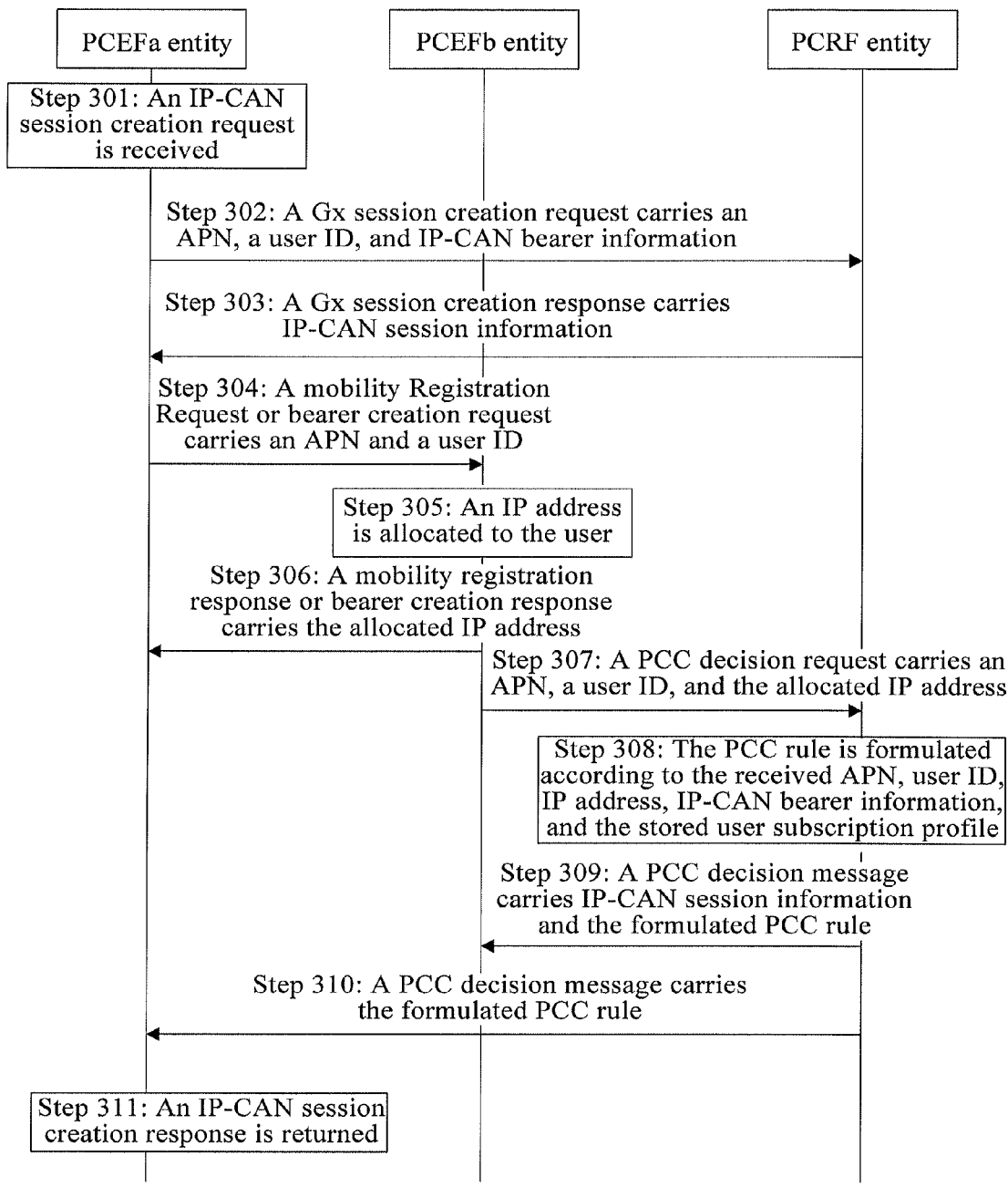
FIG. 8 is a schematic flowchart of a method for creating an IP-CAN session in the third embodiment of the present disclosure.

FIG. 8 is a schematic flowchart of a method for creating an IP-CAN session in the third embodiment of the present disclosure. Through the method for creating an IP-CAN session in this embodiment, an IP-CAN session may be created in a new PCC architecture shown in FIG. 2. As shown in FIG. 8, the method for creating an IP-CAN session in this embodiment includes the following steps 301-311.

Step 301: The PCEFa entity receives an IP-CAN session creation request.

Step 302: The PCEFa entity sends a Gx session creation request that carries an APN, a user ID, and an IP-CAN bearer information to the PCRF entity.

Step 303: The PCRF entity sends a Gx session creation response that carries IP-CAN session information to the PCEFa entity.

Step 304: The PCEFa entity sends a mobility Registration Request or bearer creation request that carries the APN and the user ID to the PCEFb entity.

Step 305: The PCEFb entity allocates an IP address to the user.

Step 306: The PCEFb entity sends a mobility registration response or a bearer creation response that carries the allocated IP address to the PCEFa entity.

Step 307: The PCEFb entity sends a PCC decision request that carries an APN, a user ID, and the allocated IP address to the PCRF entity.

Step 308: The PCRF entity formulates PCC rule(s) according to the received APN, user ID, IP address, IP-CAN bearer information, and the stored user subscription profile.

Step 309: The PCRF entity sends a PCC decision message that carries IP-CAN session information and the formulated PCC rule(s) to the PCEFb entity.

Step 310: The PCRF entity sends a PCC decision message that carries the formulated PCC rule(s) to the PCEFa entity.

Step 312: The PCEFa entity returns an IP-CAN session creation response.

The IP-CAN session creation request received by the PCEFa entity in step 301 may be a GTP message, or a trigger message unrelated to the 3G network. The mobility Registration Request sent by the PCEFa entity to the PCEFb entity in step 304 may be a Proxy Binding Update message, or Registration Request message, or other mobility IP Registration Request message. The IP-CAN session information sent in step 303 and step 309 may be an OCS/OFCS address, or a default charging mode. The PCC decision message sent by the PCRF entity to the PCEFb entity in step 309 may further carry bearer-unrelated event triggers. The PCC decision message sent by the PCRF entity to the PCEFa entity in step 310 may further carry bearer-related event triggers.

Besides, if the PCRF entity does not store the user subscription profile, an additional step occurs between step 302 and step 303 of the method, and the additional step is: The PCRF entity obtains user subscription profile from the SPR entity and stores the user subscription profile. If the IP-CAN session employs an online charging mode, an additional step occurs between step 310 and step 311 of the method, and the additional step is credit authorization, namely, the PCEFa and the PCEFb request the relevant charging credit from the OCS. If the IP-CAN session employs a network control mode, an additional step occurs between step 310 and step 311 of the method, and the additional step is: The PCEFa initiates creation of an IP-CAN bearer.

In FIG. 8, the sequence of step 306 and step 307 is not fixed, and the sequence of step 309 and step 310 is not fixed Therefore, according to the method for creating an IP-CAN session in the third embodiment of the present disclosure, the PCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 4

Figure 9:
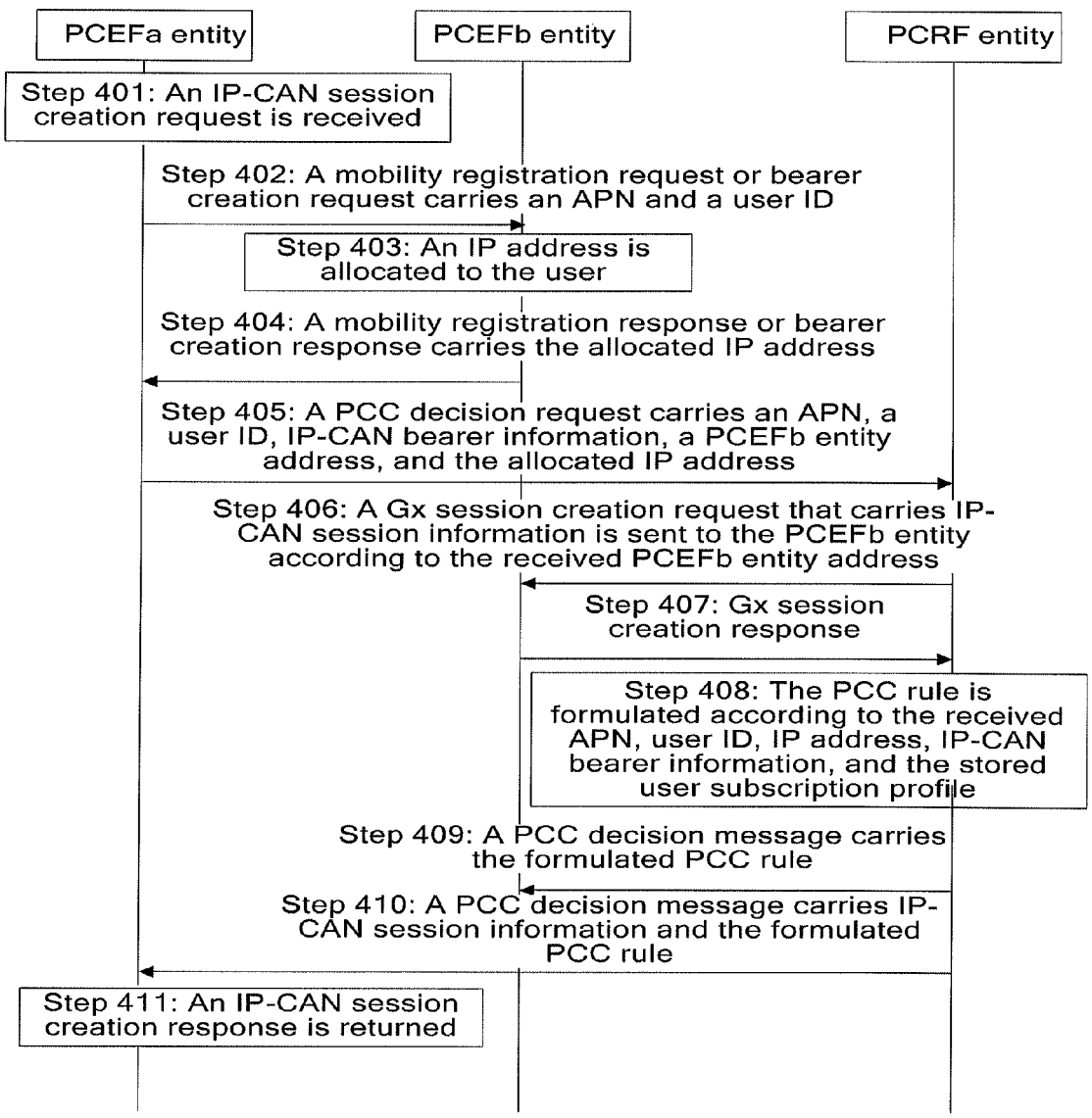
FIG. 9 is a schematic flowchart of a method for creating an IP-CAN session in the fourth embodiment of the present disclosure.

FIG. 9 is a schematic flowchart of a method for creating an IP-CAN session in the fourth embodiment of the present disclosure. Through the method for creating an IP-CAN session in this embodiment, an IP-CAN session may be created in a new PCC architecture shown in FIG. 2. As shown in FIG. 9, the method for creating an IP-CAN session in this embodiment includes the following steps 401-411.

Step 401: The PCEFa entity receives an IP-CAN session creation request.

Step 402: The PCEFa entity sends a mobility Registration Request or bearer creation request that carries an APN and a user ID to the PCEFb entity.

Step 403: The PCEFb entity allocates an IP address to the user.

Step 404: The PCEFb entity sends a mobility registration response or bearer creation response that carries the allocated IP address to the PCEFa entity.

Step 405: The PCEFa entity sends a PCC decision request that carries the APN, user ID, IP-CAN bearer information, PCEFb entity's address and the allocated IP address to the PCRF entity.

Step 406: The PCRF entity sends a Gx session creation request that carries IP-CAN session information to the PCEFb entity according to the received PCEFb entity's address.

Step 407: The PCEFb entity sends a Gx session creation response to the PCRF entity.

Step 408: The PCRF entity formulates PCC rule(s) according to the received APN, user ID, IP address, IP-CAN bearer information, and the stored user subscription profile.

Step 409: The PCRF entity sends a PCC decision message that carries the formulated PCC rule(s) to the PCEFb entity.

Step 410: The PCRF entity sends a PCC decision message that carries IP-CAN session information and the formulated PCC rule(s) to the PCEFa entity.

Step 411: The PCEFa entity returns an IP-CAN session creation response.

The IP-CAN session creation request received by the PCEFa entity in step 401 may be a GTP message, or a trigger message unrelated to the 3G network. The mobility Registration Request sent by the PCEFa entity to the PCEFb entity in step 402 may be a Proxy Binding Update message, or Registration Request message, or other mobility IP Registration Request message. The IP-CAN session information sent in step 406 and step 410 may be an OCS/OFCS address, or a default charging mode. The PCC decision message sent by the PCRF entity to the PCEFb entity in step 409 may further carry bearer-unrelated event triggers. The PCC decision message sent by the PCRF entity to the PCEFa entity in step 410 may further carry bearer-related event triggers.

Besides, if the PCRF entity does not store the user subscription profile, an additional step occurs between step 405 and step 406 of the method, and the additional step is: The PCRF entity obtains user subscription profile from the SPR entity and stores the user subscription profile. If the IP-CAN session employs an online charging mode, an additional step occurs between step 410 and step 411 of the method, and the additional step is credit authorization, namely, the PCEFa and the PCEFb request the relevant charging credit from the OCS. If the IP-CAN session employs a network control mode, an additional step occurs between step 410 and step 411 of the method, and the additional step is: The PCEFa initiates creation of an IP-CAN bearer.

In FIG. 9, the sequence of step 409 and step 410 is not fixed.

Therefore, according to the method for creating an IP-CAN session in the fourth embodiment of the present disclosure, the PCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 5

Figure 10:
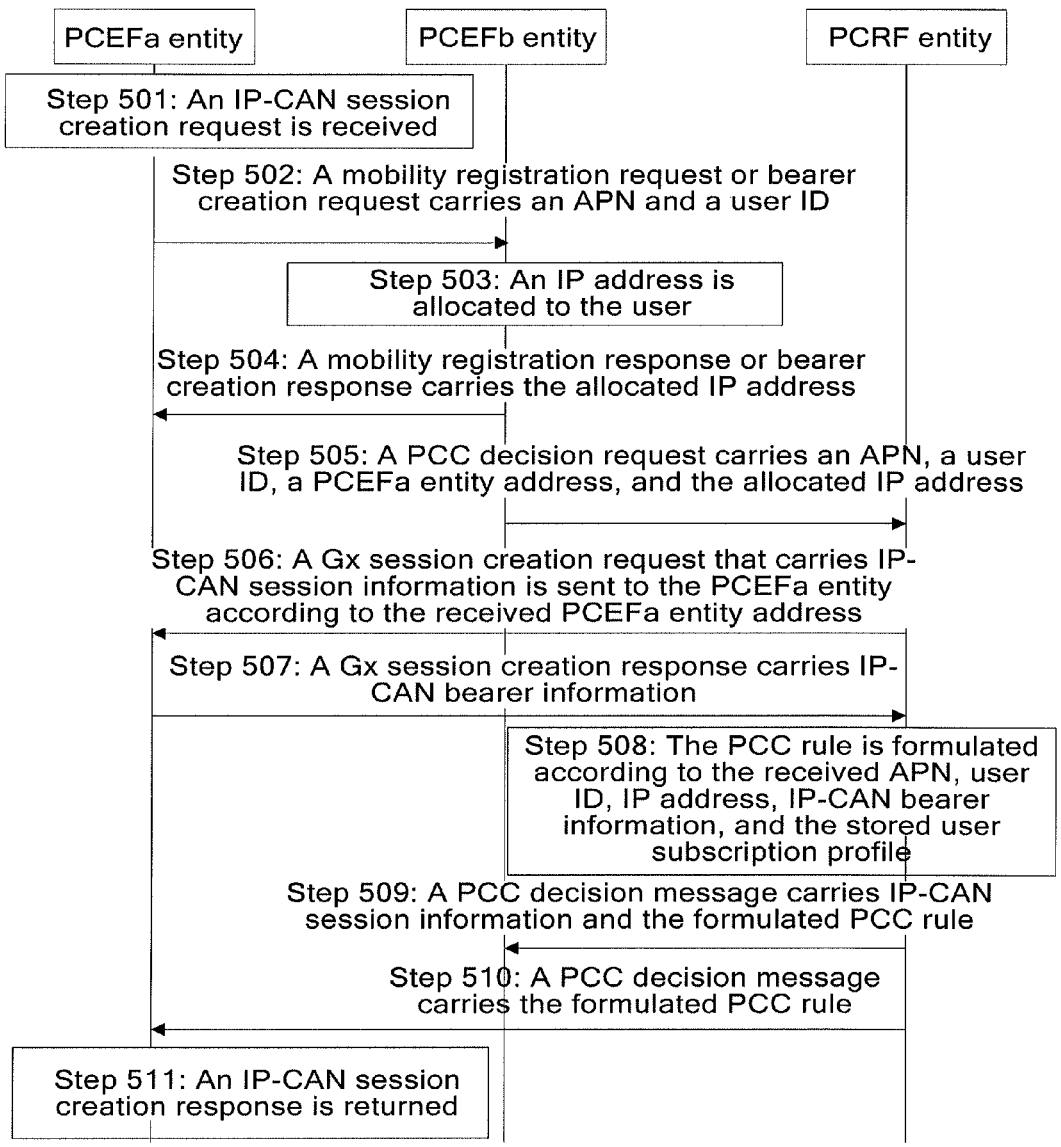
FIG. 10 is a schematic flowchart of a method for creating an IP-CAN session in the fifth embodiment of the present disclosure.

FIG. 10 is a schematic flowchart of a method for creating an IP-CAN session in the fifth embodiment of the present disclosure. Through the method for creating an IP-CAN session in this embodiment, an IP-CAN session may be created in a new PCC architecture shown in FIG. 2. As shown in FIG. 10, the method for creating an IP-CAN session in this embodiment includes the following steps 501-511.

Step 501: The PCEFa entity receives an IP-CAN session creation request.

Step 502: The PCEFa entity sends a mobility Registration Request or bearer creation request that carries an APN and a user ID to the PCEFb entity.

Step 503: The PCEFb entity allocates an IP address to the user.

Step 504: The PCEFb entity sends a mobility registration response or bearer creation response that carries the allocated IP address to the PCEFa entity.

Step 505: The PCEFb entity sends a PCC decision request that carries an APN, a user ID, the PCEFa entity's address, and the allocated IP address to the PCRF entity.

Step 506: The PCRF entity sends a Gx session creation request that carries IP-CAN session information to the PCEFa entity according to the received PCEFa entity's address.

Step 507: The PCEFa entity sends a Gx session creation response that carries IP-CAN bearer information to the PCRF entity.

Step 508: The PCRF entity formulates PCC rule(s) according to the received APN, user ID, IP address, IP-CAN bearer information, and the stored user subscription profile.

Step 509: The PCRF entity sends a PCC decision message that carries IP-CAN session information and the formulated PCC rule(s) to the PCEFb entity.

Step 510: The PCRF entity sends a PCC decision message that carries the formulated PCC rule(s) to the PCEFa entity.

Step 511: The PCEFa entity returns an IP-CAN session creation response.

The IP-CAN session creation request received by the PCEFa entity in step 501 may be a GTP message, or a trigger message unrelated to the 3G network. The mobility Registration Request sent by the PCEFa entity to the PCEFb entity in step 502 may be a Proxy Binding Update message, or Registration Request message, or other mobility IP Registration Request message. The IP-CAN session information sent in step 506 and step 509 may be an OCS/OFCS address, or a default charging mode. The PCC decision message sent by the PCRF entity to the PCEFb entity in step 509 may further carry bearer-unrelated event triggers. The PCC decision message sent by the PCRF entity to the PCEFa entity in step 510 may further carry bearer-related event triggers.

Besides, if the PCRF entity does not store the user subscription profile, an additional step occurs between step 505 and step 506 of the method, and the additional step is: The PCRF entity obtains user subscription profile from the SPR entity and stores the user subscription profile. If the IP-CAN session employs an online charging mode, an additional step occurs between step 510 and step 511 of the method, and the additional step is credit authorization, namely, the PCEFa and the PCEFb request the relevant charging credit from the OCS. If the IP-CAN session employs a network control mode, an additional step occurs between step 510 and step 511 of the method, and the additional step is: The PCEFa initiates creation of an IP-CAN bearer.

In FIG. 10, the sequence of step 504 and step 505 is not fixed, and the sequence of step 509 and step 510 is not fixed Therefore, according to the method for creating an IP-CAN session in the fifth embodiment of the present disclosure, the PCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Figure 11:
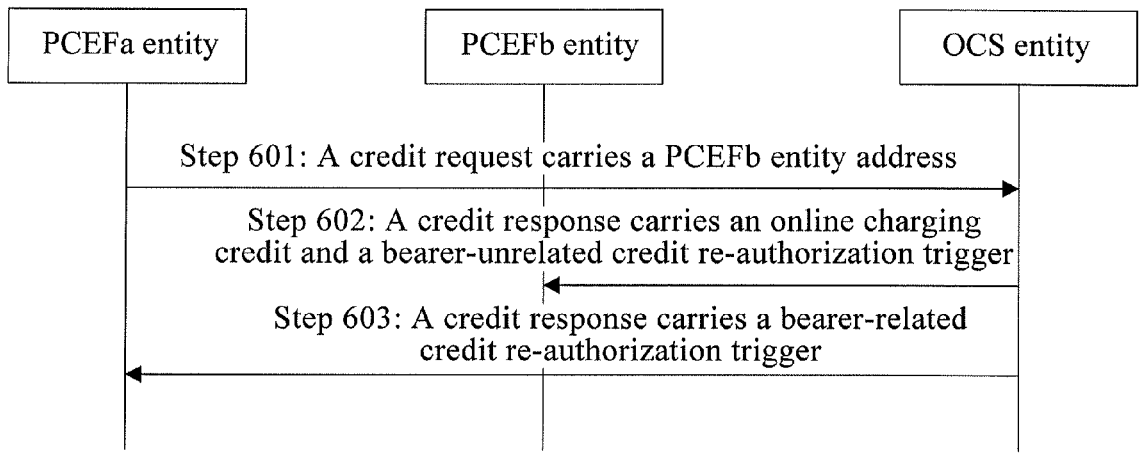
FIG. 11 schematically illustrates the first embodiment of the process of credit authorization in the present disclosure.
Figure 12:
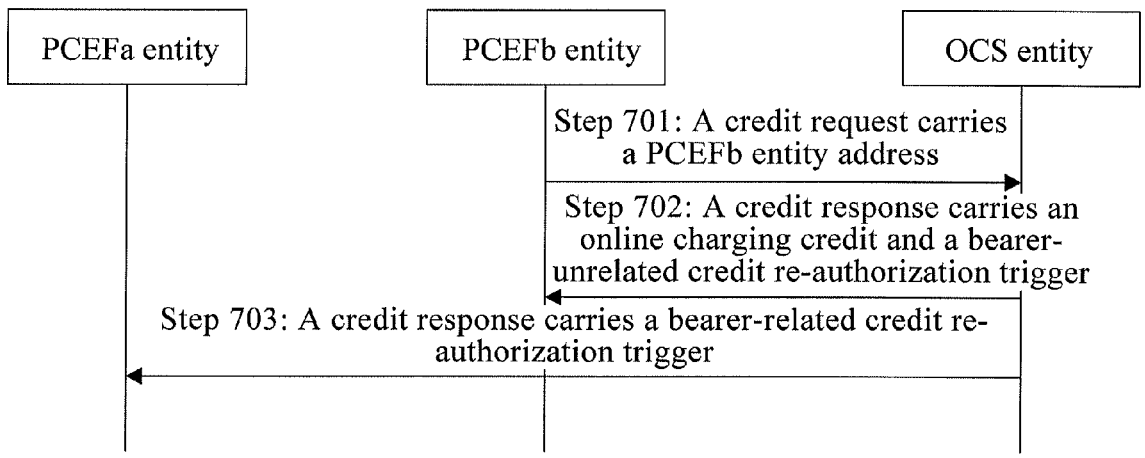
FIG. 12 schematically illustrates the second embodiment of the process of credit authorization in the present disclosure.
Figure 13:
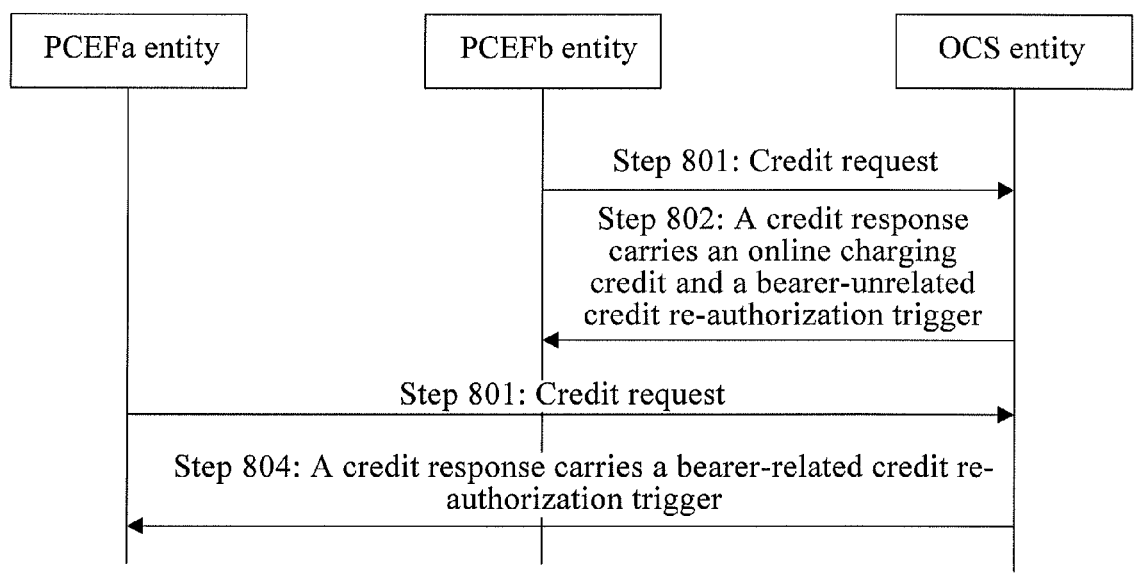
FIG. 13 schematically illustrates the third embodiment of the process of credit authorization in the present disclosure.

The credit authorization process in embodiments 1-5, namely, the process in which the PCEFa and the PCEFb request the relevant charging credit from the OCS, may be the same as the credit authorization process in FIG. 11, FIG. 12, or FIG. 13.

FIG. 11 is a flowchart of the first process of credit authorization in this embodiment. As shown in FIG. 11, the first process of credit authorization in this embodiment includes the following steps 601-603:

Step 601: The PCEFa entity sends a credit request that carries a PCEFb entity's address to an OCS entity.

Step 602: According to the received PCEFb entity's address, the OCS entity sends a credit response to the PCEFb entity, where the credit response carries an online charging credit and a bearer-unrelated credit re-authorization trigger.

Step 603: The OCS entity sends a credit response that carries a bearer-related credit re-authorization trigger to the PCEFa entity.

The sequence of step 602 and step 603 is not fixed.

FIG. 12 is a flowchart of the second process of credit authorization in this embodiment. As shown in FIG. 12, the second process of credit authorization in this embodiment includes the following steps 701-703:

Step 701: The PCEFb entity sends a credit request that carries a PCEFa entity's address to an OCS entity.

Step 702: The OCS entity sends a credit response that carries an online charging credit and a bearer-unrelated credit re-authorization trigger to the PCEFb entity.

Step 703: The OCS entity sends a credit response that carries a bearer-related credit re-authorization trigger to the PCEFa entity according to the received PCEFa entity's address.

The sequence of step 702 and step 703 is not fixed.

FIG. 13 is a schematic flowchart of the third process of credit authorization in this embodiment. As shown in FIG. 13, the third process of credit authorization in this embodiment includes the following steps 801-804:

Step 801: The PCEFb entity sends a credit request to an OCS entity.

Step 802: The OCS entity sends a credit response that carries an online charging credit and a bearer-unrelated credit re-authorization trigger to the PCEFb entity.

Step 803: The PCEFa entity sends a credit request to the OCS entity.

Step 804: The OCS entity sends a credit response that carries a bearer-related credit re-authorization trigger to the PCEFa entity.

The sequence of step 801 and step 802, and the sequence of step 803 and step 804 are not fixed.

Embodiment 6

Figure 14:
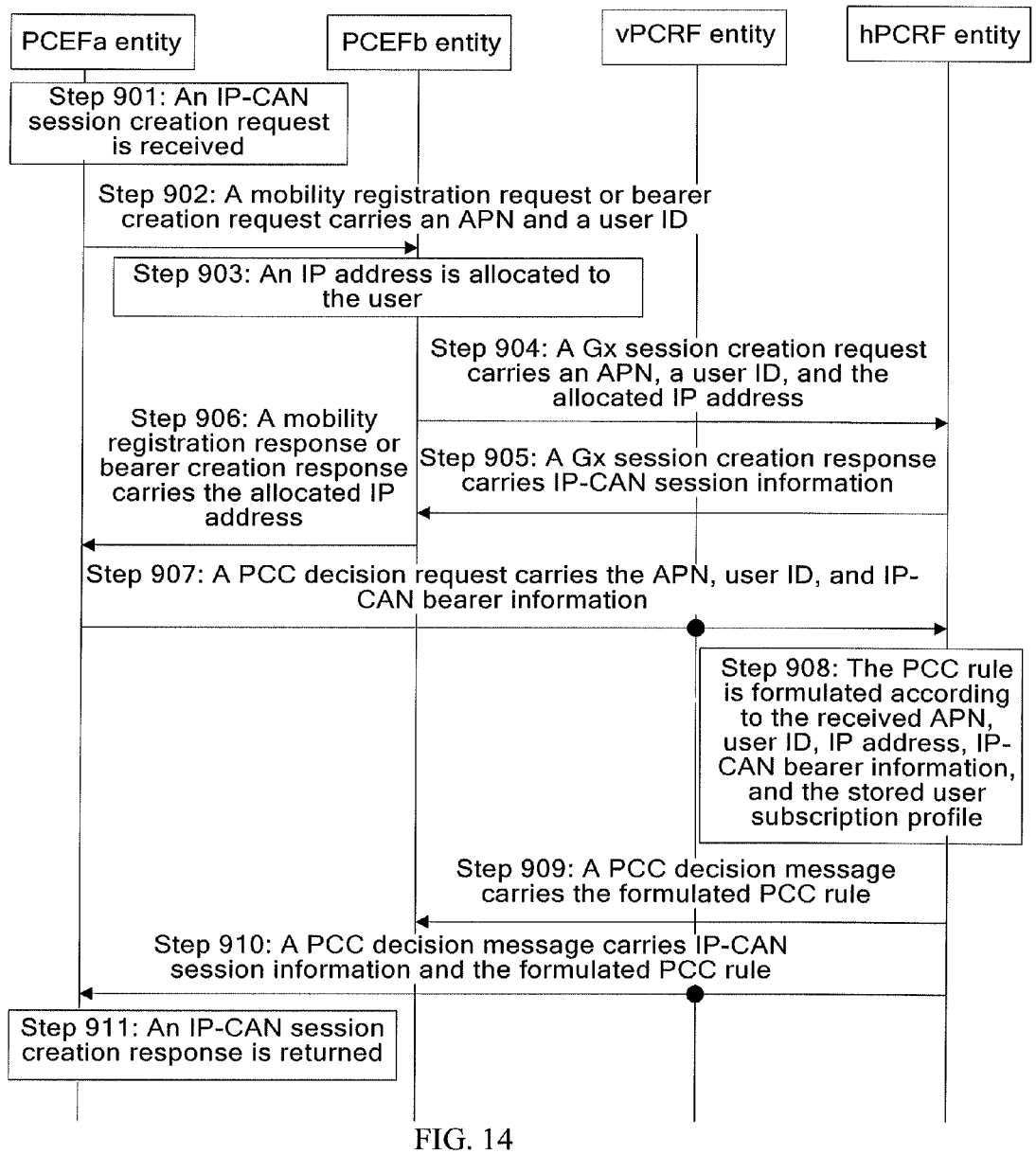
FIG. 14 is a schematic flowchart of a method for creating an IP-CAN session in the sixth embodiment of the present disclosure.

FIG. 14 is a schematic flowchart of a method for creating an IP-CAN session in the sixth embodiment of the present disclosure. Through the method for creating an IP-CAN session in this embodiment, an IP-CAN session may be created in a new PCC architecture in the first roaming scenario shown in FIG. 3. As shown in FIG. 14, the method for creating an IP-CAN session in this embodiment includes the following steps 901-911.

Step 901: The PCEFa entity receives an IP-CAN session creation request.

Step 902: The PCEFa entity sends a mobility Registration Request or bearer creation request that carries an APN and a user ID to the PCEFb entity.

Step 903: The PCEFb entity allocates an IP address to the user.

Step 904: The PCEFb entity sends a Gx session creation request that carries an APN, a user ID, and the allocated IP address to an hPCRF entity.

Step 905: The hPCRF entity sends a Gx session creation response that carries IP-CAN session information to the PCEFb entity.

Step 906: The PCEFb entity sends a mobility registration response or bearer creation response that carries the allocated IP address to the PCEFa entity.

Step 907: Through a vPCRF entity, the PCEFa entity sends a PCC decision request that carries the APN, user ID, and IP-CAN bearer information to the hPCRF entity.

Step 908: The hPCRF entity formulates PCC rule(s) according to the received APN, user ID, IP address, IP-CAN bearer information, and the stored user subscription profile.

Step 909: The hPCRF entity sends a PCC decision message that carries the formulated PCC rule(s) to the PCEFb entity.

Step 910: Through the vPCRF entity, the hPCRF entity sends a PCC decision message that carries IP-CAN session information and the formulated PCC rule(s) to the PCEFa entity.

Step 911: The PCEFa entity returns an IP-CAN session creation response.

The IP-CAN session creation request received by the PCEFa entity in step 901 may be a GTP message, or a trigger message unrelated to the 3G network. The mobility Registration Request sent by the PCEFa entity to the PCEFb entity in step 902 may be a Proxy Binding Update message, or Registration Request message, or other mobility IP Registration Request message. The IP-CAN session information sent in step 905 and step 910 may be an OCS/OFCS address, or a default charging mode. The PCC decision message sent by the hPCRF entity to the PCEFb entity in step 909 may further carry bearer-unrelated event triggers. The PCC decision message sent by the hPCRF entity to the PCEFa entity in step 910 may further carry bearer-related event triggers.

Besides, if the hPCRF entity does not store the user subscription profile, an additional step occurs between step 904 and step 905 of the method, and the additional step is: The hPCRF entity obtains user subscription profile from the SPR entity and stores the user subscription profile. If the IP-CAN session employs an online charging mode, an additional step occurs between step 910 and step 911 of the method, and the additional step is credit authorization, namely, the PCEFa and the PCEFb request the relevant charging credit from the OCS. If the IP-CAN session employs a network control mode, an additional step occurs between step 910 and step 911 of the method, and the additional step is: The PCEFa initiates creation of an IP-CAN bearer.

In FIG. 14, the sequence of step 909 and step 910 is not fixed.

Besides, if the PCEFa entity and the PCEFb entity perform signaling transfer through a core network entity such as vEPS HA in the visited network in the new PCC architecture in the roaming scenario shown in FIG. 3, all messages between the PCEFa entity and the PCEFb entity in the method in the sixth embodiment are forwarded through this core network entity.

Therefore, according to the method for creating an IP-CAN session in the sixth embodiment of the present disclosure, the hPCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 7

Figure 15:
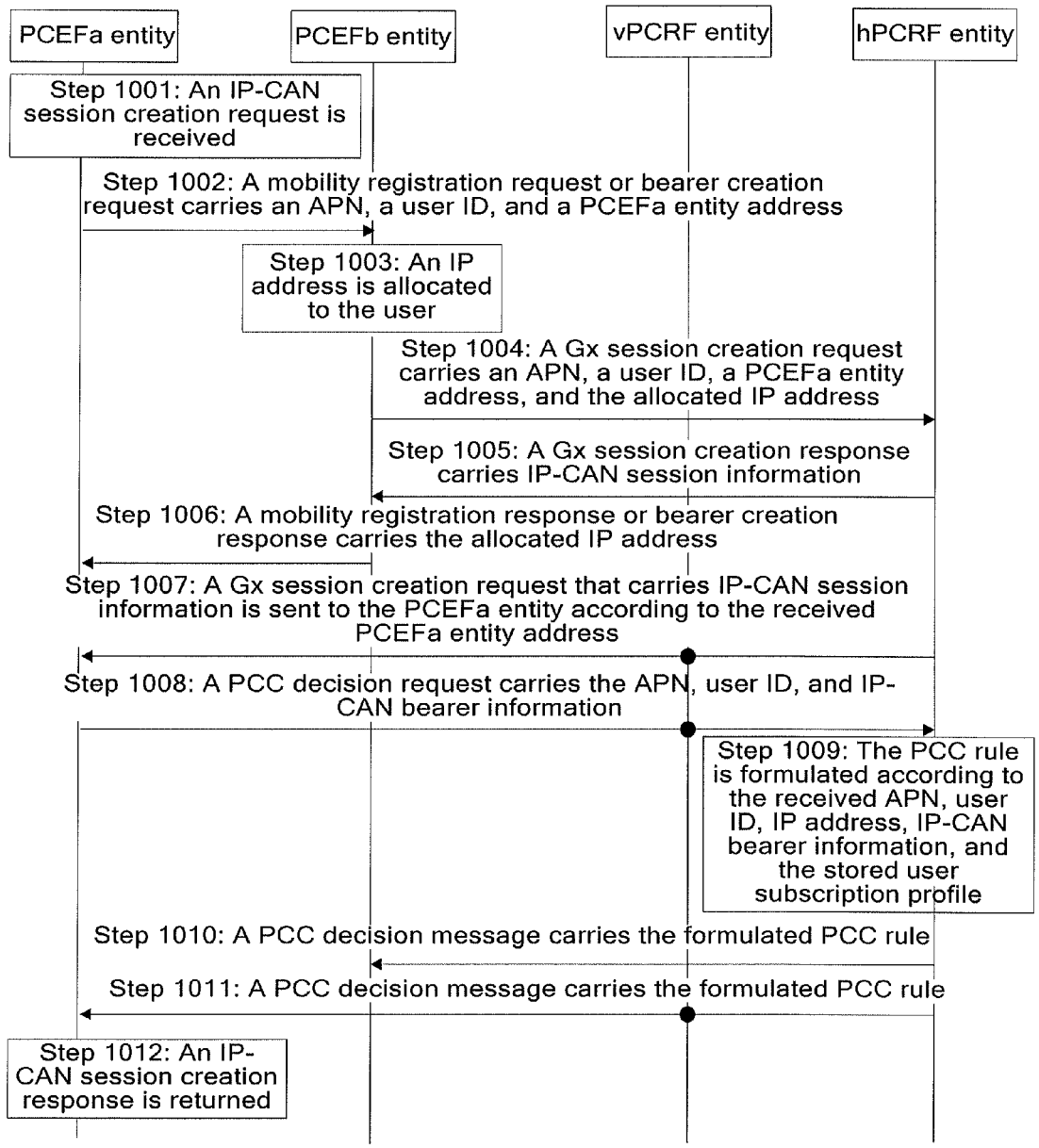
FIG. 15 is a schematic flowchart of a method for creating an IP-CAN session in the seventh embodiment of the present disclosure.

FIG. 15 is a schematic flowchart of a method for creating an IP-CAN session in the seventh embodiment of the present disclosure. Through the method for creating an IP-CAN session in this embodiment, an IP-CAN session may be created in a new PCC architecture in the first roaming scenario shown in FIG. 3. As shown in FIG. 15, the method for creating an IP-CAN session in this embodiment includes the following steps 1001-1012.

Step 1001: The PCEFa entity receives an IP-CAN session creation request.

Step 1002: The PCEFa entity sends a mobility Registration Request or bearer creation request that carries an APN, a user ID and the PCEFa entity's address to the PCEFb entity.

Step 1003: The PCEFb entity allocates an IP address to the user.

Step 1004: The PCEFb entity sends a Gx session creation request that carries an APN, a user ID, the PCEFa entity's address, and the allocated IP address to the hPCRF entity.

Step 1005: The hPCRF entity sends a Gx session creation response that carries IP-CAN session information to the PCEFb entity.

Step 1006: The PCEFb entity sends a mobility registration response or bearer creation response that carries the allocated IP address to the PCEFa entity.

Step 1007: Through the vPCRF entity, the hPCRF entity sends a Gx session creation request that carries IP-CAN session information to the PCEFa entity according to the received PCEFa entity's address.

Step 1008: Through a vPCRF entity, the PCEFa entity sends a PCC decision request that carries the APN, user ID, and IP-CAN bearer information to the hPCRF entity.

Step 1009: The hPCRF entity formulates PCC rule(s) according to the received APN, user ID, IP address, IP-CAN bearer information, and the stored user subscription profile.

Step 1010: The hPCRF entity sends a PCC decision message that carries the formulated PCC rule(s) to the PCEFb entity.

Step 1011: Through the vPCRF entity, the hPCRF entity sends a PCC decision message that carries the formulated PCC rule(s) to the PCEFa entity.

Step 1012: The PCEFa entity returns an IP-CAN session creation response.

The IP-CAN session creation request received by the PCEFa entity in step 1001 may be a GTP message, or a trigger message unrelated to the 3G network. The mobility Registration Request sent by the PCEFa entity to the PCEFb entity in step 1002 may be a Proxy Binding Update message, or Registration Request message, or other mobility IP Registration Request message. The IP-CAN session information sent in step 205 and step 207 may be an OCS/OFCS address, or a default charging mode. The PCC decision message sent by the hPCRF entity to the PCEFb entity in step 1010 may further carry bearer-unrelated event triggers. The PCC decision message sent by the hPCRF entity to the PCEFa entity in step 1011 may further carry bearer-related event triggers.

Besides, if the hPCRF entity does not store the user subscription profile, an additional step occurs between step 1004 and step 1005 of the method, and the additional step is: The hPCRF entity obtains user subscription profile from the SPR entity and stores the user subscription profile. If the IP-CAN session employs an online charging mode, an additional step occurs between step 1011 and step 1012 of the method, and the additional step is credit authorization, namely, the PCEFa and the PCEFb request the relevant charging credit from the OCS. If the IP-CAN session employs a network control mode, an additional step occurs between step 1011 and step 1012 of the method, and the additional step is: The PCEFa initiates creation of an IP-CAN bearer. An additional step may occur between step 1007 and step 1008, and the additional step is: The PCEFa entity sends a Gx session creation response to the hPCRF entity through a vPCRF entity.

In FIG. 15, the sequence of step 1005 and step 1007 is not fixed, and the sequence of step 1010 and step 1011 is not fixed.

Besides, if the PCEFa entity and the PCEFb entity perform signaling transfer through a core network entity such as vEPS HA in the visited network in the new PCC architecture in the roaming scenario shown in FIG. 3, all messages between the PCEFa entity and the PCEFb entity in the method in the sixth embodiment are forwarded through this core network entity.

Therefore, according to the method for creating an IP-CAN session in the seventh embodiment of the present disclosure, the hPCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 8

Figure 16:
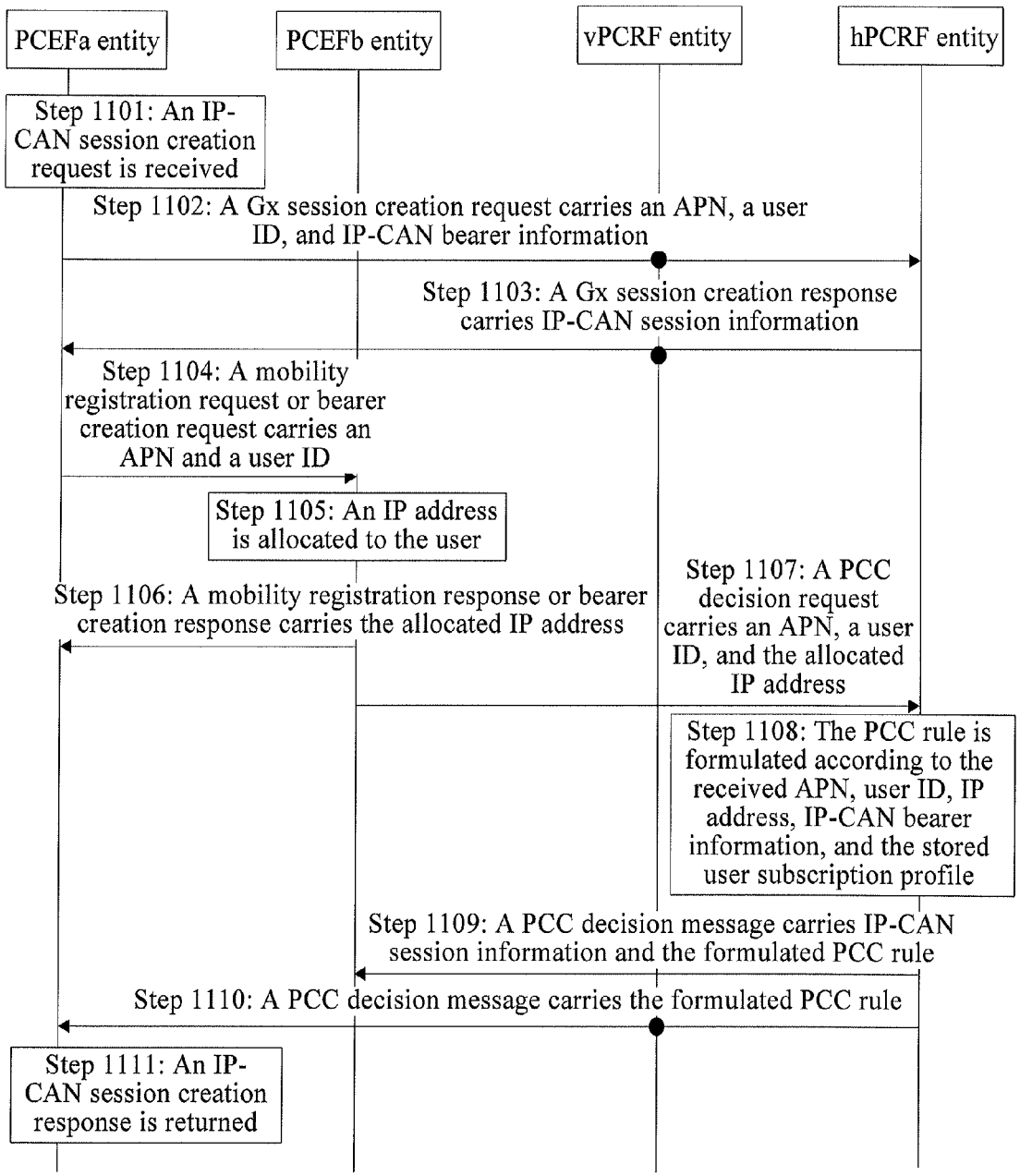
FIG. 16 is a schematic flowchart of a method for creating an IP-CAN session in the eighth embodiment of the present disclosure.

FIG. 16 is a schematic flowchart of a method for creating an IP-CAN session in the eighth embodiment of the present disclosure. Through the method for creating an IP-CAN session in this embodiment, an IP-CAN session may be created in a new PCC architecture in the first roaming scenario shown in FIG. 3. As shown in FIG. 16, the method for creating an IP-CAN session in this embodiment includes the following steps 1101-1111.

Step 1101: The PCEFa entity receives an IP-CAN session creation request.

Step 1102: Through a vPCRF entity, the PCEFa entity sends a Gx session creation request that carries an APN, a user ID, and IP-CAN bearer information to the hPCRF entity.

Step 1103: Through the vPCRF entity, the hPCRF entity sends a Gx session creation response that carries IP-CAN session information to the PCEFa entity.

Step 1104: The PCEFa entity sends a mobility Registration Request or bearer creation request that carries an APN and a user ID to the PCEFb entity.

Step 1105: The PCEFb entity allocates an IP address to the user.

Step 1106: The PCEFb entity sends a mobility registration response or bearer creation response that carries the allocated IP address to the PCEFa entity.

Step 1107: The PCEFb entity sends a PCC decision request that carries an APN, a user ID, and the allocated IP address to the hPCRF entity.

Step 1108: The hPCRF entity formulates PCC rule(s) according to the received APN, user ID, IP address, IP-CAN bearer information, and the stored user subscription profile.

Step 1109: The hPCRF entity sends a PCC decision message that carries IP-CAN session information and the formulated PCC rule(s) to the PCEFb entity.

Step 1110: Through the vPCRF entity, the hPCRF entity sends a PCC decision message that carries the formulated PCC rule(s) to the PCEFa entity.

Step 1111: The PCEFa entity returns an IP-CAN session creation response.

The IP-CAN session creation request received by the PCEFa entity in step 1101 may be a GTP message, or a trigger message unrelated to the 3G network. The mobility Registration Request sent by the PCEFa entity to the PCEFb entity in step 1104 may be a Proxy Binding Update message, or Registration Request message, or other mobility IP Registration Request message. The IP-CAN session information sent in step 1103 and step 1109 may be an OCS/OFCS address, or a default charging mode. The PCC decision message sent by the hPCRF entity to the PCEFb entity in step 1109 may further carry bearer-unrelated event triggers. The PCC decision message sent by the hPCRF entity to the PCEFa entity in step 1110 may further carry bearer-related event triggers.

Besides, if the hPCRF entity does not store the user subscription profile, an additional step occurs between step 1102 and step 1103 of the method, and the additional step is: The hPCRF entity obtains user subscription profile from the SPR entity and stores the user subscription profile. If the IP-CAN session employs an online charging mode, an additional step occurs between step 1110 and step 1111 of the method, and the additional step is credit authorization, namely, the PCEFa and the PCEFb request the relevant charging credit from the OCS. If the IP-CAN session employs a network control mode, an additional step occurs between step 1110 and step 1111 of the method, and the additional step is: The PCEFa initiates creation of an IP-CAN bearer.

In FIG. 16, the sequence of step 1106 and step 1107 is not fixed, and the sequence of step 1109 and step 1110 is not fixed Besides, if the PCEFa entity and the PCEFb entity perform signaling transfer through a core network entity such as vEPS HA in the visited network in the new PCC architecture in the roaming scenario shown in FIG. 3, all messages between the PCEFa entity and the PCEFb entity in the method in the sixth embodiment are forwarded through this core network entity.

Therefore, according to the method for creating an IP-CAN session in the eighth embodiment of the present disclosure, the hPCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 9

Figure 17:
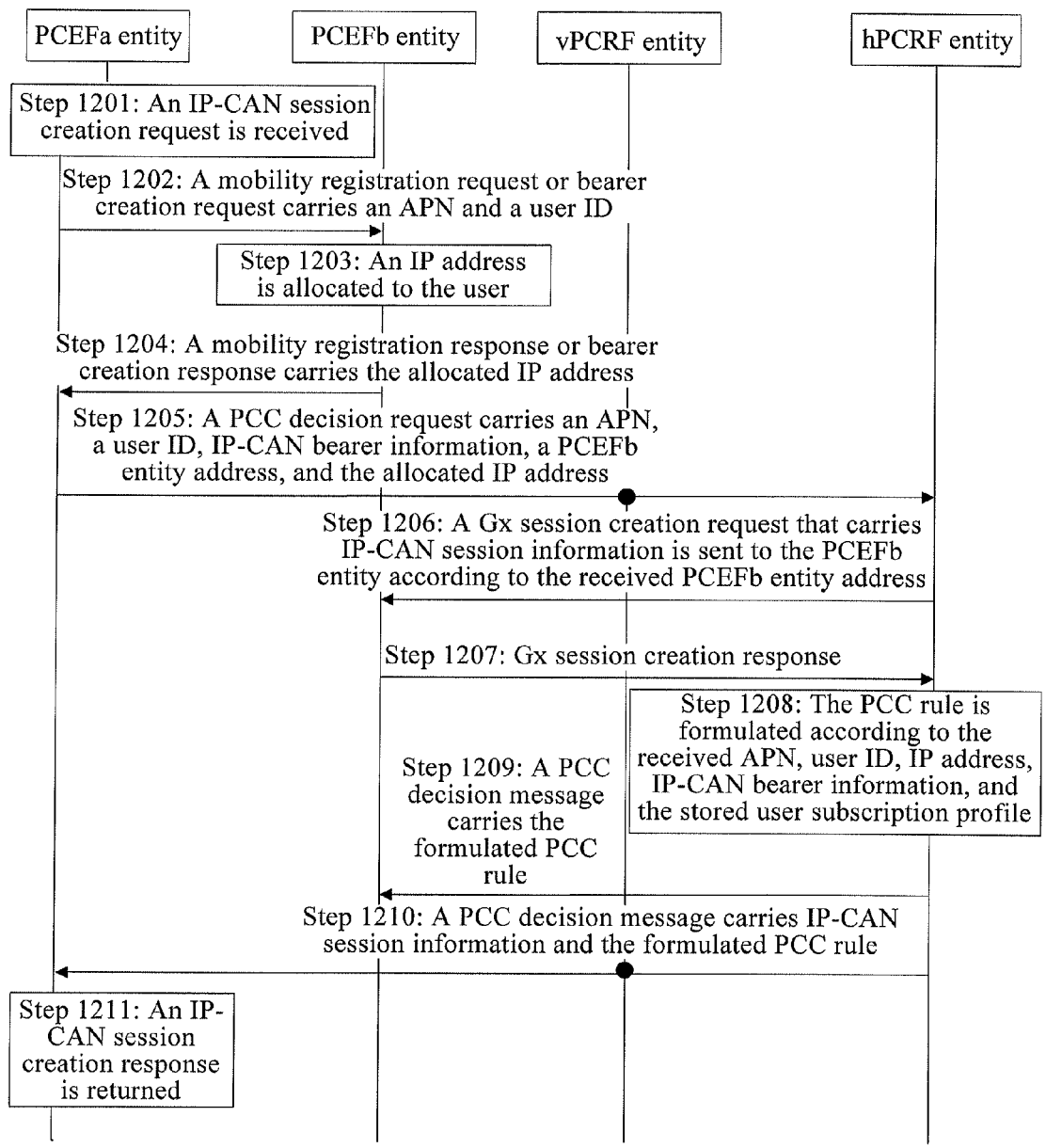
FIG. 17 is a schematic flowchart of a method for creating an IP-CAN session in the ninth embodiment of the present disclosure.

FIG. 17 is a schematic flowchart of a method for creating an IP-CAN session in the ninth embodiment of the present disclosure. Through the method for creating an IP-CAN session in this embodiment, an IP-CAN session may be created in a new PCC architecture in the first roaming scenario shown in FIG. 3. As shown in FIG. 17, the method for creating an IP-CAN session in this embodiment includes the following steps 1201-1211.

Step 1201: The PCEFa entity receives an IP-CAN session creation request.

Step 1202: The PCEFa entity sends a mobility Registration Request or bearer creation request that carries an APN and a user ID to the PCEFb entity.

Step 1203: The PCEFb entity allocates an IP address to the user.

Step 1204: The PCEFb entity sends a mobility registration response or bearer creation response that carries the allocated IP address to the PCEFa entity.

Step 1205: Through a vPCRF entity, the PCEFa entity sends a PCC decision request that carries the APN, user ID, IP-CAN bearer information, PCEFb entity's address and the allocated IP address to the hPCRF entity.

Step 1206: The hPCRF entity sends a Gx session creation request that carries IP-CAN session information to the PCEFb entity according to the received PCEFb entity's address.

Step 1207: The PCEFb entity sends a Gx session creation response to the hPCRF entity.

Step 1208: The hPCRF entity formulates PCC rule(s) according to the received APN, user ID, IP address, IP-CAN bearer information, and the stored user subscription profile.

Step 1209: The hPCRF entity sends a PCC decision message that carries the formulated PCC rule(s) to the PCEFb entity.

Step 1210: Through the vPCRF entity, the hPCRF entity sends a PCC decision message that carries IP-CAN session information and the formulated PCC rule(s) to the PCEFa entity.

Step 1211: The PCEFa entity returns an IP-CAN session creation response.

The IP-CAN session creation request received by the PCEFa entity in step 1201 may be a GTP message, or a trigger message unrelated to the 3G network. The mobility Registration Request sent by the PCEFa entity to the PCEFb entity in step 1202 may be a Proxy Binding Update message, or Registration Request message, or other mobility IP Registration Request message. The IP-CAN session information sent in step 1206 and step 1210 may be an OCS/OFCS address, or a default charging mode. The PCC decision message sent by the hPCRF entity to the PCEFb entity in step 1209 may further carry bearer-unrelated event triggers. The PCC decision message sent by the hPCRF entity to the PCEFa entity in step 1210 may further carry bearer-related event triggers.

Besides, if the hPCRF entity does not store the user subscription profile, an additional step occurs between step 1205 and step 1206 of the method, and the additional step is: The hPCRF entity obtains user subscription profile from the SPR entity and stores the user subscription profile. If the IP-CAN session employs an online charging mode, an additional step occurs between step 1210 and step 1211 of the method, and the additional step is credit authorization, namely, the PCEFa and the PCEFb request the relevant charging credit from the OCS. If the IP-CAN session employs a network control mode, an additional step occurs between step 1210 and step 1211 of the method, and the additional step is: The PCEFa initiates creation of an IP-CAN bearer.

In FIG. 17, the sequence of step 1209 and step 1210 is not fixed.

Besides, if the PCEFa entity and the PCEFb entity perform signaling transfer through a core network entity such as vEPS HA in the visited network in the new PCC architecture in the roaming scenario shown in FIG. 3, all messages between the PCEFa entity and the PCEFb entity in the method in the sixth embodiment are forwarded through this core network entity.

Therefore, according to the method for creating an IP-CAN session in the ninth embodiment of the present disclosure, the hPCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Embodiment 10

Figure 18:
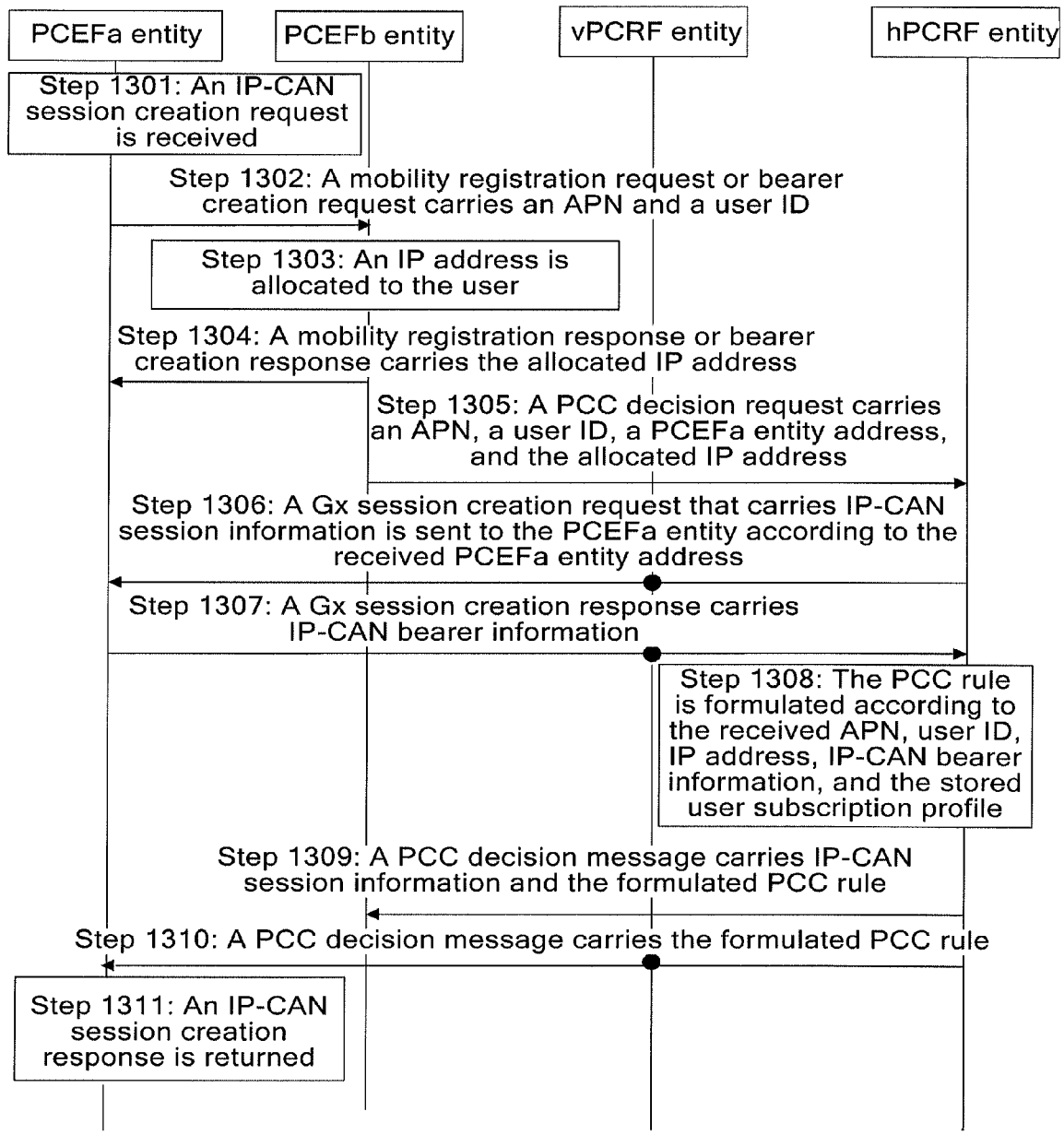
FIG. 18 is a schematic flowchart of a method for creating an IP-CAN session in the 10th embodiment of the present disclosure.

FIG. 18 is a schematic flowchart of a method for creating an IP-CAN session in the $10^{th}$ embodiment of the present disclosure. Through the method for creating an IP-CAN session in this embodiment, an IP-CAN session may be created in a new PCC architecture in the first roaming scenario shown in FIG. 3. As shown in FIG. 17, the method for creating an IP-CAN session in this embodiment includes the following steps 1301-1311.

Step 1301: The PCEFa entity receives an IP-CAN session creation request.

Step 1302: The PCEFa entity sends a mobility Registration Request or bearer creation request that carries an APN and a user ID to the PCEFb entity.

Step 1303: The PCEFb entity allocates an IP address to the user.

Step 1304: The PCEFb entity sends a mobility registration response or bearer creation response that carries the allocated IP address to the PCEFa entity.

Step 1305: The PCEFb entity sends a PCC decision request that carries an APN, a user ID, a PCEFa entity's address, and the allocated IP address to the hPCRF entity.

Step 1306: Through the vPCRF entity, the hPCRF entity sends a Gx session creation request that carries IP-CAN session information to the PCEFa entity according to the received PCEFa entity's address.

Step 1307: Through the vPCRF entity, the PCEFa entity sends a Gx session creation response that carries IP-CAN bearer information to the hPCRF entity.

Step 1308: The hPCRF entity formulates PCC rule(s) according to the received APN, user ID, IP address, IP-CAN bearer information, and the stored user subscription profile.

Step 1309: The hPCRF entity sends a PCC decision message that carries IP-CAN session information and the formulated PCC rule(s) to the PCEFb entity.

Step 1310: Through the vPCRF entity, the hPCRF entity sends a PCC decision message that carries the formulated PCC rule(s) to the PCEFa entity.

Step 1311: The PCEFa entity returns an IP-CAN session creation response.

The IP-CAN session creation request received by the PCEFa entity in step 1301 may be a GTP message, or a trigger message unrelated to the 3G network. The mobility Registration Request sent by the PCEFa entity to the PCEFb entity in step 1302 may be a Proxy Binding Update message, or Registration Request message, or other mobility IP Registration Request message. The IP-CAN session information sent in step 1306 and step 1309 may be an OCS/OFCS address, or a default charging mode. The PCC decision message sent by the hPCRF entity to the PCEFb entity in step 1309 may further carry bearer-unrelated event triggers. The PCC decision message sent by the hPCRF entity to the PCEFa entity in step 1310 may further carry bearer-related event triggers.

Besides, if the hPCRF entity does not store the user subscription profile, an additional step occurs between step 1305 and step 1306 of the method, and the additional step is: The hPCRF entity obtains user subscription profile from the SPR entity and stores the user subscription profile. If the IP-CAN session employs an online charging mode, an additional step occurs between step 1310 and step 1311 of the method, and the additional step is credit authorization, namely, the PCEFa and the PCEFb request the relevant charging credit from the OCS. If the IP-CAN session employs a network control mode, an additional step occurs between step 1310 and step 1311 of the method, and the additional step is: The PCEFa initiates creation of an IP-CAN bearer.

In FIG. 18, the sequence of step 1304 and step 1305 is not fixed, and the sequence of step 1309 and step 1310 is not fixed Besides, if the PCEFa entity and the PCEFb entity perform signaling transfer through a core network entity such as vEPS HA in the visited network in the new PCC architecture in the roaming scenario shown in FIG. 3, all messages between the PCEFa entity and the PCEFb entity in the method in the sixth embodiment are forwarded through this core network entity.

Therefore, according to the method for creating an IP-CAN session in the 10$^{th}$ embodiment of the present disclosure, the hPCRF can identify that the PCEFa and the PCEFb belong to the same IP-CAN session according to the APN and the user ID information sent by the PCEFa and the PCEFb, formulate PCC rule(s) for the IP-CAN session, and submit the IP-CAN session information and the formulated PCC rule(s) to the PCEFa entity and the PCEFb entity. In this way, an IP-CAN session is created in the new architecture.

Figure 19:
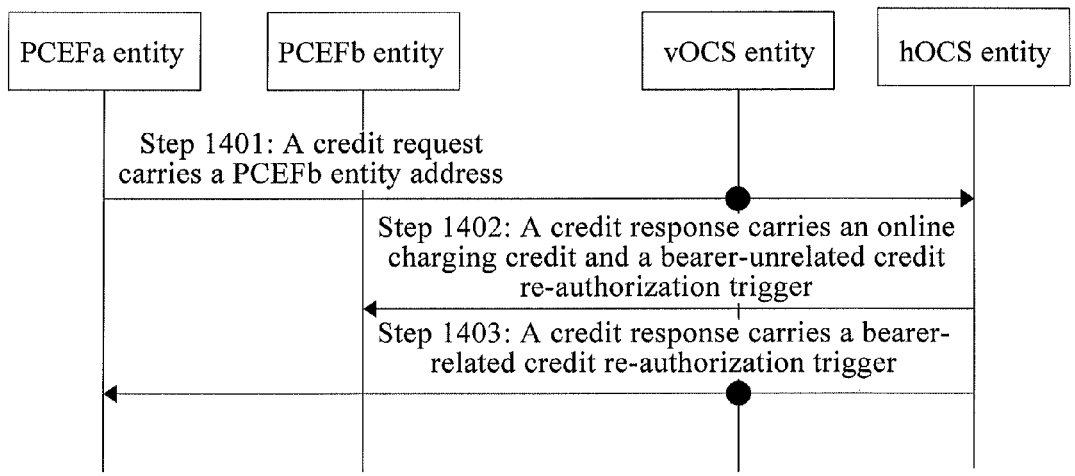
FIG. 19 schematically illustrates the fourth embodiment of the process of credit authorization in the present disclosure.
Figure 20:
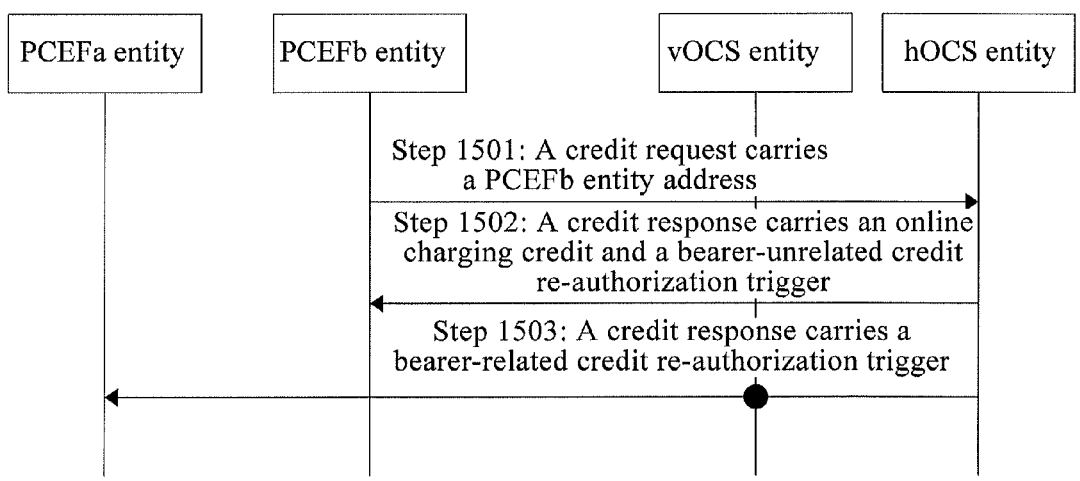
FIG. 20 schematically illustrates the fifth embodiment of the process of credit authorization in the present disclosure.
Figure 21:
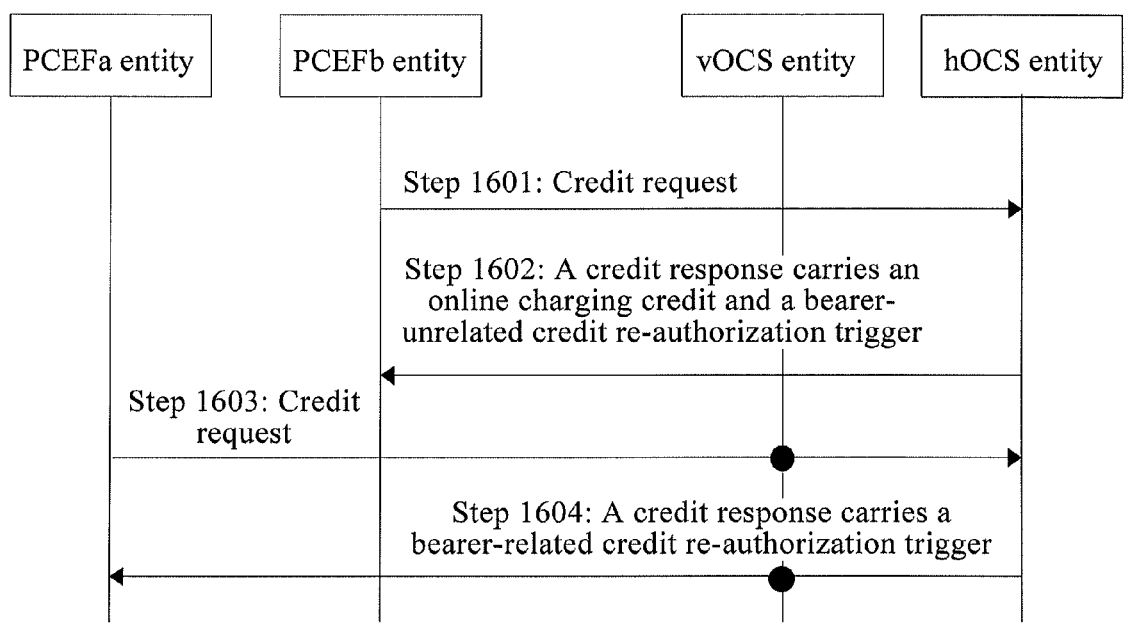
FIG. 21 schematically illustrates the sixth embodiment of the process of credit authorization in the present disclosure.

The credit authorization process in embodiments 6-10, namely, the process in which the PCEFa and the PCEFb request the relevant charging credit from the OCS, may be the same as the credit authorization process in FIG. 19, FIG. 20, or FIG. 21.

FIG. 19 is a schematic flowchart of the fourth process of credit authorization in this embodiment. As shown in FIG. 19, the fourth process of credit authorization in this embodiment includes the following steps 1401-1403:

Step 1401: Through a vOCS entity, the PCEFa entity sends a credit request that carries a PCEFb entity's address to an hOCS entity.

Step 1402: According to the received PCEFb entity's address, the hOCS entity sends a credit response to the PCEFb entity, where the credit response carries an online charging credit and a bearer-unrelated credit re-authorization trigger.

Step 1403: Through the vOCS entity, the hOCS entity sends a credit response that carries a bearer-related credit re-authorization trigger to the PCEFa entity.

The sequence of step 1402 and step 1403 is not fixed.

FIG. 20 is a flowchart of the fifth process of credit authorization in this embodiment. As shown in FIG. 20, the fifth process of credit authorization in this embodiment includes the following steps 1501-1503:

Step 1501: The PCEFb entity sends a credit request that carries a PCEFa entity's address to an hOCS entity.

Step 1502: The hOCS entity sends a credit response that carries an online charging credit and a bearer-unrelated credit re-authorization trigger to the PCEFb entity.

Step 1503: Through a vOCS entity, the hOCS entity sends a credit response that carries a bearer-related credit re-authorization trigger to the PCEFa entity according to the received PCEFa entity's address.

The sequence of step 1502 and step 1503 is not fixed.

FIG. 21 is a flowchart of the sixth process of credit authorization in this embodiment. As shown in FIG. 21, the sixth process of credit authorization in this embodiment includes the following steps 1601-1604:

Step 1601: The PCEFb entity sends a credit request to an hOCS entity.

Step 1602: The hOCS entity sends a credit response that carries an online charging credit and a bearer-unrelated credit re-authorization trigger to the PCEFb entity.

Step 1603: Through a vOCS entity, the PCEFa entity sends a credit request to the hOCS entity.

Step 1604: Through the vOCS entity, the hOCS entity sends a credit response that carries a bearer-related credit re-authorization trigger to the PCEFa entity.

The sequence of step 1601 and step 1602, and the sequence of step 1603 and step 1604 are not fixed.

Embodiment 11

Figure 22:
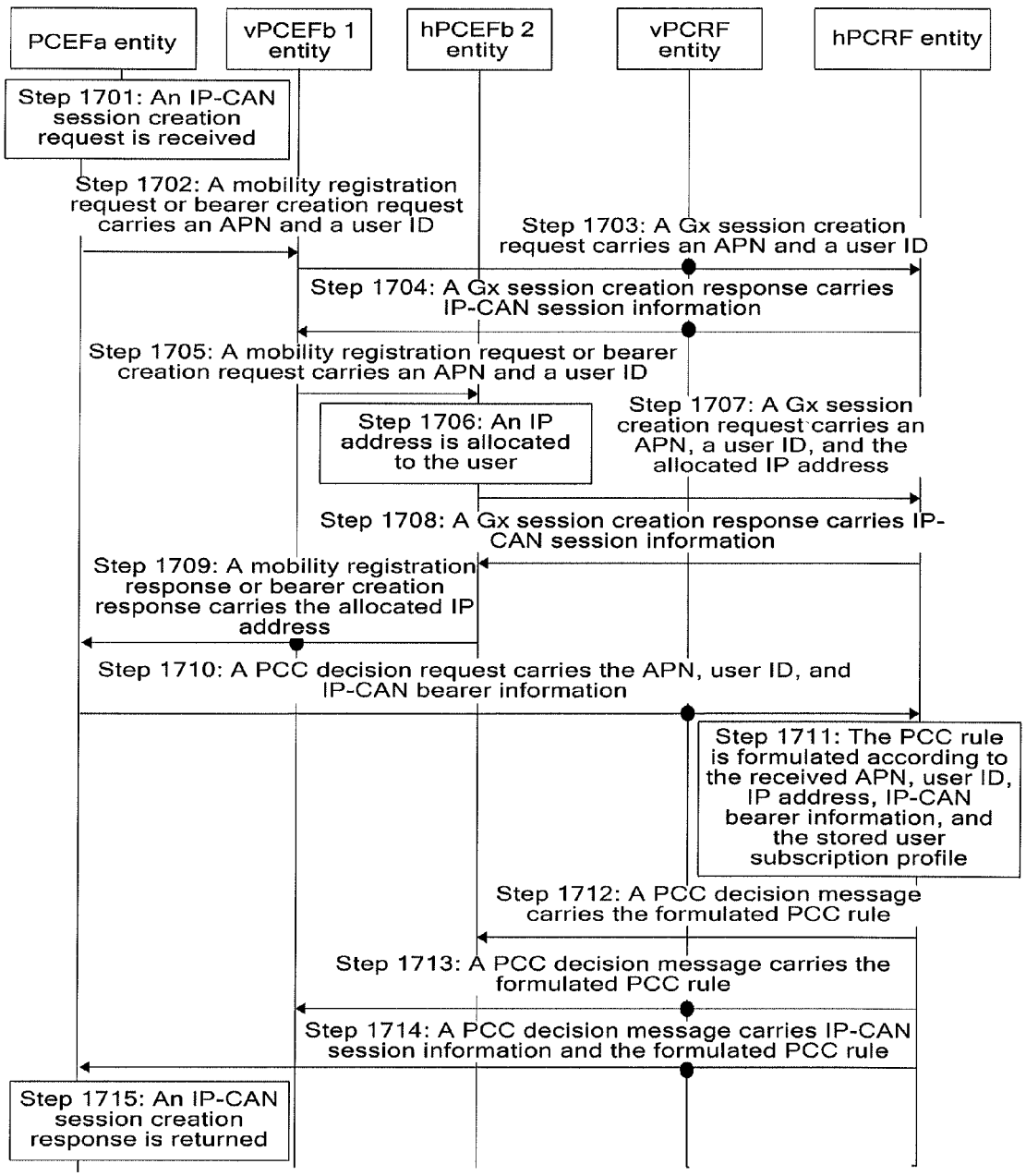
FIG. 22 is a schematic flowchart of a method for creating an IP-CAN session in the 11th embodiment of the present disclosure.

FIG. 22 is a schematic flowchart of a method for creating an IP-CAN session in the 11$^{th}$ embodiment of the present disclosure. Through the method for creating an IP-CAN session in this embodiment, an IP-CAN session may be created in a new PCC architecture in the second roaming scenario shown in FIG. 4. As shown in FIG. 22, the method for creating an IP-CAN session in this embodiment includes the following steps 1701-1715.

Step 1701: The PCEFa entity receives an IP-CAN session creation request.

Step 1702: The PCEFa entity sends a mobility Registration Request or bearer creation request that carries an APN and a user ID to a vPCEFb1 entity located in a visited network.

Step 1703: Through a vPCRF entity located in the visited network, the vPCEFb1 entity sends a Gx session creation request that carries an APN and a user ID to the hPCRF entity.

Step 1704: Through the vPCRF entity, the hPCRF entity sends a Gx session creation response that carries IP-CAN session information to the vPCEFb1 entity.

Step 1705: The vPCEFb1 entity sends a mobility Registration Request or bearer creation request that carries an APN and a user ID to the hPCEFb2 entity.

Step 1706: The hPCEFb2 entity allocates an IP address to the user.

Step 1707: The hPCEFb2 entity sends a Gx session creation request that carries an APN, a user ID, and the allocated IP address to an hPCRF entity.

Step 1708: The hPCRF entity sends a Gx session creation response that carries IP-CAN session information to the hPCEFb2 entity.

Step 1709: Through the vPCEFb1 entity, the hPCEFb2 entity sends a mobility registration response or bearer creation response that carries the allocated IP address to the PCEFa entity.

Step 1710: Through a vPCRF entity, the PCEFa entity sends a PCC decision request that carries the APN, user ID, and IP-CAN bearer information to the hPCRF entity.

Step 1711: The hPCRF entity formulates PCC rule(s) according to the received APN, user ID, IP address, IP-CAN bearer information, and the stored user subscription profile.

Step 1712: The hPCRF entity sends a PCC decision message that carries the formulated PCC rule(s) to the hPCEFb2 entity.

Step 1713: Through the vPCRF entity, the hPCRF entity sends a PCC decision message that carries the formulated PCC rule(s) to the vPCEFb1 entity.

Step 1714: Through the vPCRF entity, the hPCRF entity sends a PCC decision message that carries IP-CAN session information and the formulated PCC rule(s) to the PCEFa entity.

Step 1715: The PCEFa entity returns an IP-CAN session creation response.

The IP-CAN session creation request received by the PCEFa entity in step 1701 may be a GPRS Tunneling Protocol (GTP) message, or a trigger message unrelated to the 3G network. The mobility Registration Request sent by the PCEFa entity to the PCEFb entity in step 1702 may be a Proxy Binding Update message, or Registration Request message, or other MIP registration message. The IP-CAN session information in this method may be an OCS/OFCS address, or a default charging mode. The PCC decision message sent by the hPCRF entity to the hPCEFb2 entity and the vPCEFb1 entity may further carry bearer-unrelated event triggers. The PCC decision message sent by the hPCRF entity to the PCEFa entity in this method may further carry bearer-related event triggers.

Besides, if the hPCRF entity does not store the user subscription profile, an additional step occurs between step 1703 and step 1704 of the method, and the additional step is: The hPCRF entity obtains user subscription profile from the SPR entity and stores the user subscription profile. If the IP-CAN session employs an online charging mode, an additional step occurs between step 1714 and step 1715 of the method, and the additional step is credit authorization, namely, the PCEFa, hPCEFb2, and vPCEFb1 request the relevant charging credit from the OCS. If the IP-CAN session employs a network control mode, an additional step occurs between step 1714 and step 1715 of the method, and the additional step is: The PCEFa initiates creation of an IP-CAN bearer.

In FIG. 22, the sequence of step 1712, step 1713, and step 1714 is not fixed.

Therefore, according to the method for creating an IP-CAN session in the 11th embodiment of the present disclosure, the hPCRF can identify that the PCEFa, hPCEFb2, and vPCEFb1 belong to the same IP-CAN session according to the APN and the user ID information sent by the PCEFa, hPCEFb2, and vPCEFb1, formulate PCC rule(s) for the IP-CAN session, and submit the IP-CAN session information and the formulated PCC rule(s) to the PCEFa, hPCEFb2, and vPCEFb1. In this way, an IP-CAN session is created in the new architecture.

Embodiment 12

Figure 23:
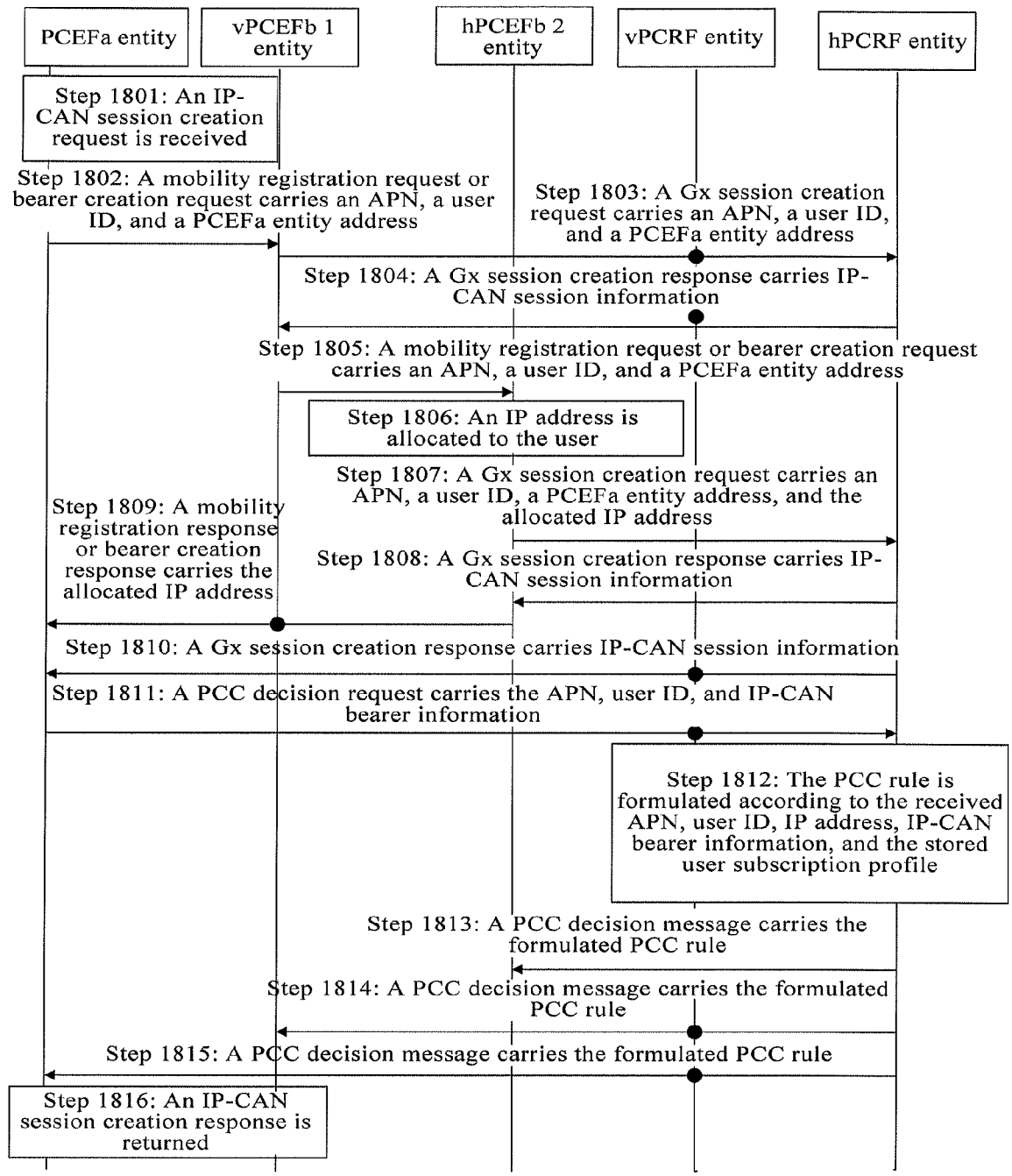
FIG. 23 is a schematic flowchart of a method for creating an IP-CAN session in the 12th embodiment of the present disclosure.

FIG. 23 is a schematic flowchart of a method for creating an IP-CAN session in the 12$^{th}$ embodiment of the present disclosure. Through the method for creating an IP-CAN session in this embodiment, an IP-CAN session may be created in a new PCC architecture in the second roaming scenario shown in FIG. 4. As shown in FIG. 23, the method for creating an IP-CAN session in this embodiment includes the following steps 1801-1816.

Step 1801: The PCEFa entity receives an IP-CAN session creation request.

Step 1802: The PCEFa entity sends a mobility Registration Request or bearer creation request that carries an APN, a user ID and a PCEFa entity's address to the vPCEFb1 entity.

Step 1803: Through a vPCRF entity, the vPCEFb1 entity sends a Gx session creation request that carries an APN, a user ID, and the PCEFa entity's address to an hPCRF entity.

Step 1804: Through the vPCRF entity, the hPCRF entity sends a Gx session creation response that carries IP-CAN session information to the vPCEFb1 entity.

Step 1805: The vPCEFb1 entity sends a mobility Registration Request or bearer creation request that carries an APN, a user ID and a PCEFa entity's address to the hPCEFb2 entity.

Step 1806: The hPCEFb2 entity allocates an IP address to the user.

Step 1807: The hPCEFb2 entity sends a Gx session creation request that carries an APN, a user ID, a PCEFa entity's address, and the allocated IP address to the hPCRF entity.

Step 1808: The hPCRF entity sends a Gx session creation response that carries IP-CAN session information to the hPCEFb2 entity.

Step 1809: Through the vPCEFb1 entity, the hPCEFb2 entity sends a mobility registration response or bearer creation response that carries the allocated IP address to the PCEFa entity.

Step 1810: Through the vPCRF entity, the hPCRF entity sends a Gx session creation request that carries IP-CAN session information to the PCEFa entity according to the received PCEFa entity's address.

Step 1811: Through a vPCRF entity, the PCEFa entity sends a PCC decision request that carries the APN, user ID, and IP-CAN bearer information to the hPCRF entity.

Step 1812: The hPCRF entity formulates PCC rule(s) according to the received APN, user ID, IP address, IP-CAN bearer information, and the stored user subscription profile.

Step 1813: The hPCRF entity sends a PCC decision message that carries the formulated PCC rule(s) to the hPCEFb2 entity.

Step 1814: Through the vPCRF entity, the hPCRF entity sends a PCC decision message that carries the formulated PCC rule(s) to the vPCEFb1 entity.

Step 1815: Through the vPCRF entity, the hPCRF entity sends a PCC decision message that carries the formulated PCC rule(s) to the PCEFa entity.

Step 1816: The PCEFa entity returns an IP-CAN session creation response.

The IP-CAN session creation request received by the PCEFa entity in step 1801 may be a GTP message, or a trigger message unrelated to the 3G network. The mobility Registration Request sent by the PCEFa entity in this method may be a Proxy Binding Update message, or Registration Request message, or other mobility IP Registration Request message.

The IP-CAN session information in this method may be an OCS/OFCS address, or a default charging mode. The PCC decision message sent by the hPCRF entity to the hPCEFb2 entity and the vPCEFb1 entity may further carry bearer-unrelated event triggers. The PCC decision message sent by the hPCRF entity to the PCEFa entity in this method may further carry bearer-related event triggers.

Besides, if the hPCRF entity does not store the user subscription profile, an additional step occurs between step 1803 and step 1804 of the method, and the additional step is: The hPCRF entity obtains user subscription profile from the SPR entity and stores the user subscription profile. If the IP-CAN session employs an online charging mode, an additional step occurs between step 1815 and step 1816 of the method, and the additional step is credit authorization, namely, the PCEFa, hPCEFb2, and vPCEFb1 request the relevant charging credit from the OCS. If the IP-CAN session employs a network control mode, an additional step occurs between step 1815 and step 1816 of the method, and the additional step is: The PCEFa initiates creation of an IP-CAN bearer. An additional step may occur between step 1008 and step 1009, and the additional step is: The PCEFa entity sends a Gx session creation response to the hPCRF entity through a vPCRF entity.

In FIG. 23, the sequence of step 1813, step 1814, and step 1815 is not fixed.

Therefore, according to the method for creating an IP-CAN session in the 12th embodiment of the present disclosure, the hPCRF can identify that the PCEFa, hPCEFb2, and vPCEFb1 belong to the same IP-CAN session according to the APN and the user ID information sent by the PCEFa, hPCEFb2, and vPCEFb1, formulate PCC rule(s) for the IP-CAN session, and submit the IP-CAN session information and the formulated PCC rule(s) to the PCEFa, hPCEFb2, and vPCEFb1. In this way, an IP-CAN session is created in the new architecture.

Embodiment 13

Figure 24:
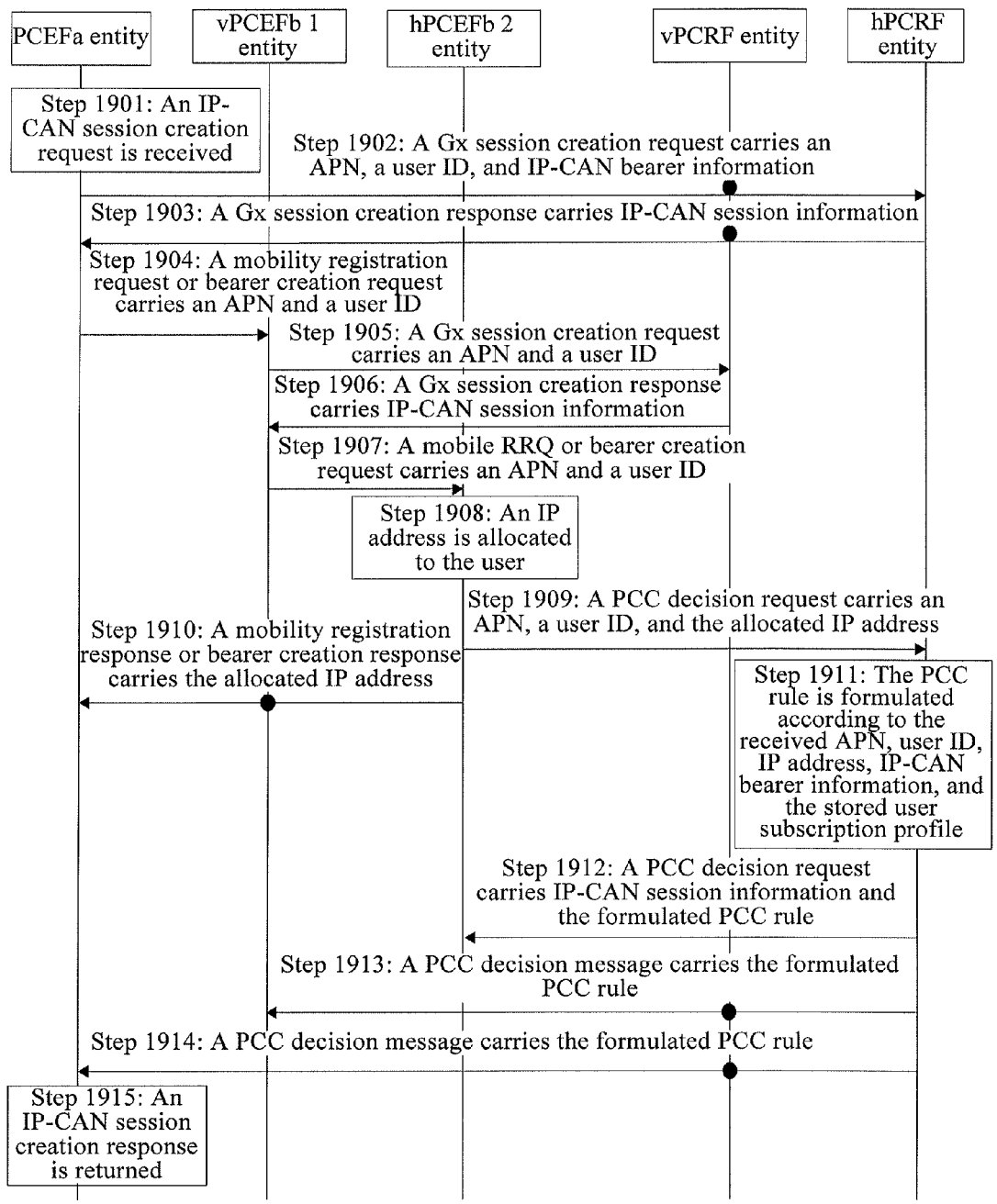
FIG. 24 is a schematic flowchart of a method for creating an IP-CAN session in the 13th embodiment of the present disclosure.

FIG. 24 is a schematic flowchart of a method for creating an IP-CAN session in the 13th embodiment of the present disclosure. Through the method for creating an IP-CAN session in this embodiment, an IP-CAN session may be created in a new PCC architecture in the second roaming scenario shown in FIG. 4. As shown in FIG. 24, the method for creating an IP-CAN session in this embodiment includes the following steps 1901-1915.

Step 1901: The PCEFa entity receives an IP-CAN session creation request.

Step 1902: Through a vPCRF entity, the PCEFa entity sends a Gx session creation request that carries an APN, a user ID, and IP-CAN session information to the hPCRF entity.

Step 1903: Through the vPCRF entity, the hPCRF entity sends a Gx session creation response that carries IP-CAN session information to the PCEFa entity.

Step 1904: The PCEFa entity sends a mobility Registration Request or bearer creation request that carries an APN and a user ID to the vPCEFb1 entity.

Step 1905: The vPCEFb1 entity sends a Gx session creation request that carries an APN and a user ID to the vPCRF entity.

Step 1906: The vPCRF entity sends a Gx session creation response that carries IP-CAN session information to the vPCEFb1 entity.

Step 1907: The vPCEFb1 entity sends a mobility Registration Request or bearer creation request that carries an APN and a user ID to the hPCEFb2 entity.

Step 1908: The hPCEFb2 entity allocates an IP address to the user.

Step 1909: The hPCEFb2 entity sends a PCC decision request that carries an APN, a user ID, and the allocated IP address to the hPCRF entity.

Step 1910: Through the vPCEFb1 entity, the hPCEFb2 entity sends a mobility registration response or bearer creation response that carries the allocated IP address to the PCEFa entity.

Step 1911: The hPCRF entity formulates PCC rule(s) according to the received APN, user ID, IP address, IP-CAN bearer information, and the stored user subscription profile.

Step 1912: The hPCRF entity sends a PCC decision message that carries IP-CAN session information and the formulated PCC rule(s) to the hPCEFb2 entity.

Step 1913: Through the vPCRF entity, the hPCRF entity sends a PCC decision message that carries the formulated PCC rule(s) to the vPCEFb1 entity.

Step 1914: Through the vPCRF entity, the hPCRF entity sends a PCC decision message that carries the formulated PCC rule(s) to the PCEFa entity.

Step 1915: The PCEFa entity returns an IP-CAN session creation response.

The IP-CAN session creation request received by the PCEFa entity in step 1901 may be a GTP message, or a trigger message unrelated to the 3G network. The mobility Registration Request sent by the PCEFa entity in this method may be a Proxy Binding Update message, or Registration Request message, or other mobility IP Registration Request message. The IP-CAN session information in this method may be an OCS/OFCS address, or a default charging mode. The PCC decision message sent by the hPCRF entity to the hPCEFb2 entity and the vPCEFb1 entity may further carry bearer-unrelated event triggers. The PCC decision message sent by the hPCRF entity to the PCEFa entity in this method may further carry bearer-related event triggers.

Besides, if the hPCRF entity does not store the user subscription profile, an additional step occurs between step 1902 and step 1903 of the method, and the additional step is: The hPCRF entity obtains user subscription profile from the SPR entity and stores the user subscription profile. If the IP-CAN session employs an online charging mode, an additional step occurs between step 1914 and step 1915 of the method, and the additional step is credit authorization, namely, the PCEFa, hPCEFb2, and vPCEFb1 request the relevant charging credit from the OCS. If the IP-CAN session employs a network control mode, an additional step occurs between step 1914 and step 1915 of the method, and the additional step is: The PCEFa initiates creation of an IP-CAN bearer. An additional step may occur between step 1905 and step 1906, and the additional step is: The vPCRF entity sends a Gx session creation request that carries an APN and a user ID to the hPCRF entity, and the hPCRF entity sends a Gx session creation response that carries IP-CAN session information to the vPCRF entity.

In FIG. 24, the sequence of step 1912, step 1913, and step 1914 is not fixed.

Therefore, according to the method for creating an IP-CAN session in the 13th embodiment of the present disclosure, the hPCRF can identify that the PCEFa, hPCEFb2, and vPCEFb1 belong to the same IP-CAN session according to the APN and the user ID information sent by the PCEFa, hPCEFb2, and vPCEFb1, formulate PCC rule(s) for the IP-CAN session, and submit the IP-CAN session information and the formulated PCC rule(s) to the PCEFa, hPCEFb2, and vPCEFb1. In this way, an IP-CAN session is created in the new architecture.

Embodiment 14

Figure 25:
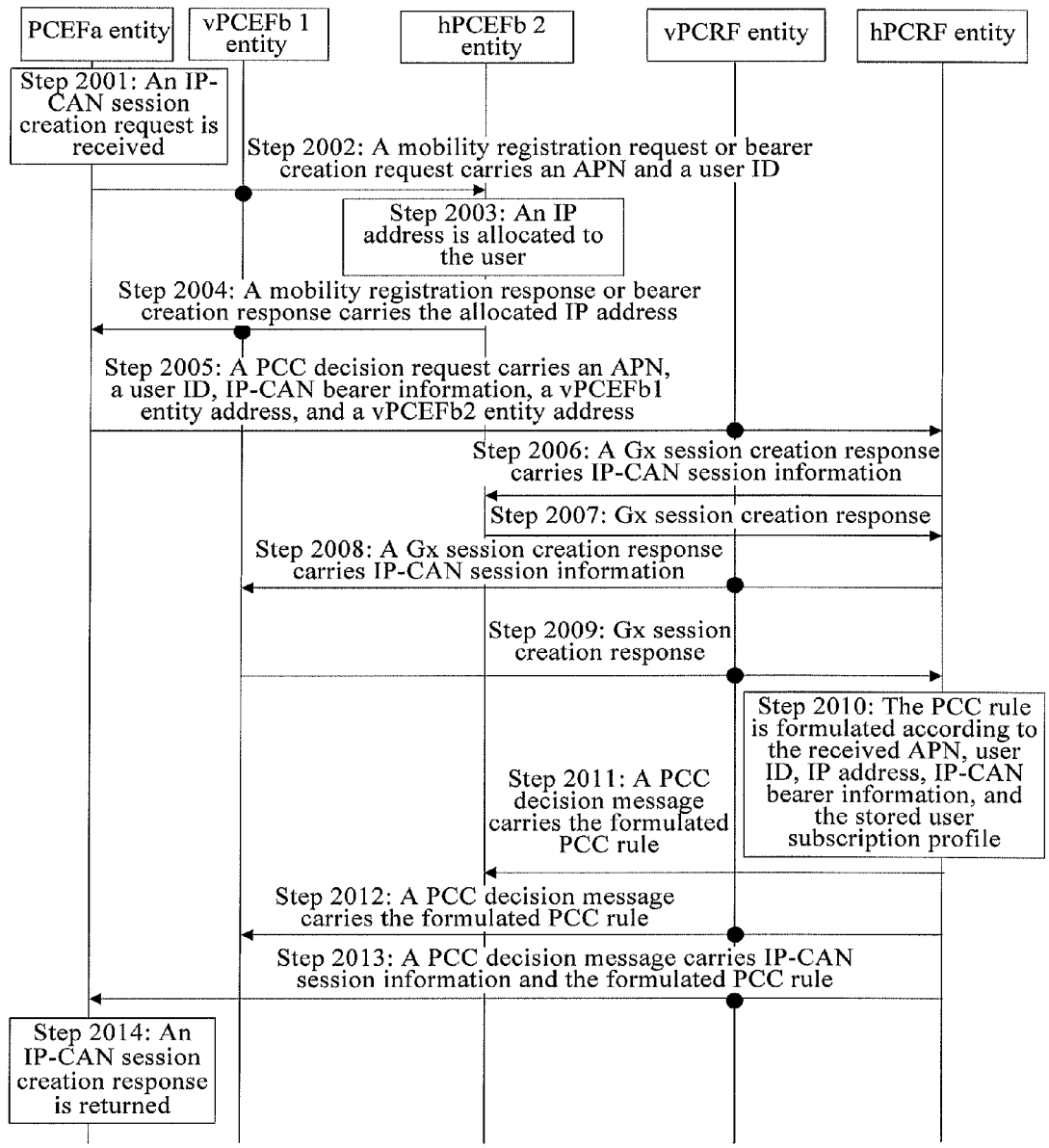
FIG. 25 is a schematic flowchart of a method for creating an IP-CAN session in the 14th embodiment of the present disclosure.

FIG. 25 is a schematic flowchart of a method for creating an IP-CAN session in the 14th embodiment of the present disclosure. Through the method for creating an IP-CAN session in this embodiment, an IP-CAN session may be created in a new PCC architecture in the second roaming scenario shown in FIG. 4. As shown in FIG. 25, the method for creating an IP-CAN session in this embodiment includes the following steps 2001-2014.

Step 2001: The PCEFa entity receives an IP-CAN session creation request.

Step 2002: Through a vPCEFb1 entity, the PCEFa entity sends a mobility Registration Request or bearer creation request that carries an APN and a user ID to the hPCEFb2 entity.

Step 2003: The hPCEFb2 entity allocates an IP address to the user.

Step 2004: Through the vPCEFb1 entity, the hPCEFb2 entity sends a mobility registration response or bearer creation response that carries the allocated IP address to the PCEFa entity.

Step 2005: Through a vPCRF entity, the PCEFa entity sends a PCC decision request that carries the APN, user ID, IP-CAN session information, vPCEFb1 entity's address, hPCEFb2 entity's address, and the allocated IP address to the hPCRF entity.

Step 2006: The hPCRF entity sends a Gx session creation request that carries IP-CAN session information to the hPCEFb2 entity according to the received hPCEFb2 entity's address.

Step 2007: The hPCEFb2 entity sends a Gx session creation response to the hPCRF entity.

Step 2008: Through the vPCRF entity, the hPCRF entity sends a Gx session creation request that carries IP-CAN session information to the vPCEFb1 entity according to the received vPCEFb1 entity's address.

Step 2009: Through the vPCRF entity, the vPCEFb1 entity sends a Gx session creation response to the hPCRF entity.

Step 2010: The hPCRF entity formulates PCC rule(s) according to the received APN, user ID, IP address, IP-CAN bearer information, and the stored user subscription profile.

Step 2011: The hPCRF entity sends a PCC decision message that carries the formulated PCC rule(s) to the hPCEFb2 entity.

Step 2012: Through the vPCRF entity, the hPCRF entity sends a PCC decision message that carries the formulated PCC rule(s) to the vPCEFb1 entity.

Step 2013: Through the vPCRF entity, the hPCRF entity sends a PCC decision message that carries IP-CAN session information and the formulated PCC rule(s) to the PCEFa entity.

Step 2014: The PCEFa entity returns an IP-CAN session creation response.

The IP-CAN session creation request received by the PCEFa entity in step 2001 may be a GTP message, or a trigger message unrelated to the 3G network. The mobility Registration Request sent by the PCEFa entity in step 2002 may be a Proxy Binding Update message, or Registration Request message, or other mobility IP Registration Request message. The IP-CAN session information in this method may be an OCS/OFCS address, or a default charging mode. The PCC decision message sent by the hPCRF entity to the hPCEFb2 entity and the vPCEFb1 entity may further carry bearer-unrelated event triggers. The PCC decision message sent by the hPCRF entity to the PCEFa entity may further carry bearer-related event triggers.

Besides, if the hPCRF entity does not store the user subscription profile, an additional step occurs between step 2005 and step 2006 of the method, and the additional step is: The hPCRF entity obtains user subscription profile from the SPR entity and stores the user subscription profile. If the IP-CAN session employs an online charging mode, an additional step occurs between step 2013 and step 2014 of the method, and the additional step is credit authorization, namely, the PCEFa, hPCEFb2, and vPCEFb1 request the relevant charging credit from the OCS. If the IP-CAN session employs a network control mode, an additional step occurs between step 2013 and step 2014 of the method, and the additional step is: The PCEFa initiates creation of an IP-CAN bearer.

In FIG. 25, the sequence of step 2011, step 2012, and step 2013 is not fixed.

Therefore, according to the method for creating an IP-CAN session in the 14th embodiment of the present disclosure, the hPCRF can identify that the PCEFa, hPCEFb2, and vPCEFb1 belong to the same IP-CAN session according to the APN and the user ID information sent by the PCEFa, hPCEFb2, and vPCEFb1, formulate PCC rule(s) for the IP-CAN session, and submit the IP-CAN session information and the formulated PCC rule(s) to the PCEFa, hPCEFb2, and vPCEFb1. In this way, an IP-CAN session is created in the new architecture.

Embodiment 15

Figure 26:
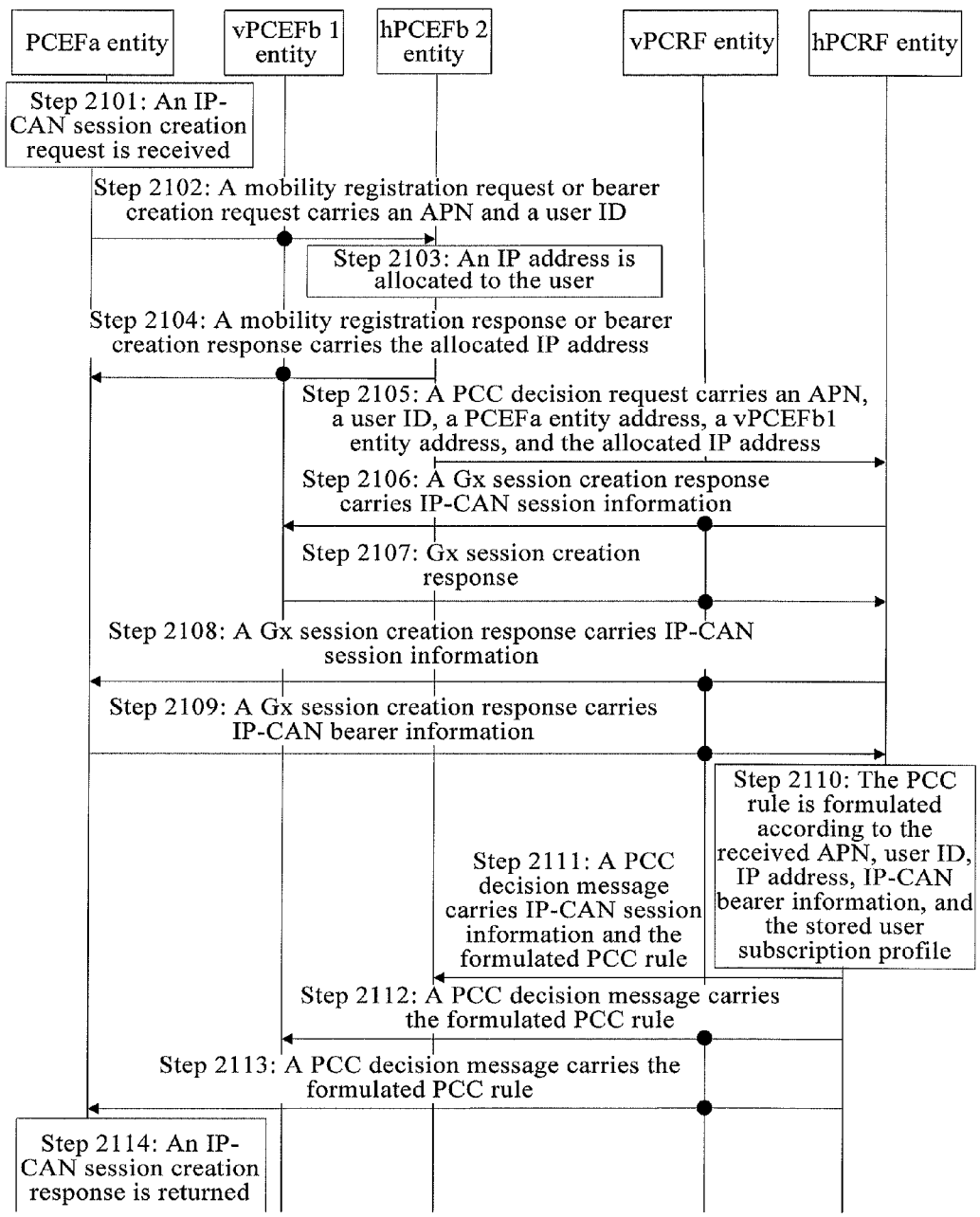
FIG. 26 is a schematic flowchart of a method for creating an IP-CAN session in the 15th embodiment of the present disclosure.

FIG. 26 is a schematic flowchart of a method for creating an IP-CAN session in the $15^{th}$ embodiment of the present disclosure. Through the method for creating an IP-CAN session in this embodiment, an IP-CAN session may be created in a new PCC architecture in the second roaming scenario shown in FIG. 4. As shown in FIG. 26, the method for creating an IP-CAN session in this embodiment includes the following steps 2101-2114.

Step 2101: The PCEFa entity receives an IP-CAN session creation request.

Step 2102: Through a vPCEFb1 entity, the PCEFa entity sends a mobility Registration Request or bearer creation request that carries an APN and a user ID to the hPCEFb2 entity.

Step 2103: The hPCEFb2 entity allocates an IP address to the user.

Step 2104: Through the vPCEFb1 entity, the hPCEFb2 entity sends a mobility registration response or bearer creation response that carries the allocated IP address to the PCEFa entity.

Step 2105: The hPCEFb2 entity sends a PCC decision request that carries an APN, a user ID, the PCEFa entity's address, the v PCEFb1 entity's address, and the allocated IP address to the hPCRF entity.

Step 2106: Through the vPCRF entity, the hPCRF entity sends a Gx session creation request that carries IP-CAN session information to the vPCEFb1 entity according to the received vPCEFb1 entity's address.

Step 2107: Through the vPCRF entity, the vPCEFb1 entity sends a Gx session creation response to the hPCRF entity.

Step 2108: Through the vPCRF entity, the hPCRF entity sends a Gx session creation request that carries IP-CAN session information to the PCEFa entity according to the received PCEFa entity's address.

Step 2109: Through the vPCRF entity, the PCEFa entity sends a Gx session creation response that carries IP-CAN bearer information to the hPCRF entity.

Step 2110: The PCRF entity formulates PCC rule(s) according to the received APN, user ID, IP address, IP-CAN bearer information, and the stored user subscription profile.

Step 2111: The hPCRF entity sends a PCC decision message that carries IP-CAN session information and the formulated PCC rule(s) to the hPCEFb2 entity.

Step 2112: Through the vPCRF entity, the hPCRF entity sends a PCC decision message that carries the formulated PCC rule(s) to the vPCEFb1 entity.

Step 2113: Through the vPCRF entity, the hPCRF entity sends a PCC decision message that carries the formulated PCC rule(s) to the PCEFa entity.

Step 2114: The PCEFa entity returns an IP-CAN session creation response.

The IP-CAN session creation request received by the PCEFa entity in step 2101 may be a GTP message, or a trigger message unrelated to the 3G network. The mobility Registration Request sent by the PCEFa entity in step 2102 may be a Proxy Binding Update message, or Registration Request message, or other mobility IP Registration Request message. The IP-CAN session information in this method may be an OCS/OFCS address, or a default charging mode. The PCC decision message sent by the hPCRF entity to the hPCEFb2 entity and the vPCEFb1 entity may further carry bearer-unrelated event triggers. The PCC decision message sent by the hPCRF entity to the PCEFa entity in this method may further carry bearer-related event triggers.

Besides, if the hPCRF entity does not store the user subscription profile, an additional step occurs between step 2105 and step 2106 of the method, and the additional step is: The hPCRF entity obtains user subscription profile from the SPR entity and stores the user subscription profile. If the IP-CAN session employs an online charging mode, an additional step occurs between step 2113 and step 2114 of the method, and the additional step is credit authorization, namely, the PCEFa, hPCEFb2, and vPCEFb1 request the relevant charging credit from the OCS. If the IP-CAN session employs a network control mode, an additional step occurs between step 2113 and step 2114 of the method, and the additional step is: The PCEFa initiates creation of an IP-CAN bearer.

In FIG. 26, the sequence of step 2111, step 2112, and step 2113 is not fixed.

Therefore, according to the method for creating an IP-CAN session in the 15th embodiment of the present disclosure, the hPCRF can identify that the PCEFa, hPCEFb2, and vPCEFb1 belong to the same IP-CAN session according to the APN and the user ID information sent by the PCEFa, hPCEFb2, and vPCEFb1, formulate PCC rule(s) for the IP-CAN session, and submit the IP-CAN session information and the formulated PCC rule(s) to the PCEFa, hPCEFb2, and vPCEFb1. In this way, an IP-CAN session is created in the new architecture.

The credit authorization process in embodiments 11-15, namely, the process in which the PCEFa, hPCEFb2, and vPCEFb1 request the relevant charging credit from the OCS, may be the same as the credit authorization process in FIG. 27, FIG. 28, FIG. 29, or FIG. 30.

Figure 27:
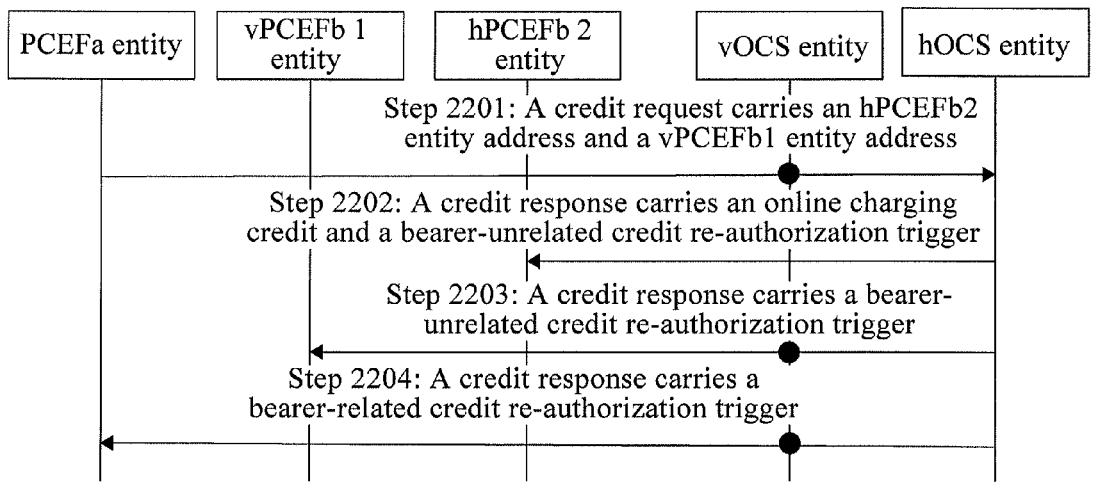
FIG. 27 schematically illustrates the seventh embodiment of the process of credit authorization in the present disclosure.

FIG. 27 is a schematic flowchart of the seventh process of credit authorization in this embodiment. As shown in FIG. 27, the seventh process of credit authorization in this embodiment includes the following steps 2201-2204:

Step 2201: Through a vOCS entity, the PCEFa entity sends a credit request that carries an hPCEFb2 entity's address and a vPCEFb1 entity's address to an hOCS entity.

Step 2202: According to the received hPCEFb2 entity's address, the hOCS entity sends a credit response to the hPCEFb2 entity, where the credit response carries an online charging credit and a bearer-unrelated credit re-authorization trigger.

Step 2203: Through a vOCS entity, the hOCS entity sends a credit response that carries a bearer-unrelated credit re-authorization trigger to the vPCEFb1 entity according to the received vPCEFb1 entity's address.

Step 2204: Through the vOCS entity, the hOCS entity sends a credit response that carries a bearer-related credit re-authorization trigger to the PCEFa entity.

The sequence of step 2202, step 2203, and step 2204 is not fixed.

Figure 28:
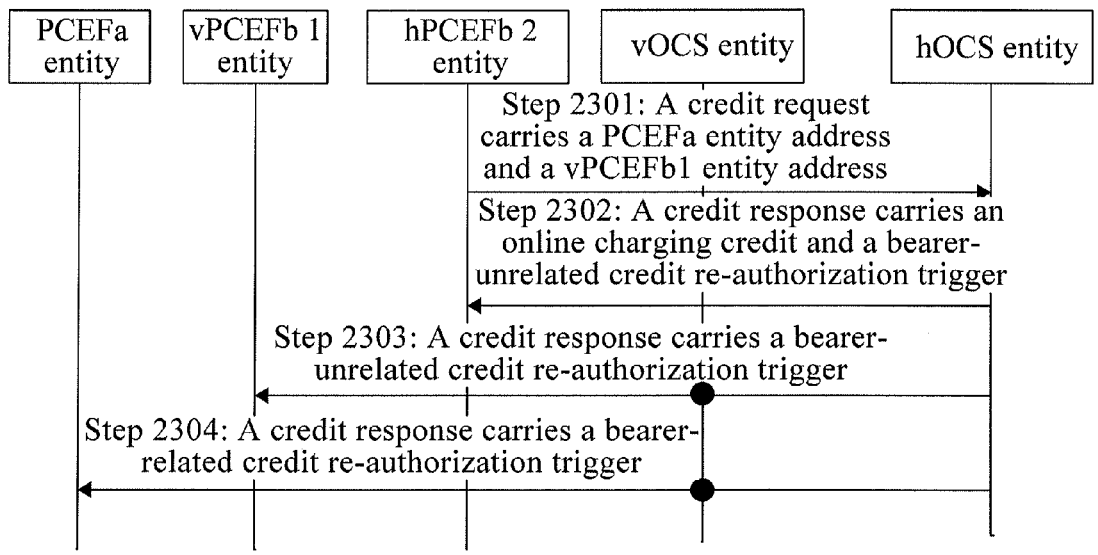
FIG. 28 schematically illustrates the eighth embodiment of the process of credit authorization in the present disclosure.

FIG. 28 is a flowchart of the eighth process of credit authorization in this embodiment. As shown in FIG. 28, the eighth process of credit authorization in this embodiment includes the following steps 2301-2304:

Step 2301: The hPCEFb2 entity sends a credit request that carries a PCEFa entity's address and a vPCEFb1 entity's address to an hOCS entity.

Step 2302: The hOCS entity sends a credit response that carries an online charging credit and a bearer-unrelated credit re-authorization trigger to the hPCEFb2 entity.

Step 2303: Through a vOCS entity, the hOCS entity sends a credit response that carries a bearer-unrelated credit re-authorization trigger to the vPCEFb1 entity according to the received vPCEFb1 entity's address.

Step 2304: Through a vOCS entity, the hOCS entity sends a credit response that carries a bearer-related credit re-authorization trigger to the PCEFa entity according to the received PCEFa entity's address.

The sequence of step 2302, step 2303, and step 2304 is not fixed.

Figure 29:
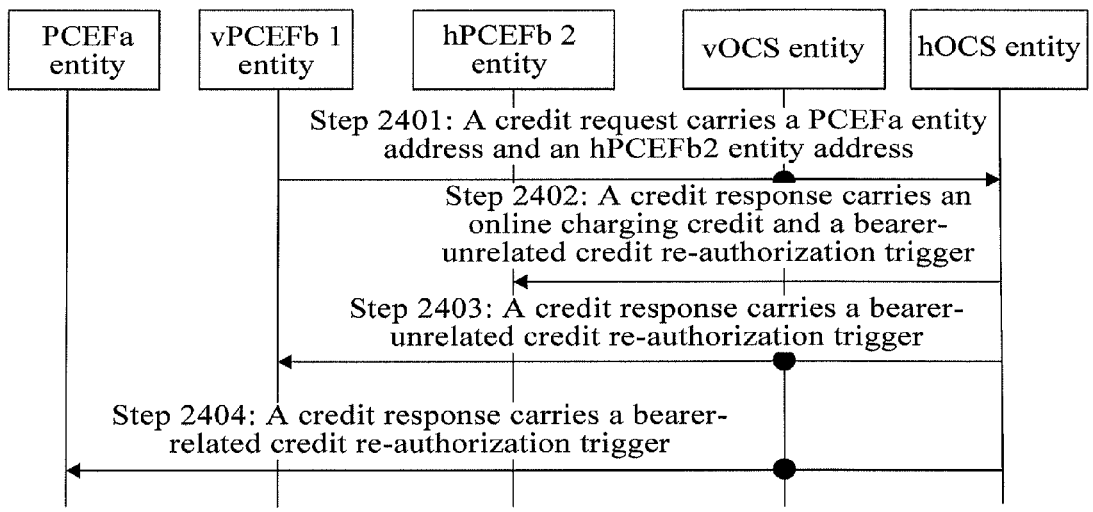
FIG. 29 schematically illustrates the ninth embodiment of the process of credit authorization in the present disclosure.

FIG. 29 is a schematic flowchart of the ninth process of credit authorization in this embodiment. As shown in FIG. 29, the ninth process of credit authorization in this embodiment includes the following steps 2401-2404:

Step 2401: Through a vOCS entity, the vPCEFb1 entity sends a credit request that carries a PCEFa entity's address and an hPCEFb2 entity's address to an hOCS entity.

Step 2402: According to the received hPCEFb2 entity's address, the hOCS entity sends a credit response to the hPCEFb2 entity, where the credit response carries an online charging credit and a bearer-unrelated credit re-authorization trigger.

Step 2403: Through the vOCS entity, the hOCS entity sends a credit response that carries a bearer-unrelated credit re-authorization trigger to the vPCEFb1 entity.

Step 2404: Through a vOCS entity, the hOCS entity sends a credit response that carries a bearer-related credit re-authorization trigger to the PCEFa entity according to the received PCEFa entity's address.

The sequence of step 2402, step 2403, and step 2404 is not fixed.

Figure 30:
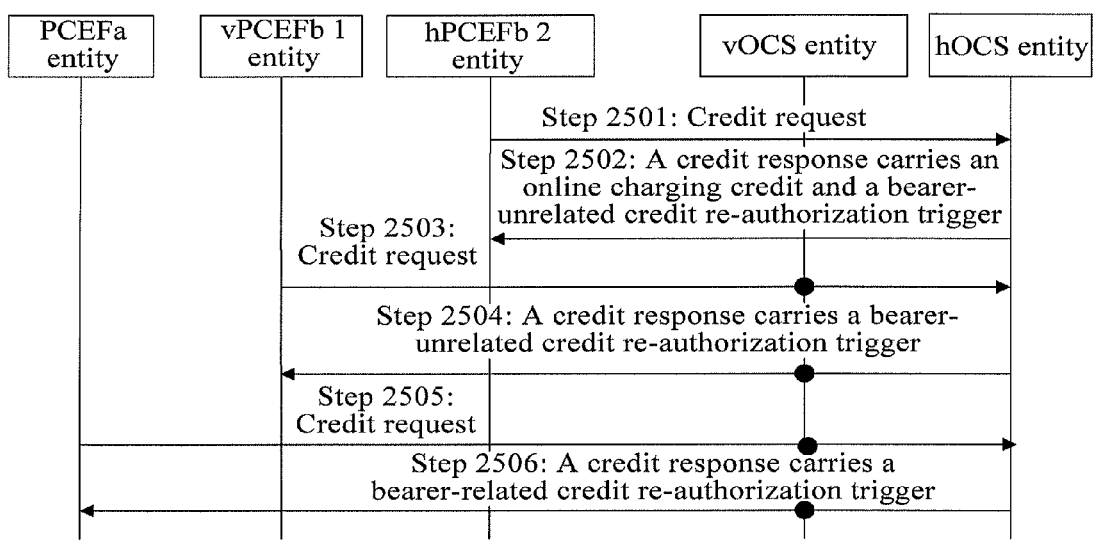
FIG. 30 schematically illustrates the 10th embodiment of the process of credit authorization in the present disclosure.

FIG. 30 is a schematic flowchart of the 10th process of credit authorization in this embodiment. As shown in FIG. 30, the 10th process of credit authorization in this embodiment includes the following steps 2501-2506:

Step 2501: The hPCEFb2 entity sends a credit request to an hOCS entity.

Step 2502: The hOCS entity sends a credit response that carries an online charging credit and a bearer-unrelated credit re-authorization trigger to the hPCEFb2 entity.

Step 2503: Through a vOCS entity, the vPCEFb1 entity sends a credit request to the hOCS entity.

Step 2504: Through the vOCS entity, the hOCS entity sends a credit response that carries a bearer-unrelated credit re-authorization trigger to the vPCEFb1 entity.

Step 2505: Through a vOCS entity, the PCEFa entity sends a credit request to the hOCS entity.

Step 2506: Through the vOCS entity, the hOCS entity sends a credit response that carries a bearer-related credit re-authorization trigger to the PCEFa entity.

The sequence of step 2501 and step 2502, the sequence of step 2503 and step 2504, and the sequence of step 2505 and step 2506 are not fixed.

Described above is a method for creating an IP-CAN session in an embodiment of the present disclosure. Now, the method for deleting an IP-CAN session in an embodiment of the present disclosure is described below.

Figure 31:
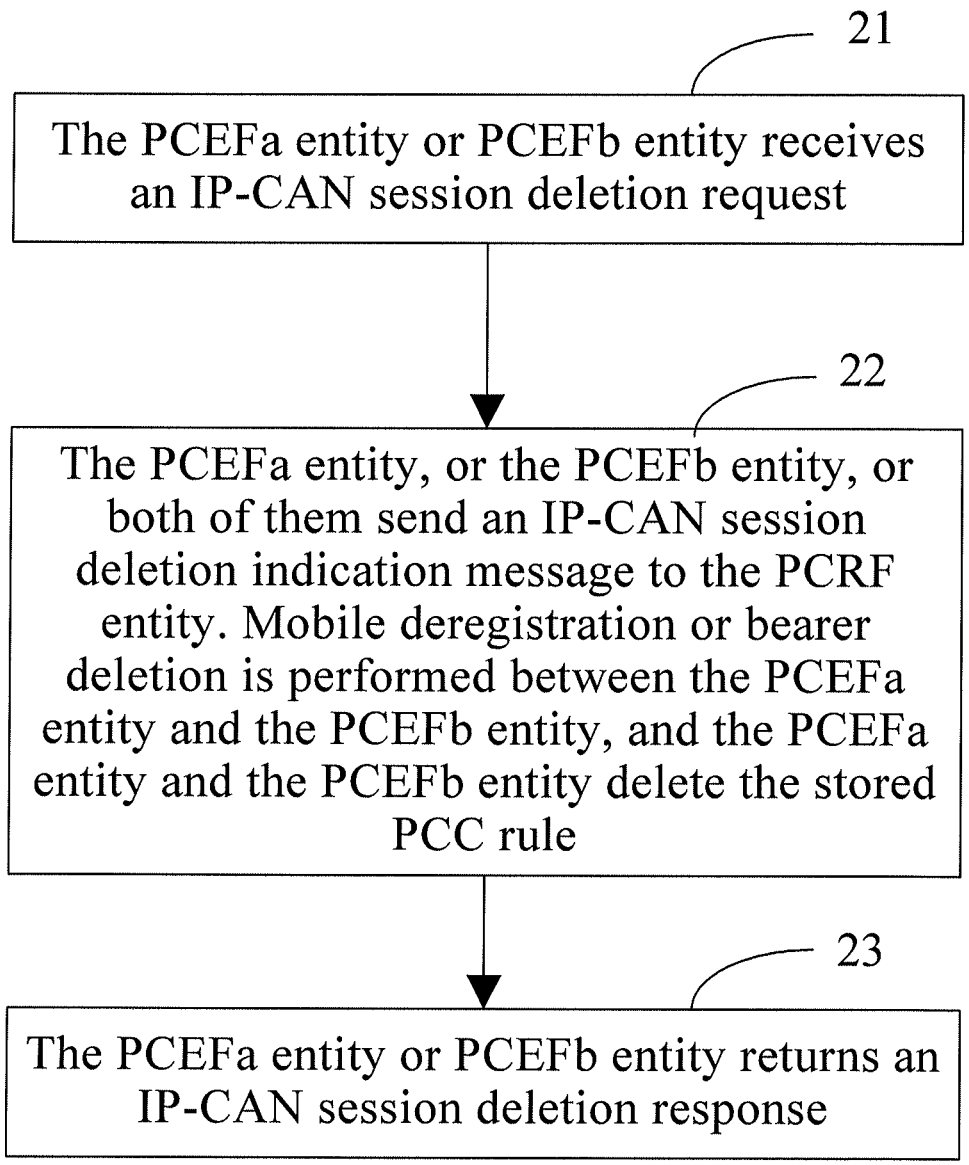
FIG. 31 is a schematic flowchart of a method for deleting an IP-CAN session in an embodiment of the present disclosure.

FIG. 31 is a schematic flowchart of a method for deleting an IP-CAN session in an embodiment of the present disclosure. As shown in FIG. 31, the method for deleting an IP-CAN session in this embodiment includes:

Step 21: The PCEFa entity or PCEFb entity receives an IP-CAN session deletion request.

Step 22: The PCEFa entity, or the PCEFb entity, or both of them send an IP-CAN session deletion indication message to the PCRF entity. Mobile deregistration or bearer deletion is performed between the PCEFa entity and the PCEFb entity, and the PCEFa entity and the PCEFb entity delete the stored PCC rule(s).

Step 23: The PCEFa entity or PCEFb entity returns an IP-CAN session deletion response.

According to the method for deleting an IP-CAN session in this embodiment, the PCEFa entity and the PCEFb entity delete the stored PCC rule(s) respectively, and the IP-CAN session is deleted in the new architecture.

Embodiment 16

Figure 32:
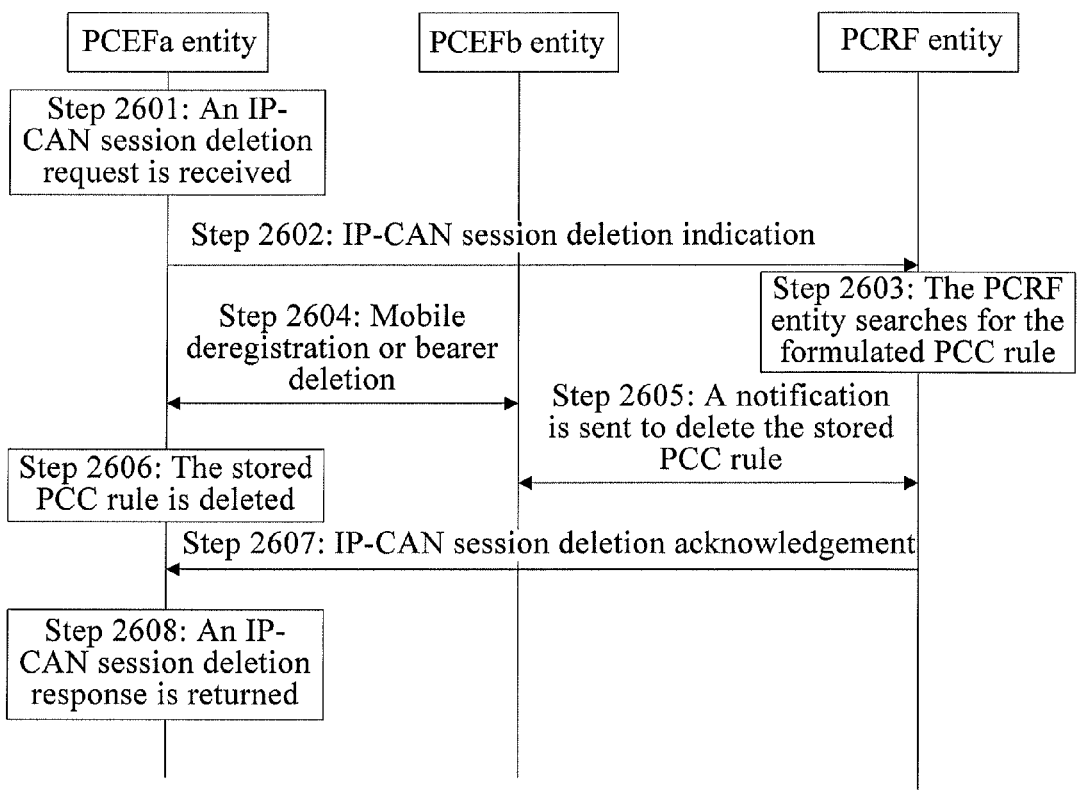
FIG. 32 is a schematic flowchart of a method for deleting an IP-CAN session in the 16th embodiment of the present disclosure.

FIG. 32 is a schematic flowchart of a method for deleting an IP-CAN session in the 16$^{th}$ embodiment of the present disclosure. Through the method for deleting an IP-CAN session in this embodiment, an IP-CAN session may be deleted in a new PCC architecture shown in FIG. 2. As shown in FIG. 32, the method for deleting an IP-CAN session in this embodiment includes the following steps 2601-2608.

Step 2601: The PCEFa entity receives an IP-CAN session deletion request.

Step 2602: The PCEFa entity sends an IP-CAN session deletion indication message to the PCRF entity.

Step 2603: The PCRF entity searches for the formulated PCC rule(s).

Step 2604: Mobile deregistration or bearer deletion occurs between the PCEFa entity and the PCEFb entity.

Step 2605: The PCRF entity notifies the PCEFb entity to delete the stored PCC rule(s).

Step 2606: The PCEFa entity deletes the stored PCC rule(s).

Step 2607: The PCRF entity sends an IP-CAN session deletion acknowledgement message to the PCEFa entity.

Step 2608: The PCEFa entity returns an IP-CAN session deletion response.

The IP-CAN session deletion request received by the PCEFa entity in step 2601 may be a GTP message, or a trigger message unrelated to the 3G network. If event triggers and credit re-authorization triggers are stored in the PCEFa entity and the PCEFb entity, the PCEFb entity further deletes the stored event triggers and credit re-authorization triggers in step 2605, and the PCEFa entity further deletes the stored event triggers and credit re-authorization triggers in step 2606. If the IP-CAN session employs an online charging mode, an additional step occurs between step 2607 and step 2608 in this method, and the additional step is: The PCEFb entity sends a final credit report to the OCS entity. If the PCRF entity has customized subscription notification, the method further includes this step: The PCRF entity sends a subscription notification cancellation message to the SPR entity. After step 2603, the method may further include this step: The PCRF entity indicates lack of service transfer resources to the AF entity.

The sequence of step 2604, step 2605, and step 2606 is not fixed.

According to the method for deleting an IP-CAN session in this embodiment, the PCEFa entity and the PCEFb entity delete the stored PCC rule(s) respectively, and the IP-CAN session is deleted in the new architecture.

Embodiment 17

Figure 33:
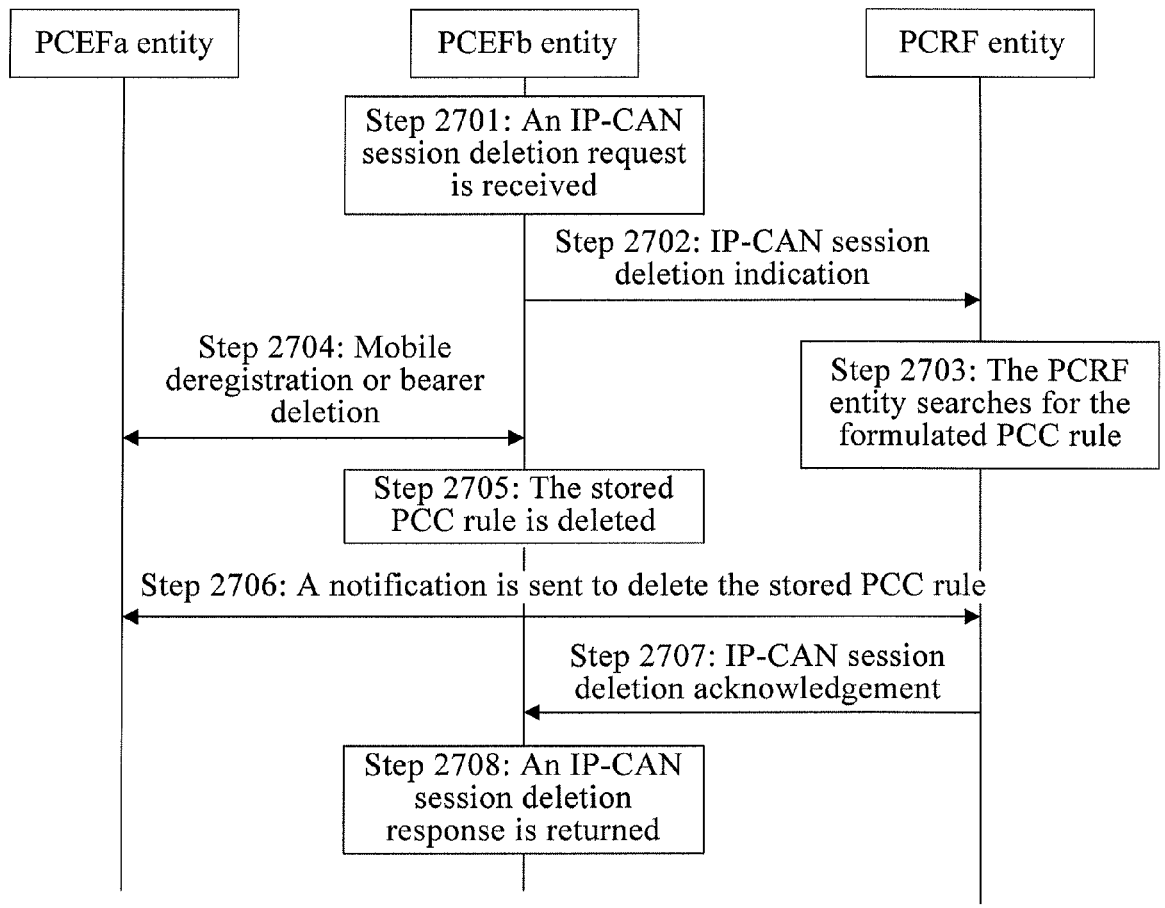
FIG. 33 is a schematic flowchart of a method for deleting an IP-CAN session in the 17th embodiment of the present disclosure.

FIG. 33 is a schematic flowchart of a method for deleting an IP-CAN session in the 17$^{th}$ embodiment of the present disclosure. Through the method for deleting an IP-CAN session in this embodiment, an IP-CAN session may be deleted in a new PCC architecture shown in FIG. 2. As shown in FIG. 33, the method for deleting an IP-CAN session in this embodiment includes the following steps 2701-2708.

Step 2701: The PCEFb entity receives an IP-CAN session deletion request.

Step 2702: The PCEFb entity sends an IP-CAN session deletion indication message to the PCRF entity.

Step 2703: The PCRF entity searches for the formulated PCC rule(s).

Step 2704: Mobile deregistration or bearer deletion occurs between the PCEFa entity and the PCEFb entity.

Step 2705: The PCEFb entity deletes the stored PCC rule(s).

Step 2706: The PCRF entity notifies the PCEFa entity to delete the stored PCC rule(s).

Step 2707: The PCRF entity sends an IP-CAN session deletion acknowledgement message to the PCEFb entity.

Step 2708: The PCEFb entity returns an IP-CAN session deletion response.

The IP-CAN session deletion request in step 2701 may be a GTP message, or a trigger message unrelated to the 3G network. If event triggers and credit re-authorization triggers are stored in the PCEFa entity and the PCEFb entity, the PCEFb entity further deletes the stored event triggers and credit re-authorization triggers in step 2705, and the PCEFa entity further deletes the stored event triggers and credit re-authorization triggers in step 2706. If the IP-CAN session employs an online charging mode, an additional step occurs between step 2707 and step 2708 in this method, and the additional step is: The PCEFb entity sends a final credit report to the OCS entity. If the PCRF entity has customized subscription notification, the method further includes this step: The PCRF entity sends a subscription notification cancellation message to the SPR entity. After step 2703, the method may further include this step: The PCRF entity indicates lack of service transfer resources to the AF entity.

The sequence of step 2704, step 2705, and step 2706 is not fixed.

According to the method for deleting an IP-CAN session in this embodiment, the PCEFa entity and the PCEFb entity delete the stored PCC rule(s) respectively, and the IP-CAN session is deleted in the new architecture.

Embodiment 18

Figure 34:
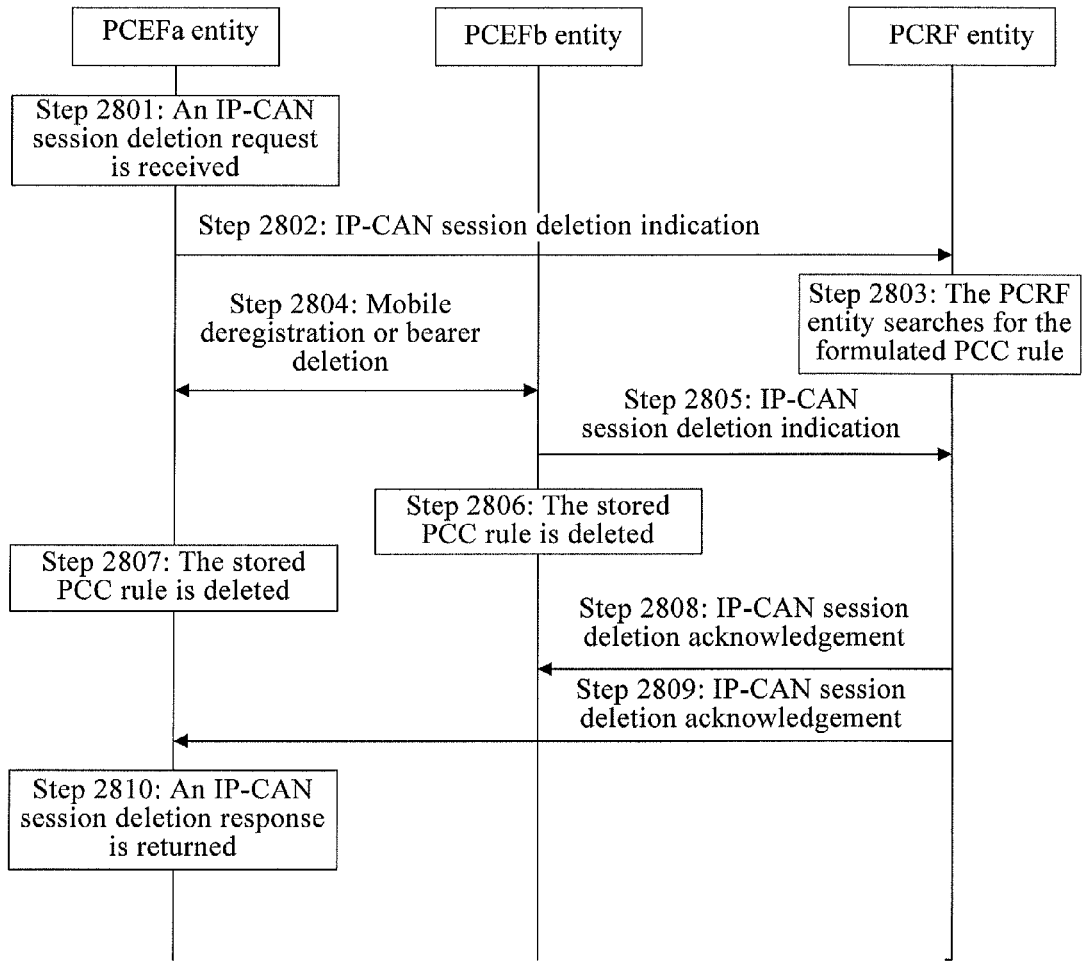
FIG. 34 is a schematic flowchart of a method for deleting an IP-CAN session in the 18th embodiment of the present disclosure.

FIG. 34 is a flowchart of a method for deleting an IP-CAN session in the 18$^{th}$ embodiment of the present disclosure.

Through the method for deleting an IP-CAN session in this embodiment, an IP-CAN session may be deleted in a new PCC architecture shown in FIG. 2. As shown in FIG. 34, the method for deleting an IP-CAN session in this embodiment includes the following steps 2801-2810.

Step 2801: The PCEFa entity receives an IP-CAN session deletion request.

Step 2802: The PCEFa entity sends an IP-CAN session deletion indication message to the PCRF entity.

Step 2803: The PCRF entity searches for the formulated PCC rule(s).

Step 2804: Mobile deregistration or bearer deletion occurs between the PCEFa entity and the PCEFb entity.

Step 2805: The PCEFb entity sends an IP-CAN session deletion indication message to the PCRF entity.

Step 2806: The PCEFb entity deletes the stored PCC rule(s).

Step 2807: The PCEFa entity deletes the stored PCC rule(s).

Step 2808: The PCRF entity sends an IP-CAN session deletion acknowledgement message to the PCEFb entity.

Step 2809: The PCRF entity sends an IP-CAN session deletion acknowledgement message to the PCEFa entity.

Step 2810: The PCEFa entity returns an IP-CAN session deletion response.

The IP-CAN session deletion request in this method may be a GTP message, or a trigger message unrelated to the 3G network. If event triggers and credit re-authorization triggers are stored in the PCEFa entity and the PCEFb entity, the PCEFb entity further deletes the stored event triggers and credit re-authorization triggers in step 2806, and the PCEFa entity further deletes the stored event triggers and credit re-authorization triggers in step 2807. If the IP-CAN session employs an online charging mode, an additional step occurs between step 2809 and step 2810 in this method, and the additional step is: The PCEFb entity sends a final credit report to the OCS entity. If the PCRF entity has customized subscription notification, the method further includes this step: The PCRF entity sends a subscription notification cancellation message to the SPR entity. After step 2803, the method may further include this step: The PCRF entity indicates lack of service transfer resources to the AF entity.

The sequence of step 2806 and step 2807 is not fixed.

According to the method for deleting an IP-CAN session in this embodiment, the PCEFa entity and the PCEFb entity delete the stored PCC rule(s) respectively, and the IP-CAN session is deleted in the new architecture.

Embodiment 19

Figure 35:
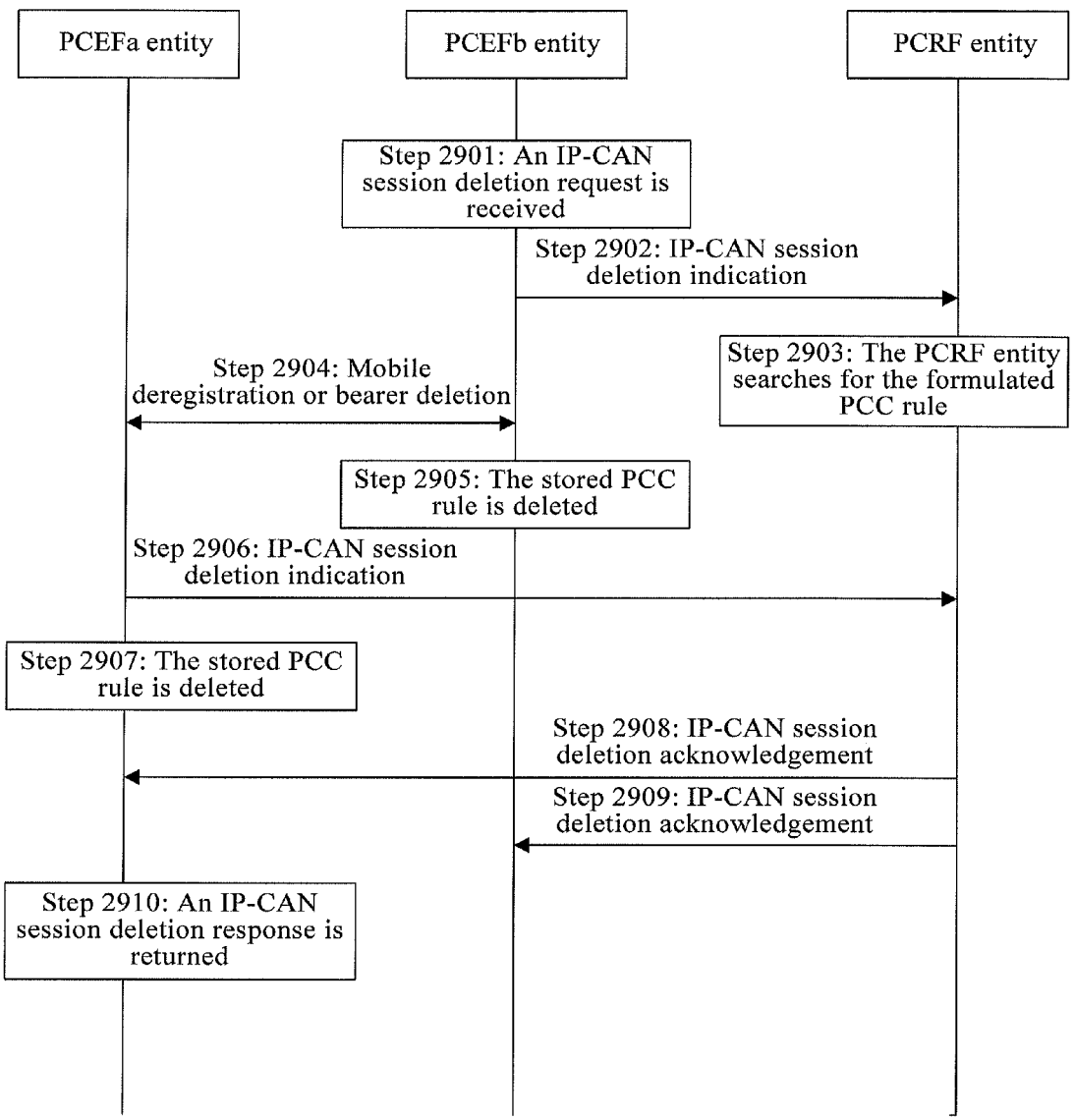
FIG. 35 is a schematic flowchart of a method for deleting an IP-CAN session in the 19th embodiment of the present disclosure.

FIG. 35 is a schematic flowchart of a method for deleting an IP-CAN session in the 19$^{th}$ embodiment of the present disclosure. Through the method for deleting an IP-CAN session in this embodiment, an IP-CAN session may be deleted in a new PCC architecture shown in FIG. 2. As shown in FIG. 35, the method for deleting an IP-CAN session in this embodiment includes the following steps 2901-2909.

Step 2901: The PCEFb entity receives an IP-CAN session deletion request.

Step 2902: The PCEFb entity sends an IP-CAN session deletion indication message to the PCRF entity.

Step 2903: The PCRF entity searches for the formulated PCC rule(s).

Step 2904: Mobile deregistration or bearer deletion occurs between the PCEFa entity and the PCEFb entity.

Step 2905: The PCEFb entity deletes the stored PCC rule(s).

Step 2906: The PCEFa entity sends an IP-CAN session deletion indication message to the PCRF entity.

Step 2907: The PCEFa entity deletes the stored PCC rule(s).

Step 2908: The PCRF entity sends an IP-CAN session deletion acknowledgement message to the PCEFa entity.

Step 2909: The PCRF entity sends an IP-CAN session deletion acknowledgement message to the PCEFb entity.

Step 2910: The PCEFb entity returns an IP-CAN session deletion response.

The IP-CAN session deletion request in this method may be a GTP message, or a trigger message unrelated to the 3G network. If event triggers and credit re-authorization triggers are stored in the PCEFa entity and the PCEFb entity, the PCEFb entity further deletes the stored event triggers and credit re-authorization triggers in step 29056, and the PCEFa entity further deletes the stored event triggers and credit re-authorization triggers in step 2907. If the IP-CAN session employs an online charging mode, an additional step occurs between step 2909 and step 2810 in this method, and the additional step is: The PCEFb entity sends a final credit report to the OCS entity. If the PCRF entity has customized subscription notification, the method further includes this step: The PCRF entity sends a subscription notification cancellation message to the SPR entity. After step 2903, the method may further include this step: The PCRF entity indicates lack of service transfer resources to the AF entity. An additional step may occur between step 2906 and step 2908, and the additional step may be: The PCRF entity searches for the formulated PCC rule(s), and the sequence of this additional step and step 2907 is not fixed.

The sequence of step 2903 and step 2905 is not fixed.

According to the method for deleting an IP-CAN session in this embodiment, the PCEFa entity and the PCEFb entity delete the stored PCC rule(s) respectively, and the IP-CAN session is deleted in the new architecture.

The method for deleting an IP-CAN session in embodiments 16-19 is also applicable to the PCC architecture in the first roaming scenario shown in FIG. 3. The difference is: When the IP-CAN session deletion method illustrated in FIG. 32-FIG. 35 is applied to the PCC architecture shown in FIG. 3, the PCEFa entity is located in the visited network, the PCEFb entity is located in the home network, the PCRF entity is the hPCRF entity located in the home network, and messages are transferred between the PCEFa entity and the hPCRF entity through a vPCRF entity located in the visited network. Besides, messages may be further transferred between the PCEFa entity and the PCEFb entity through a core network entity located in the visited network.

Embodiment 20

Figure 36:
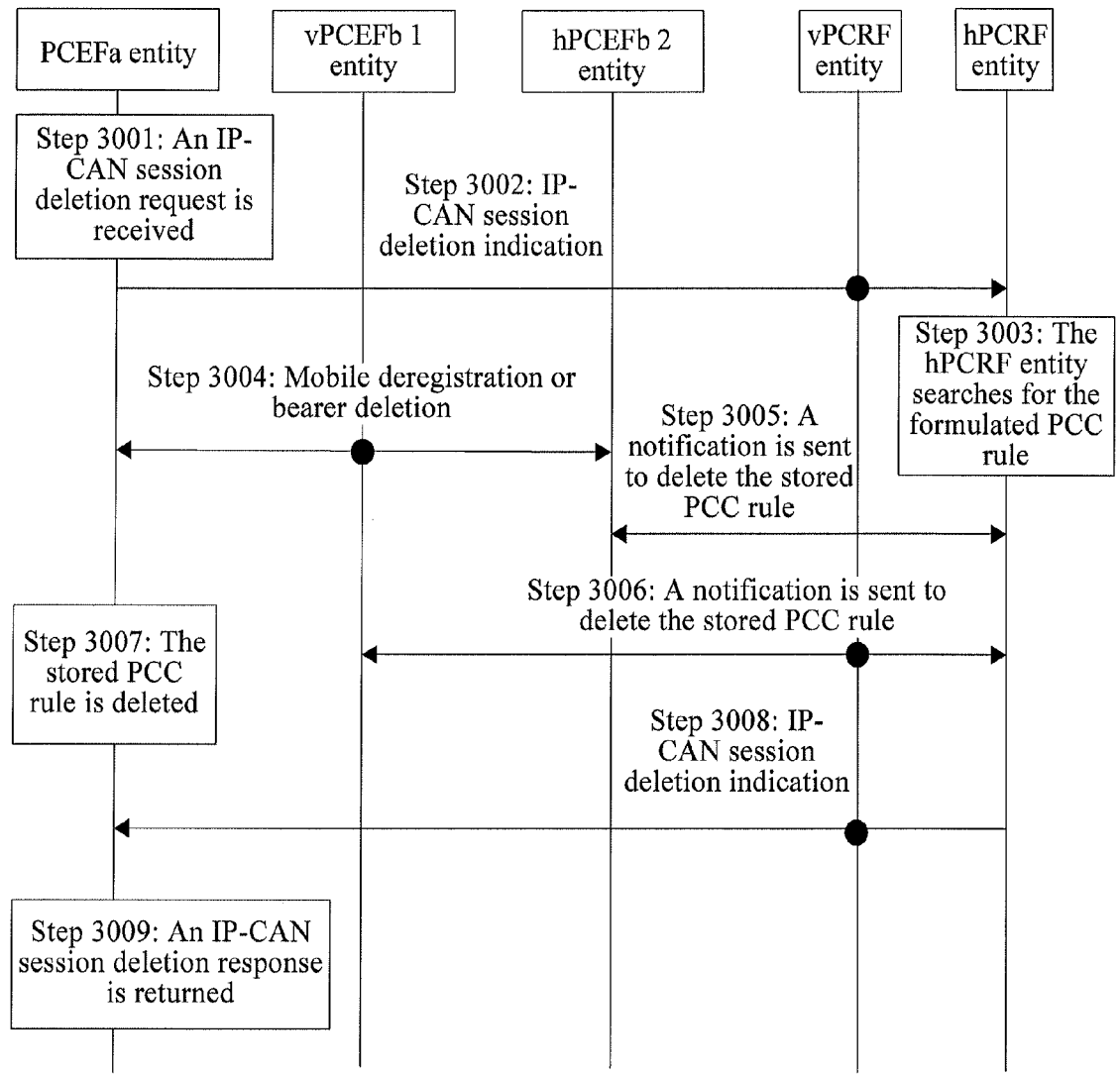
FIG. 36 is a schematic flowchart of a method for deleting an IP-CAN session in the 20th embodiment of the present disclosure.

FIG. 36 is a schematic flowchart of a method for deleting an IP-CAN session in the 20$^{th}$ embodiment of the present disclosure. Through the method for deleting an IP-CAN session in this embodiment, an IP-CAN session may be deleted in a new PCC architecture shown in FIG. 4. As shown in FIG. 36, the method for deleting an IP-CAN session in this embodiment includes the following steps 3001-3009.

Step 3001: The PCEFa entity receives an IP-CAN session deletion request.

Step 3002: Through the vPCRF entity, the PCEFa entity sends an IP-CAN session deletion indication message to the hPCRF entity.

Step 3003: The hPCRF entity searches for the formulated PCC rule(s).

Step 3004: Mobile deregistration or bearer deletion occurs between the PCEFa, vPCEFb1, and hPCEFb2.

Step 3005: The hPCRF entity notifies the hPCEFb2 entity to delete the stored PCC rule(s).

Step 3006: Through the vPCRF entity, the hPCRF entity notifies the vPCEFb1 entity to delete the stored PCC rule(s).

Step 3007: The PCEFa entity deletes the stored PCC rule(s).

Step 3008: Through the vPCRF entity, the hPCRF entity sends an IP-CAN session deletion acknowledgement message to the PCEFa entity.

Step 3009: The PCEFa entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3005, the vPCEFb1 entity further deletes the stored event triggers and credit re-authorization triggers in step 3006, and the PCEFa entity further deletes the stored event triggers and credit re-authorization triggers in step 3007. If the IP-CAN session employs an online charging mode, an additional step occurs between step 3008 and step 3009 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3003, the method may further include this step: The hPCRF entity indicates lack of service transfer resources to the AF entity.

The sequence of step 3005, step 3006, and step 3007 is not fixed.

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 21

Figure 37:
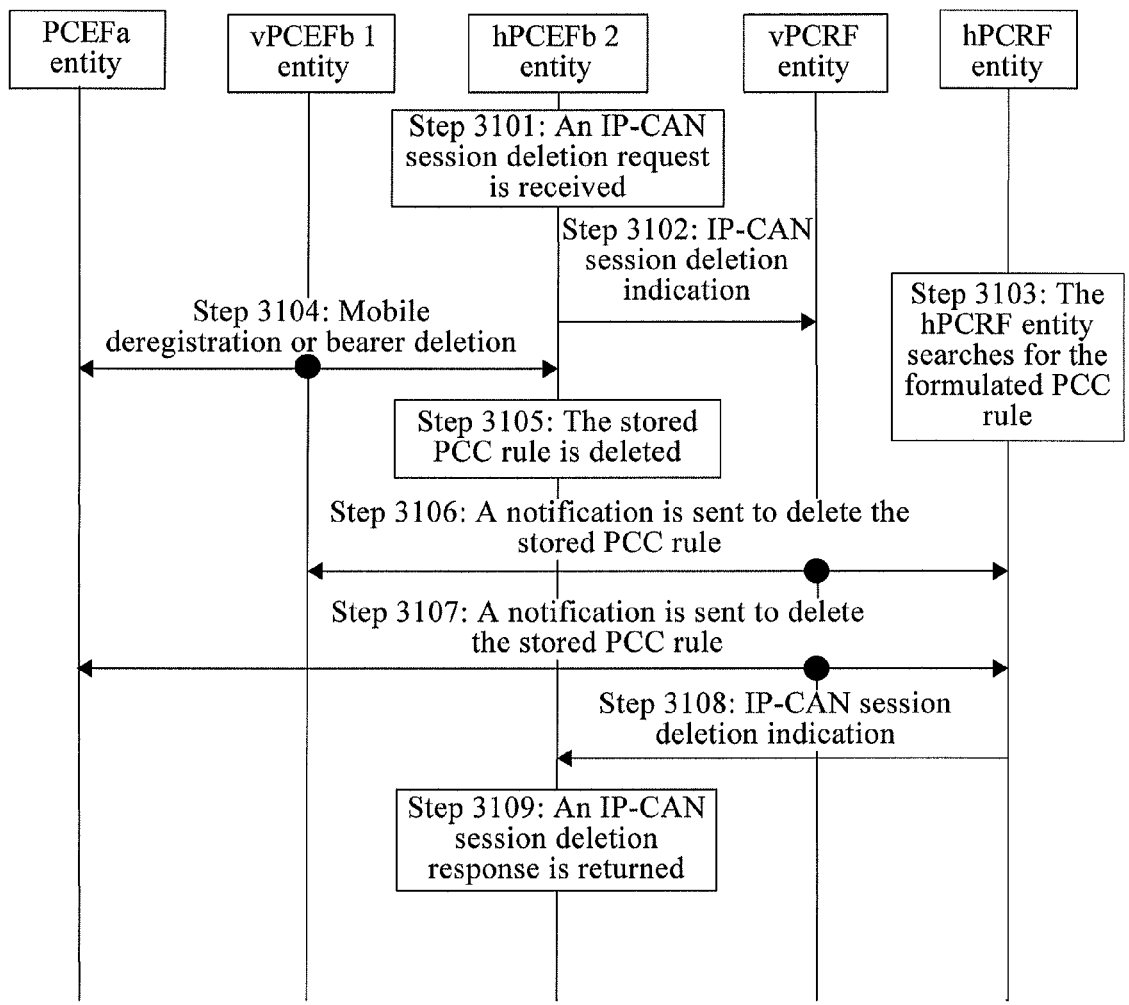
FIG. 37 is a schematic flowchart of a method for deleting an IP-CAN session in the 21st embodiment of the schematic present disclosure.

FIG. 37 is a schematic flowchart of a method for deleting an IP-CAN session in the 21$^{st}$ embodiment of the present disclosure. Through the method for deleting an IP-CAN session in this embodiment, an IP-CAN session may be deleted in a new PCC architecture shown in FIG. 4. As shown in FIG. 37, the method for deleting an IP-CAN session in this embodiment includes the following steps 3101-3109.

Step 3101: The hPCEFb2 entity receives an IP-CAN session deletion request.

Step 3102: The hPCEFb2 entity sends an IP-CAN session deletion indication message to the hPCRF entity.

Step 3103: The hPCRF entity searches for the formulated PCC rule(s).

Step 3104: Mobile deregistration or bearer deletion occurs between the PCEFa, vPCEFb1, and hPCEFb2.

Step 3105: The hPCEFb2 entity deletes the stored PCC rule(s).

Step 3106: Through the vPCRF entity, the hPCRF entity notifies the vPCEFb1 entity to delete the stored PCC rule(s).

Step 3107: Through the vPCRF entity, the hPCRF entity notifies the PCEFa entity to delete the stored PCC rule(s).

Step 3108: The hPCRF entity sends an IP-CAN session deletion acknowledgement message to the hPCEFb2 entity.

Step 3109: The hPCEFb2 entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3105, the vPCEFb1 entity further deletes the stored event triggers and credit re-authorization triggers in step 3106, and the PCEFa entity further deletes the stored event triggers and credit re-authorization triggers in step 3107. If the IP-CAN session employs an online charging mode, an additional step occurs between step 3108 and step 3109 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3103, the method may further include this step: The hPCRF entity indicates lack of service transfer resources to the AF entity.

The sequence of step 3005, step 3006, and step 3007 is not fixed.

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 22

Figure 38:
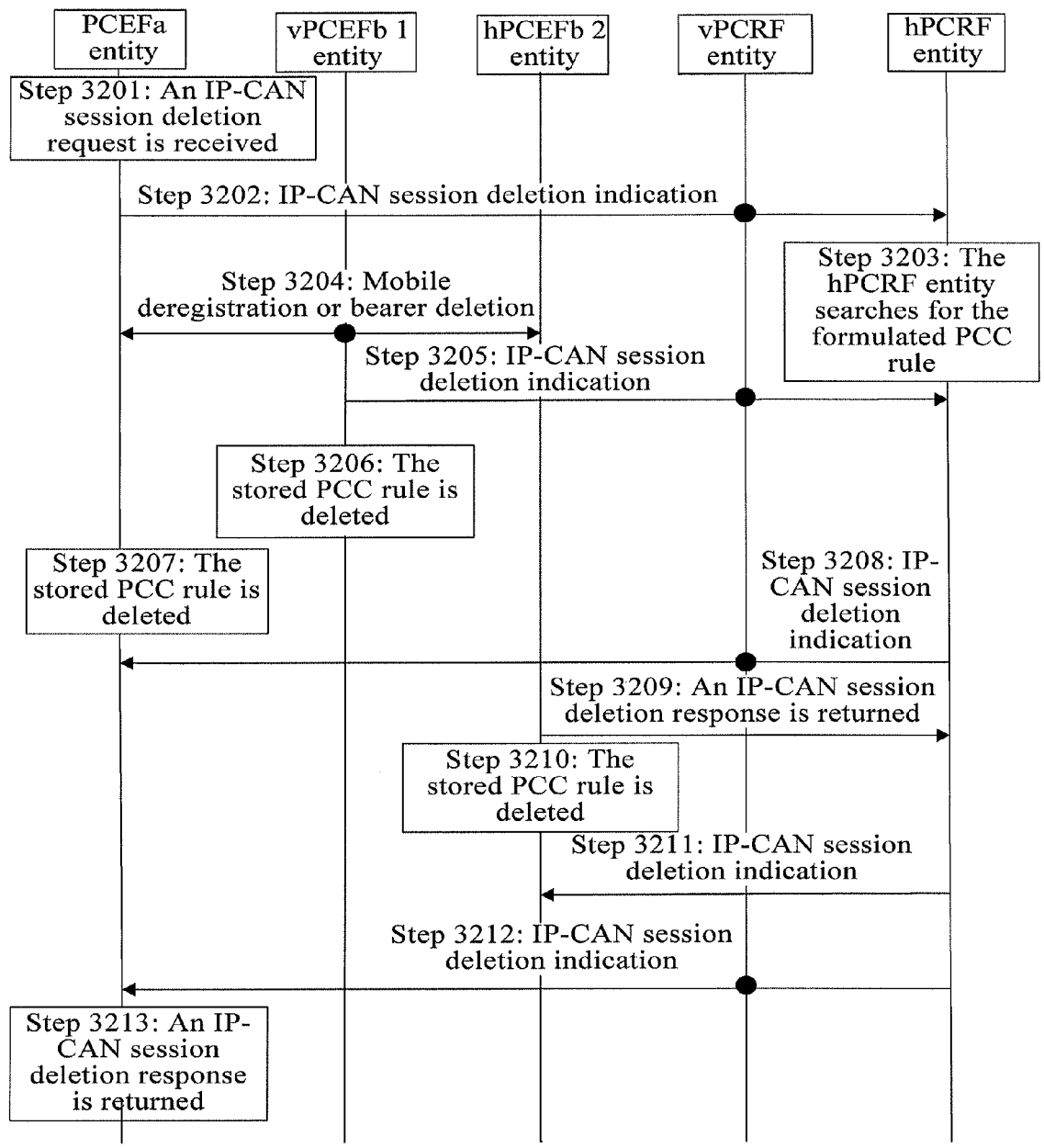
FIG. 38 is a schematic flowchart of a method for deleting an IP-CAN session in the 22nd embodiment of the present disclosure.

FIG. 38 is a schematic flowchart of a method for deleting an IP-CAN session in the 22$^{nd}$ embodiment of the present disclosure. Through the method for deleting an IP-CAN session in this embodiment, an IP-CAN session may be deleted in a new PCC architecture shown in FIG. 4. As shown in FIG. 38, the method for deleting an IP-CAN session in this embodiment includes the following steps 3201-3213.

Step 3201: The PCEFa entity receives an IP-CAN session deletion request.

Step 3202: Through the vPCRF entity, the PCEFa entity sends an IP-CAN session deletion indication message to the hPCRF entity.

Step 3203: The hPCRF entity searches for the formulated PCC rule(s).

Step 3204: Mobile deregistration or bearer deletion occurs between the PCEFa, vPCEFb1, and hPCEFb2.

Step 3205: Through the vPCRF entity, the vPCEFb1 entity sends an IP-CAN session deletion indication message to the hPCRF entity.

Step 3206: The vPCEFb1 entity deletes the stored PCC rule(s).

Step 3207: The PCEFa entity deletes the stored PCC rule(s).

Step 3208: Through the vPCRF entity, the hPCRF entity sends an IP-CAN session deletion acknowledgement message to the vPCEFb1 entity.

Step 3209: The hPCEFb2 entity sends an IP-CAN session deletion indication message to the hPCRF entity.

Step 3210: The hPCEFb2 entity deletes the stored PCC rule(s).

Step 3211: The hPCRF entity sends an IP-CAN session deletion acknowledgement message to the hPCEFb2 entity.

Step 3212: Through the vPCRF entity, the hPCRF entity sends an IP-CAN session deletion acknowledgement message to the PCEFa entity.

Step 3213: The PCEFa entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3206, the vPCEFb1 entity further deletes the stored event triggers and credit re-authorization triggers in step 3210, and the PCEFa entity further deletes the stored event triggers and credit re-authorization triggers in step 3207. If the IP-CAN session employs an online charging mode, an additional step occurs between step 3212 and step 3213 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3203, the method may further include this step: The hPCRF entity indicates lack of service transfer resources to the AF entity. After step 3205 and after step 3208, the method may further include this step: The hPCRF entity searches for the formulated PCC rule(s).

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 23

Figure 39:
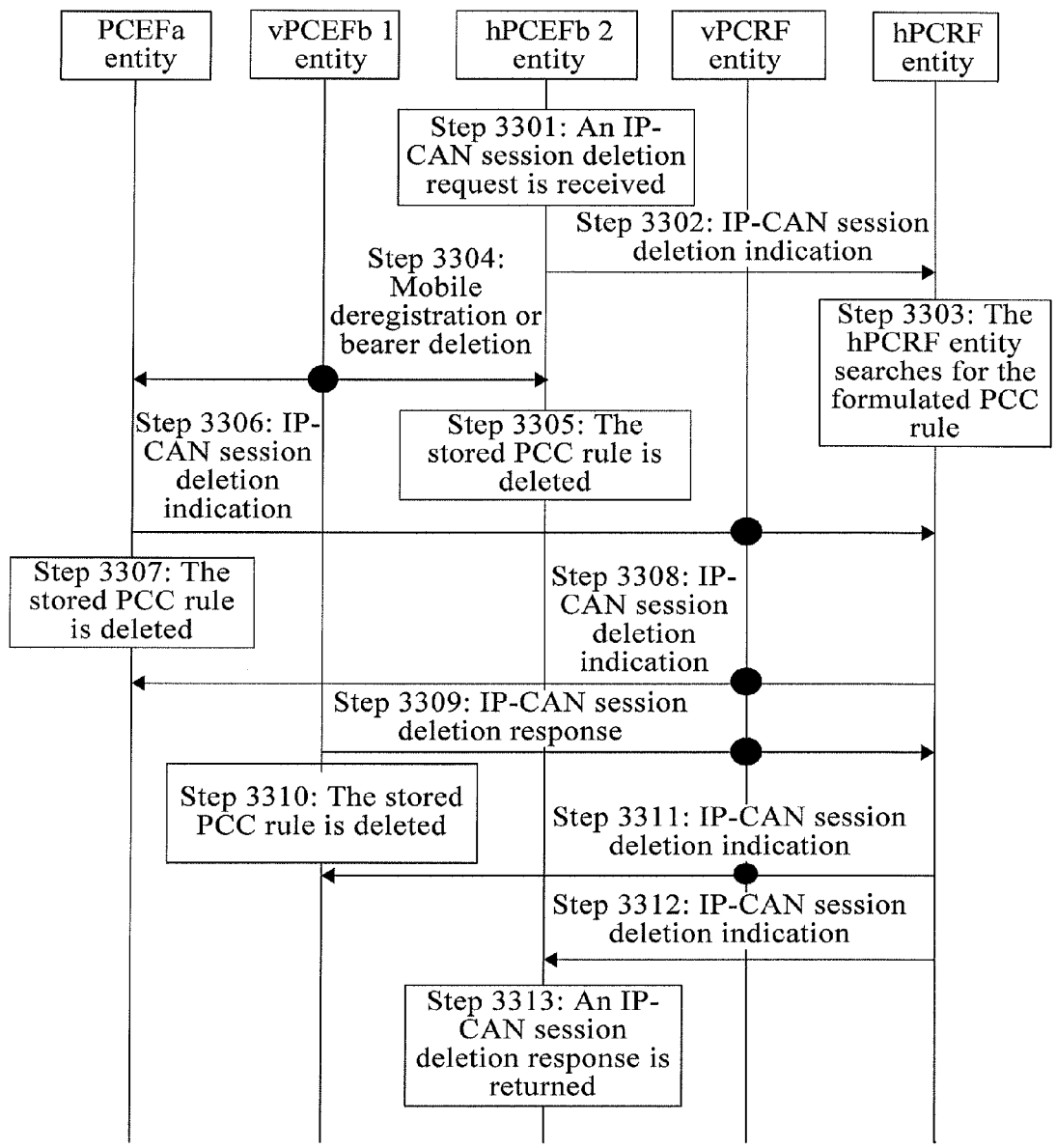
FIG. 39 is a schematic flowchart of a method for deleting an IP-CAN session in the 23rd embodiment of the present disclosure.

FIG. 39 is a schematic flowchart of a method for deleting an IP-CAN session in the 23$^{rd}$ embodiment of the present disclosure. Through the method for deleting an IP-CAN session in this embodiment, an IP-CAN session may be deleted in a new PCC architecture shown in FIG. 4. As shown in FIG. 39, the method for deleting an IP-CAN session in this embodiment includes the following steps 3301-3313.

Step 3301: The hPCEFb2 entity receives an IP-CAN session deletion request.

Step 3302: The hPCEFb2 entity sends an IP-CAN session deletion indication message to the hPCRF entity.

Step 3303: The hPCRF entity searches for the formulated PCC rule(s).

Step 3304: Mobile deregistration or bearer deletion occurs between the PCEFa, vPCEFb1, and hPCEFb2.

Step 3305: The hPCEFb2 entity deletes the stored PCC rule(s).

Step 3306: Through the vPCRF entity, the PCEFa entity sends an IP-CAN session deletion indication message to the hPCRF entity.

Step 3307: The PCEFa entity deletes the stored PCC rule(s).

Step 3308: Through the vPCRF entity, the hPCRF entity sends an IP-CAN session deletion acknowledgement message to the PCEFa entity.

Step 3309: Through the vPCRF entity, the vPCEFb1 entity sends an IP-CAN session deletion indication message to the hPCRF entity.

Step 3310: The vPCEFb1 entity deletes the stored PCC rule(s).

Step 3311: Through the vPCRF entity, the hPCRF entity sends an IP-CAN session deletion acknowledgement message to the vPCEFb1 entity.

Step 3312: The hPCRF entity sends an IP-CAN session deletion acknowledgement message to the hPCEFb2 entity.

Step 3313: The hPCEFb2 entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3305, the vPCEFb1 entity further deletes the stored event triggers and credit re-authorization triggers in step 3310, and the PCEFa entity further deletes the stored event triggers and credit re-authorization triggers in step 3307. If the IP-CAN session employs an online charging mode, an additional step occurs between step 3312 and step 3313 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3303, the method may further include this step: The hPCRF entity indicates lack of service transfer resources to the AF entity. After step 3306 and after step 3309, the method may further include this step: The hPCRF entity searches for the formulated PCC rule(s).

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 24

Figure 40:
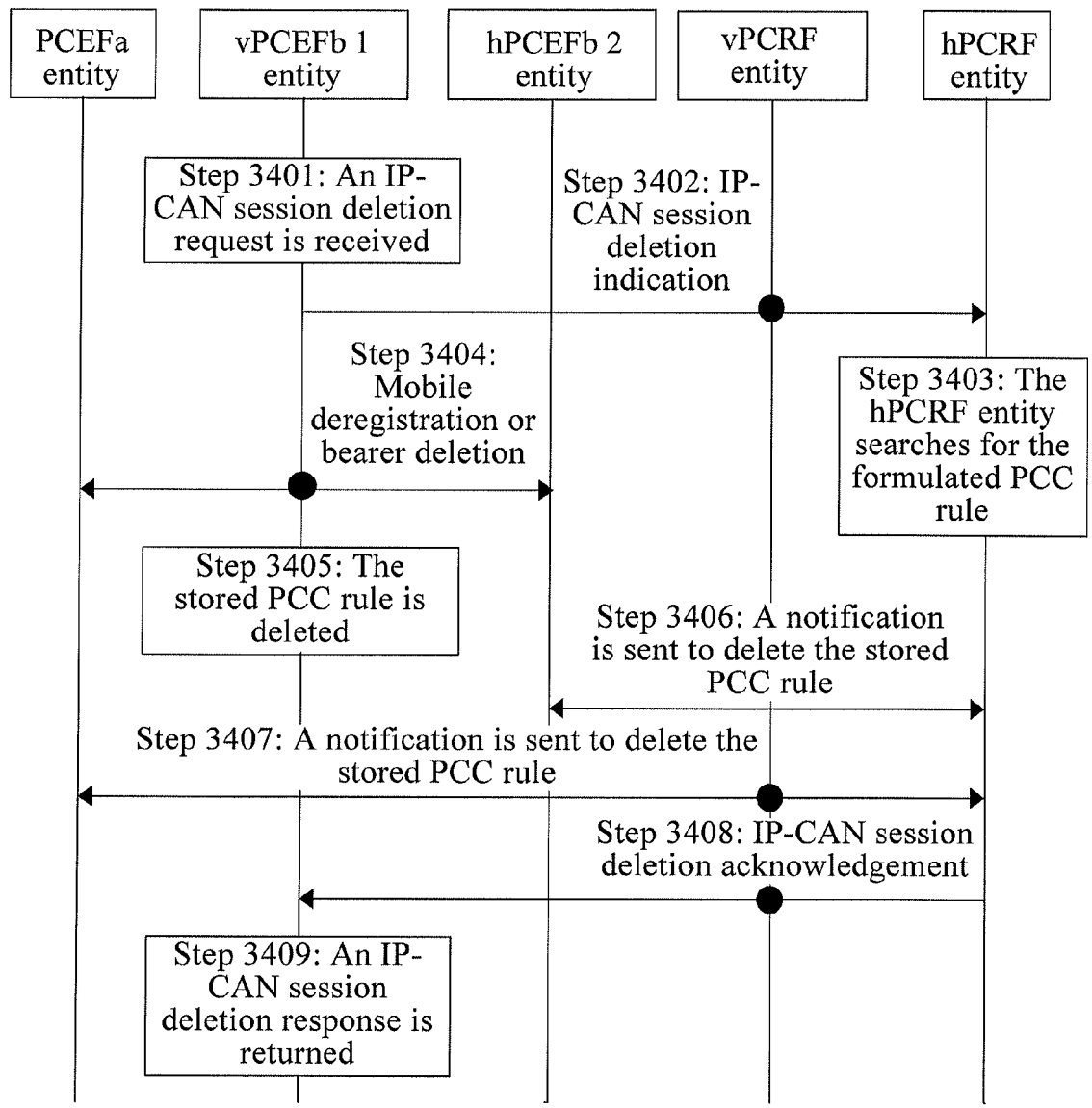
FIG. 40 is a schematic flowchart of a method for deleting an IP-CAN session in the 24th embodiment of the present disclosure.

FIG. 40 is a schematic flowchart of a method for deleting an IP-CAN session in the 24$^{th}$ embodiment of the present disclosure. Through the method for deleting an IP-CAN session in this embodiment, an IP-CAN session may be deleted in a new PCC architecture shown in FIG. 4. As shown in FIG. 40, the method for deleting an IP-CAN session in this embodiment includes the following steps 3401-3409.

Step 3401: The vPCEFb1 entity receives an IP-CAN session deletion request.

Step 3402: Through the vPCRF entity, the vPCEFb1 entity sends an IP-CAN session deletion indication message to the hPCRF entity.

Step 3403: The hPCRF entity searches for the formulated PCC rules.

Step 3404: Mobile deregistration or bearer deletion occurs between the PCEFa, vPCEFb1, and hPCEFb2.

Step 3405: The vPCEFb1 entity deletes the stored PCC rule(s).

Step 3406: The hPCRF entity notifies the hPCEFb2 entity to delete the stored PCC rule(s).

Step 3407: Through the vPCRF entity, the hPCRF entity notifies the PCEFa entity to delete the stored PCC rule(s).

Step 3408: Through the vPCRF entity, the hPCRF entity sends an IP-CAN session deletion acknowledgement message to the vPCEFb1 entity.

Step 3409: The vPCEFb1 entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3406, the vPCEFb1 entity further deletes the stored event triggers and credit re-authorization triggers in step 3405, and the PCEFa entity further deletes the stored event triggers and credit re-authorization triggers in step 3407. If the IP-CAN session employs an online charging mode, an additional step occurs between step 3408 and step 3409 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3403, the method may further include this step: The hPCRF entity indicates lack of service transfer resources to the AF entity.

The sequence of step 3405, step 3406, and step 3407 is not fixed.

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 25

Figure 41:
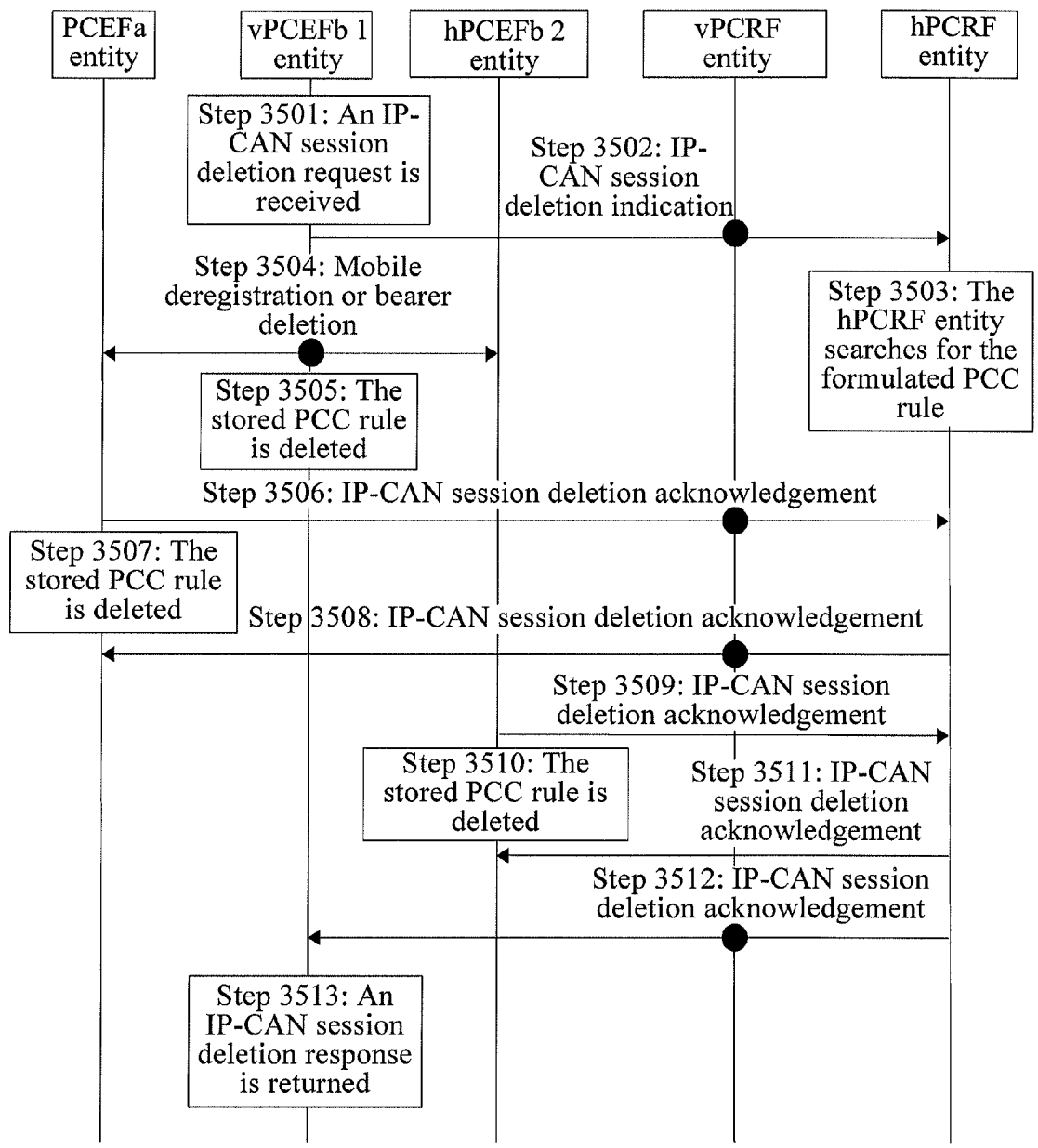
FIG. 41 is a schematic flowchart of a method for deleting an IP-CAN session in the 25th embodiment of the present disclosure.

FIG. 41 is a schematic flowchart of a method for deleting an IP-CAN session in the 25th embodiment of the present disclosure. Through the method for deleting an IP-CAN session in this embodiment, an IP-CAN session may be deleted in a new PCC architecture shown in FIG. 4. As shown in FIG. 41, the method for deleting an IP-CAN session in this embodiment includes the following steps 3501-3513.

Step 3501: The vPCEFb1 entity receives an IP-CAN session deletion request.

Step 3502: Through the vPCRF entity, the vPCEFb1 entity sends an IP-CAN session deletion indication message to the hPCRF entity.

Step 3503: The hPCRF entity searches for the formulated PCC rule(s).

Step 3504: Mobile deregistration or bearer deletion occurs between the PCEFa, vPCEFb1, and hPCEFb2.

Step 3505: The vPCEFb1 entity deletes the stored PCC rule(s).

Step 3506: Through the vPCRF entity, the PCEFa entity sends an IP-CAN session deletion indication message to the hPCRF entity.

Step 3507: The PCEFa entity deletes the stored PCC rule(s).

Step 3508: Through the vPCRF entity, the hPCRF entity sends an IP-CAN session deletion acknowledgement message to the PCEFa entity.

Step 3509: The hPCEFb2 entity sends an IP-CAN session deletion indication message to the hPCRF entity.

Step 3510: The hPCEFb2 entity deletes the stored PCC rule(s).

Step 3511: The hPCRF entity sends an IP-CAN session deletion acknowledgement message to the hPCEFb2 entity.

Step 3512: Through the vPCRF entity, the hPCRF entity sends an IP-CAN session deletion acknowledgement message to the vPCEFb1 entity.

Step 3513: The vPCEFb1 entity returns an IP-CAN session deletion response.

The IP-CAN session deletion request in this method may be a GTP message, or a trigger message unrelated to the 3G network. If event triggers and credit re-authorization triggers are stored in the PCEFa, hPCEFb2, and vPCEFb1, the hPCEFb2 entity further deletes the stored event triggers and credit re-authorization triggers in step 3510, the vPCEFb1 entity further deletes the stored event triggers and credit re-authorization triggers in step 3505, and the PCEFa entity further deletes the stored event triggers and credit re-authorization triggers in step 3507. If the IP-CAN session employs an online charging mode, an additional step occurs between step 3512 and step 3513 in this method, and the additional step is: The hPCEFb2 entity sends a final credit report to the OCS entity. If the hPCRF entity has customized subscription notification, the method further includes this step: The hPCRF entity sends a subscription notification cancellation message to the SPR entity. After step 3503, the method may further include this step: The hPCRF entity indicates lack of service transfer resources to the AF entity. After step 3506 and after step 3509, the method may further include this step: The hPCRF entity searches for the formulated PCC rule(s).

According to the method for deleting an IP-CAN session in this embodiment, the PCEFa, vPCEFb1, and hPCEFb2 delete the stored PCC rule(s) respectively, and the IP-CAN session is deleted in the new architecture.

Embodiment 26

Figure 42:
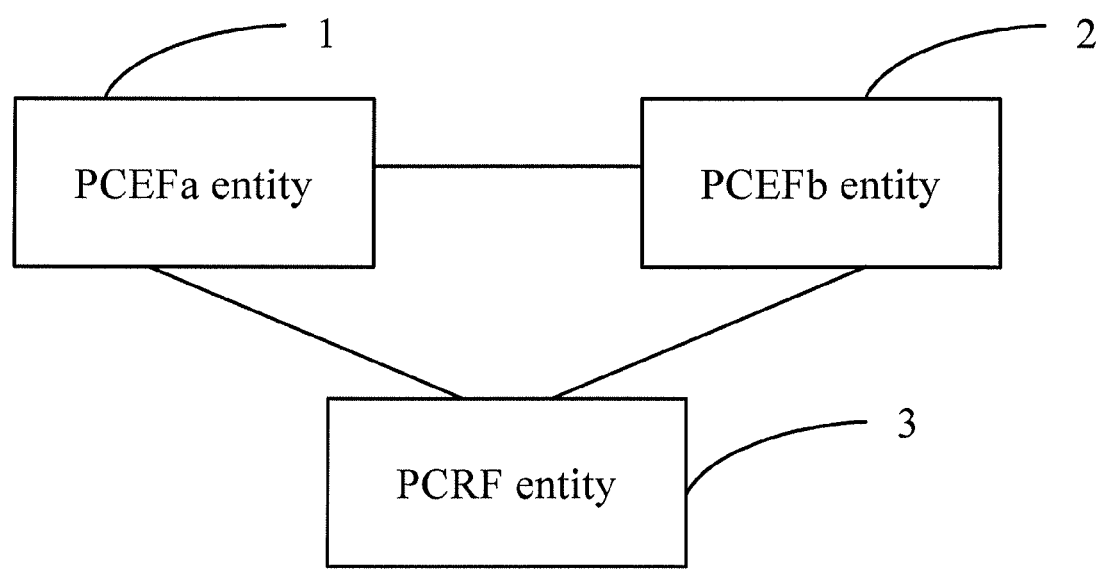
FIG. 42 schematically illustrates a structure of an apparatus for creating an IP-CAN session in the 26th embodiment of the present disclosure.

FIG. 42 schematically shows a structure of an apparatus for creating an IP-CAN session in the 26th embodiment of the present disclosure. As shown in FIG. 42, the IP-CAN session creation apparatus includes: a PCEFa entity 1, a PCEFb entity 2, and a PCRF entity 3.

The PCEFa entity 1 is configured to receive an IP-CAN session creation request, and return an IP-CAN session creation response after receiving IP-CAN session information.

The PCEFb entity 2 is configured to perform mobility registration with the PCEFa entity 1.

The PCRF entity 3 is configured to create a session with a PCEFa entity and a PCEFb entity, and send IP-CAN session information to the PCEFa entity and the PCEFb entity.

In practice, the IP-CAN session creation apparatus is operated in the following way.

After receiving the IP-CAN session creation request, the PCEFa entity 1 creates a session with the PCRF entity 3, and then the PCEFa entity 1 and the PCEFb entity 2 perform mobility registration.

The PCEFb entity 2 creates a session with the PCRF entity 3.

The PCRF entity 3 sends the IP-CAN session information to the PCEFa entity 1 and the PCEFb entity 2.

After receiving the IP-CAN session information, the PCEFa entity 1 returns an IP-CAN session creation response, and the IP-CAN session creation process is complete.

The detailed process of the PCRF entity 3 sending IP-CAN session information to the PCEFa entity 1 and the PCEFb entity 2 is: The PCRF entity 3 formulates PCC rule(s) for the IP-CAN session, and submits the IP-CAN session information and the formulated PCC rule(s) to the PCEFa entity 1 and the PCEFb entity 2.

According to the apparatus for creating an IP-CAN session in the 26th embodiment, the PCRF entity may formulate PCC rule(s) for the IP-CAN session, and submit the IP-CAN session information and the formulated PCC rule(s) to the PCEFa entity and the PCEFb entity. In this way, an IP-CAN session is created in the new architecture.

It is understandable to those skilled in the art that all or part of the steps of the foregoing embodiments may be implemented by hardware such as a computer having a processor instructed by a computer program. The program may be stored in a computer-readable storage medium accessible to the processor. When being executed, the program performs all or part of the steps in foregoing method embodiments.

All function entities in the embodiments of the present disclosure may be integrated into a processing module, or exist independently, or two or more of such entities are integrated into a module. The integrated module may be hardware or a software module. When being implemented as a software module and sold or applied as an independent product, the integrated module may also be stored in a computer-readable storage medium.

The storage medium may be a Read-Only Memory (ROM), magnetic disk, or Compact Disk (CD).

Although the disclosure has been described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for creating an Internet Protocol Connectivity Access Network (IP-CAN) session, comprising:
    creating by a first Policy and Charging Enforcement Function (PCEF) entity, a first session with a Policy and Charging Rules Function (PCRF) entity, wherein the creating comprising:
        sending by the first PCEF entity, a session creation request that carries an Access Point Name (APN), a user ID of a user, and an IP-CAN bearer information to the PCRF entity; and
        receiving by the first PCEF entity, a session creation response that carries an IP-CAN session information from the PCRF entity;
    performing by the first PCEF entity, mobility registration with a second PCEF entity to make the second PCEF entity create a second session with the PCRF entity, wherein the performing comprising:
        sending by the first PCEF entity, a mobility registration request or a bearer creation request that carries the APN and the user ID to a second PCEF entity, to make the second PCEF entity allocate an IP address to the user and send a Policy and Charging Control (PCC) decision request that carries the IP address to the PCRF entity for formulating, by the PCRF entity, a PCC rule according to the APN, the user ID, the allocated IP address, the IP-CAN bearer information, and a stored user subscription profile; and
        receiving by the first PCEF entity, session information from the PCRF entity.

2. The method of claim 1, wherein before sending by the first PCEF entity, the session creation request to the PCRF entity, the method further comprising:
    receiving by the first PCEF entity, an IP-CAN session creation request.

3. The method of claim 1, wherein after receiving the session information from the PCRF entity, the method further comprising:
    returning by the first PCEF entity, an IP-CAN session creation response.

4. A method for creating an Internet Protocol Connectivity Access Network (IP-CAN) session, comprising:
    accepting by a second Policy and Charging Enforcement Function (PCEF) entity, mobility registration from a first PCEF entity that has created a first session with a Policy and Charging Rules Function (PCRF) entity, wherein the second PCEF entity receiving a mobility registration request or a bearer creation request that carries an APN and a user ID of a user from the first PCEF entity;
    allocating by the second PCEF entity, an IP address to the user;
    sending by the second PCEF entity, a mobility registration response or a bearer creation response that carries the IP address to the first PCEF entity;
    creating by the second PCEF entity, a second session with the PCRF entity; and
    receiving by the second PCEF entity, an IP-CAN session information and PCC rules from the PCRF entity.

5. The method of claim 4, wherein creating, by the second PCEF entity, a session with the PCRF entity comprising:
    sending by the second PCEF entity, a PCC decision request that carries the APN, the user ID, and the allocated IP address to the PCRF entity to make the PCRF entity formulate PCC rules according to the APN, the user ID, the allocated IP address, the IP-CAN bearer information, and the stored user subscription profile.

6. The method of claim 5, wherein receiving, by the second PCEF entity, an IP-CAN session information and PCC rules from the PCRF entity comprising:
    receiving by the second PCEF entity, a PCC decision message that carries IP-CAN session information and the formulated PCC rules from the PCRF entity.

7. The method of claim 4, wherein the second PCEF entity comprises a third PCEF entity located in a home network and a fourth PCEF entity located in the visited network; the PCRF entity comprises a Policy and Charging Rules Function located in the visited network, vPCRF entity, and a Policy and Charging Rules Function located in the home network, hPCRF entity; wherein the mobility registration request or the bearer creation request is received by the fourth PCEF entity from the first PCEF entity; and after the fourth entity receives the mobility registration request or the bearer creation request, the method further comprising:
    sending by the fourth PCEF entity, a Gx session creation request that carries an APN and a user ID to the vPCRF entity;
    receiving by the fourth PCEF entity, a Gx session creation response that carries IP-CAN session information from the vPCRF entity; and
    sending by the fourth PCEF entity, a mobility registration request or bearer creation request that carries an APN and a user ID to the third PCEF entity;
    wherein the allocating by the second PCEF entity, an IP address to the user comprising:
    allocating by the third PCEF entity, the IP address to the user;
    wherein the sending by the second PCEF entity, a mobility registration response or a bearer creation response that carries the IP address to the first PCEF entity comprising:
        sending by the third PCEF entity, a PCC decision request that carries the APN, the user ID, and the allocated IP address to the hPCRF entity to make the hPCRF entity formulate PCC rules according to the received APN, the user ID, the IP address, the IP-CAN bearer information, and the stored user subscription profile; and
        sending by the third PCEF entity, a mobility registration response or a bearer creation response that carries the allocated IP address to the First PCEF entity through the fourth PCEF entity.

8. The method of claim 7, wherein receiving, by the second PCEF entity, an IP-CAN session information and PCC rules from the PCRF entity comprising:
    receiving by the third PCEF entity, a first PCC decision message that carries IP-CAN session information and the formulated PCC rules from the hPCRF entity;
    receiving by the fourth PCEF entity, a second PCC decision message that carries the formulated PCC rules from the hPCRF through the vPCRF entity.

9. A non-transitory computer readable storage medium storing a set of instructions for creating an Internet Protocol Connectivity Access Network (IP-CAN) session, the set of instructions to direct a processor in a network entity to perform:
    accepting mobility registration from a first Policy and Charging Enforcement Function (PCEF) entity that has created a first session with a Policy and Charging Rules Function (PCRF) entity, wherein the accepting comprising:
  receiving a mobility registration request or a bearer creation request that carries an Access Point Name (APN) and a user ID from the First PCEF entity;
  allocating an IP address to the user;
  sending a mobility registration response or a bearer creation response that carries the IP address to the First PCEF entity;
  creating a second session with the PCRF entity; and
  receiving an IP-CAN session information and PCC rules from the PCRF entity.

10. The storage medium of claim 9, wherein the processor is configured to create the session with the PCRF entity by:
  sending a PCC decision request that carries an APN, a user ID, and the IP address to the PCRF entity to make the PCRF entity formulate PCC rules according to the APN, the user ID, the allocated IP address, the IP-CAN bearer information, and a stored user subscription profile.

11. The storage medium of claim 9, wherein the processor is configured to receive the IP-CAN session information and PCC rules from the PCRF entity by:
  receiving a PCC decision message that carries the IP-CAN session information and the PCC rules from the PCRF entity.

12. A method for creating an Internet Protocol Connectivity Access Network (IP-CAN) session, comprising:
  sending by a first Policy and Charging Enforcement Function (PCEF) entity, a session creation request that carries an Access Point Name (APN), a user ID of a user, and an IP-CAN bearer information to a Policy and Charging Rules Function (PCRF) entity; and
  receiving by the first PCEF entity, a session creation response that carries an IP-CAN session information from the PCRF;
  sending by the first PCEF entity, a mobility registration request or a bearer creation request that carries the APN and the user ID to a second PCEF entity, to make the second PCEF entity allocate an IP address to the user and send a Policy and Charging Control (PCC) decision request that carries the IP address to the PCRF entity for formulating, by the PCRF entity, a PCC rule according to the APN, the user ID, the allocated IP address, the IP-CAN bearer information, and a stored user subscription profile; and
  receiving by the first PCEF entity, session information from the PCRF entity.

13. A method for creating an Internet Protocol Connectivity Access Network (IP-CAN) session, comprising:
  receiving by a second Policy and Charging Enforcement Function (PCEF) entity, a mobility registration request or a bearer creation request that carries an APN and a user ID of a user from a first PCEF entity that has created a first session with a Policy and Charging Rules Function (PCRF) entity;
  allocating by the second PCEF entity, an IP address to the user;
  sending by the second PCEF entity, a mobility registration response or a bearer creation response that carries the IP address to the first PCEF entity;
  creating by the second PCEF entity, a second session with the PCRF entity; and
  receiving by the second PCEF entity, an IP-CAN session information and PCC rules from the PCRF entity.

14. A non-transitory computer readable storage medium storing a set of instructions for creating an Internet Protocol Connectivity Access Network (IP-CAN) session, the set of instructions to direct a processor in a network entity to perform:
  receiving a mobility registration request or a bearer creation request that carries an Access Point Name (APN) and a user ID from a First PCEF entity that has created a first session with a Policy and Charging Rules Function (PCRF) entity;
  allocating an IP address to the user;
  sending a mobility registration response or a bearer creation response that carries the IP address to the First PCEF entity;
  creating a second session with the PCRF entity; and
  receiving an IP-CAN session information and PCC rules from the PCRF entity.

* * * * *